US008942522B2

(12) United States Patent
Edmonds et al.

(10) Patent No.: US 8,942,522 B2
(45) Date of Patent: Jan. 27, 2015

(54) OPTICAL STACK AND LIGHTGUIDES

(75) Inventors: William F. Edmonds, Minneapolis, MN (US); Tao Liu, Woodbury, MN (US); John F. Van Deriofske, III, Minneapolis, MN (US); John A. Wheatley, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 258 days.

(21) Appl. No.: 13/634,583

(22) PCT Filed: Apr. 11, 2011

(86) PCT No.: PCT/US2011/031904
§ 371 (c)(1),
(2), (4) Date: Sep. 13, 2012

(87) PCT Pub. No.: WO2011/130151
PCT Pub. Date: Oct. 20, 2011

(65) Prior Publication Data
US 2013/0022315 A1    Jan. 24, 2013

Related U.S. Application Data

(60) Provisional application No. 61/323,128, filed on Apr. 12, 2010, provisional application No. 61/323,147, filed on Apr. 12, 2010, provisional application No. 61/323,163, filed on Apr. 12, 2010.

(51) Int. Cl.
*G02B 6/26*      (2006.01)
*G02F 1/1335*   (2006.01)
(Continued)

(52) U.S. Cl.
CPC .............. *G02B 5/045* (2013.01); *G02B 6/0053* (2013.01); *G02F 1/133606* (2013.01); *G02F 2001/133607* (2013.01)
USPC .............................................. 385/31; 349/61

(58) Field of Classification Search
None
See application file for complete search history.

(56) References Cited

U.S. PATENT DOCUMENTS 3,619,140 A    11/1971  Morgan et al.
4,166,152 A     8/1979  Baker et al.
(Continued)

FOREIGN PATENT DOCUMENTS

EP      2 009 349        12/2008
JP    2001338507 A      12/2001
(Continued)

OTHER PUBLICATIONS

U.S. Appl. No. 61/254,691, Michael F. Weber, filed Oct. 24, 2009.
(Continued)

*Primary Examiner* — Tina Wong
(74) *Attorney, Agent, or Firm* — Daniel J. Iden

(57) ABSTRACT

Optical stack is disclosed. The optical stack includes a first optical stack that includes, a first optical adhesive layer, and a reflective polarizer layer that is disposed on the first optical adhesive layer. The reflective polarizer layer substantially reflects light of a first polarization state and substantially transmits light of a second polarization state orthogonal to the first polarization state. The optical stack also includes a second optical stack that includes a second optical adhesive layer, a low index layer that is disposed on the second optical adhesive layer and includes a plurality of voids dispersed in a binder, and a light directing film that is disposed on the low index layer and includes a plurality of unitary discrete structures. Portions of each unitary discrete structure penetrate into the first optical adhesive layer. Portions of each unitary discrete structure do not penetrate into the first optical adhesive layer. Each unitary discrete structure defines a penetration depth and a penetration base at the interface between the penetrating and non-penetrating portions of the unitary discrete structure. The penetration base has a minimum penetration base dimension. The plurality of unitary discrete structures has an average penetration depth and an average minimum penetration base dimension. The ratio of the average penetration depth to the average minimum penetration base dimension is at least 1.5. The peel strength between the first and second optical stacks is greater than about 30 grams/inch.

17 Claims, 37 Drawing Sheets

(51) Int. Cl.
*G02B 5/04* (2006.01)
*F21V 8/00* (2006.01)

(56) References Cited

U.S. PATENT DOCUMENTS

| | | | |
|---|---|---|---|
| 4,968,562 A | 11/1990 | Delgado | |
| 4,994,322 A | 2/1991 | Delgado et al. | |
| 5,175,030 A | 12/1992 | Lu et al. | |
| 5,296,277 A | 3/1994 | Wilson et al. | |
| 5,362,516 A | 11/1994 | Wilson et al. | |
| 6,197,397 B1 | 3/2001 | Sher et al. | |
| 6,667,782 B1 | 12/2003 | Taira et al. | |
| 6,846,089 B2 | 1/2005 | Stevenson et al. | |
| 6,987,612 B2 | 1/2006 | Allen et al. | |
| 6,999,233 B2 | 2/2006 | Allen et al. | |
| 7,010,212 B2 | 3/2006 | Emmons et al. | |
| 7,095,943 B2 | 8/2006 | Emmons et al. | |
| 7,140,812 B2 | 11/2006 | Bryan et al. | |
| 7,526,164 B2 | 4/2009 | Ouderkirk et al. | |
| 7,599,592 B2 | 10/2009 | Benson, Jr. et al. | |
| 2004/0105046 A1* | 6/2004 | Taira et al. | 349/61 |
| 2006/0056166 A1 | 3/2006 | Yeo et al. | |
| 2006/0114567 A1 | 6/2006 | Shim et al. | |
| 2007/0000606 A1 | 1/2007 | Steelman et al. | |
| 2007/0223247 A1 | 9/2007 | Lee et al. | |
| 2008/0043490 A1 | 2/2008 | Coleman et al. | |
| 2008/0049330 A1 | 2/2008 | Tolbert et al. | |
| 2008/0137346 A1 | 6/2008 | Ohta et al. | |
| 2008/0259243 A1 | 10/2008 | Ohta et al. | |
| 2008/0285304 A1 | 11/2008 | Rankin, Jr. et al. | |
| 2009/0041553 A1 | 2/2009 | Burke et al. | |

FOREIGN PATENT DOCUMENTS

| | | |
|---|---|---|
| TW | 200739135 A | 3/1996 |
| WO | WO 00/56556 | 9/2000 |
| WO | WO 2007/026776 | 3/2007 |
| WO | WO 2008/024698 | 2/2008 |
| WO | WO 2008/047855 | 4/2008 |

OTHER PUBLICATIONS

U.S. Appl. No. 61/254,692, Michael F. Weber, filed Oct. 24, 2009.
U.S. Appl. No. 61/254,673, Adam D. Haag et al, filed Oct. 24, 2009.
U.S. Appl. No. 61/254,674, Adam D. Haag et al., filed Oct. 24, 2009.
U.S. Appl. No. 61/169,466, Encai Hao, et al., filed Apr. 15, 2009.
U.S. Appl. No. 61/169,521, Encai Hao, et al., filed Apr. 15, 2009.
U.S. Appl. No. 61/254,676, Jason S. Petaja, et al., filed Oct. 24, 2009.
U.S. Appl. No. 61/254,243, Richard J. Pokorny, filed Oct. 23, 2009.
ASTM D1003 11e1, Standard Test Method for Haze and Luminous Transmittance of Transparent Plastics, Nov. 2011, 7 pages.
PCT International Search Report for PCT/US2011/031904 dated Aug. 5, 2011, 4 pages.

* cited by examiner

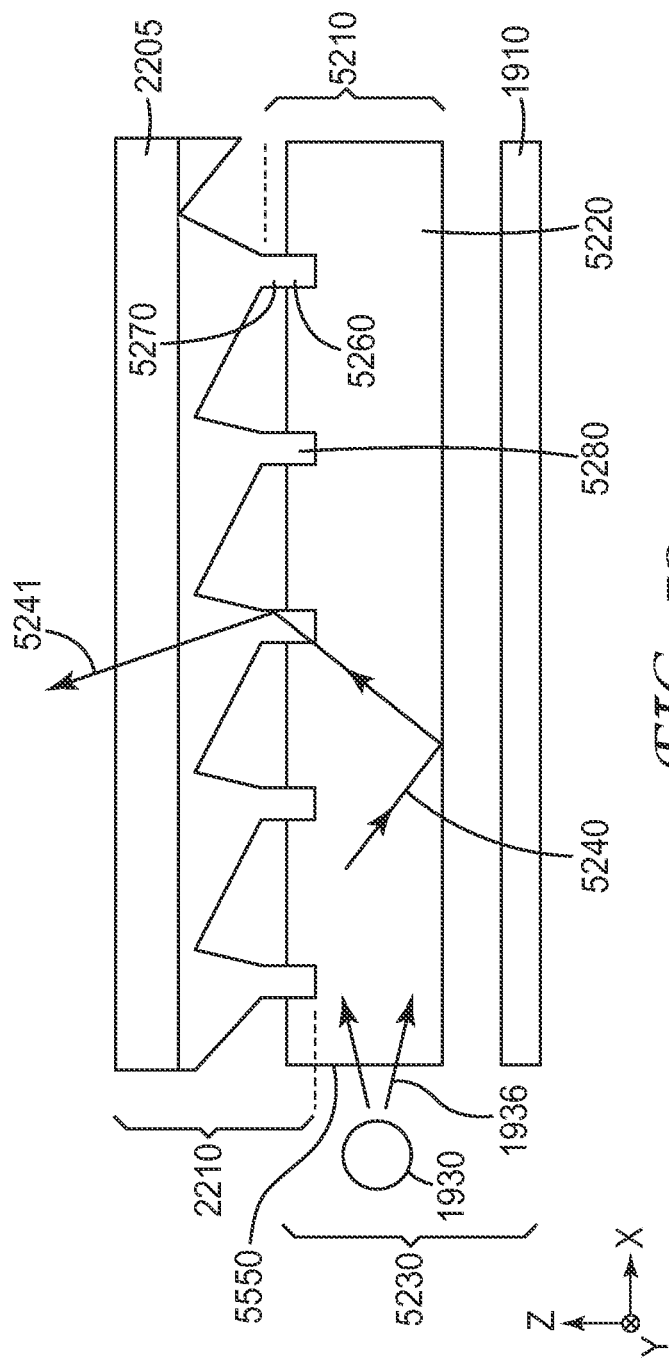

OPTICAL STACK AND LIGHTGUIDES

Cross Reference to Related Applications

This application is a national stage filing under 35 U.S.C. 371 of PCT/US2011/031904, filed Apr. 11, 2011, which claims priority to U.S. Provisional Application Nos. 61/323,147, filed Apr. 12, 2010, 61/323,128, filed Apr. 12, 2010, and 61/323,163, filed Apr. 12, 2010, the disclosures of which are incorporated by reference in their entirety herein.

RELATED APPLICATIONS

This application is related to the following U.S. patent applications, filed on even date herewith and which are incorporated by reference: U.S. Provisional Patent Application No. 61/323,128 entitled "Light Directing Film", and U.S. Provisional Patent Application No. 61/323,147 entitled "Optical Stack".

FIELD OF THE INVENTION

This invention generally relates to optical stacks, light guides, and displays incorporating same. In particular, the invention relates to optical stacks that have reduced thickness and high peel strength with no or very little loss in optical properties.

BACKGROUND

Flat panel displays, such as displays that incorporate a liquid crystal panel, often incorporate one or more light directing films to enhance display brightness along a predetermined viewing direction. Such light directing films typically include a plurality of linear microstructures that have prismatic cross-sectional profiles.

In some applications a single prismatic film is used, while in others two crossed prismatic films are employed, in which case, the two crossed prismatic films are often oriented normal to each other.

SUMMARY OF THE INVENTION

Generally, the present invention is related to optical stacks and lightguides. In one embodiment, an optical stack includes a first optical stack that includes a first optical adhesive layer and a reflective polarizer layer that is disposed on the first optical adhesive layer. The reflective polarizer layer substantially reflects light of a first polarization state and substantially transmits light of a second polarization state orthogonal to the first polarization state. The optical stack also includes a second optical stack that includes a second optical adhesive layer, a low index layer that is disposed on the second optical adhesive layer and includes a plurality of voids that are dispersed in a binder, and a light directing film that is disposed on the low index layer and includes a plurality of unitary discrete structures. Portions of each unitary discrete structure penetrate into the first optical adhesive layer. Portions of each unitary discrete structure do not penetrate into the first optical adhesive layer. Each unitary discrete structure defines a penetration depth and a penetration base at the interface between the penetrating and non-penetrating portions of the unitary discrete structure. The penetration base has a minimum penetration base dimension. The plurality of unitary discrete structures has an average penetration depth and an average minimum penetration base dimension. The ratio of the average penetration depth to the average minimum penetration base dimension is at least 1.5. The peel strength between the first and second optical stacks is greater than about 30 grams/inch. In some cases, substantial portions of each two neighboring major surfaces in each of the first and second optical stacks are in physical contact with each other. In some cases, at least 50%, or at least 70%, or at least 90%, of each two neighboring major surfaces in each of the first and second optical stacks are in physical contact with each other. In some cases, the effective index of refraction of the low index layer is not greater than about 1.3, or about 1.25, or about 1.2, or about 1.15, or about 1.05. In some cases, the optical haze of the low index layer is not greater than about 5%, or about 4%, or about 3%, or about 2%, or about 1%. In some cases, the optical haze of the low index layer is not less than about 10%, or about 20%, or about 30%, or 40%, or about 50%. In some cases, the low index layer has a thickness that is not less than about 1 micron, or 2 microns. In some cases, the low index layer includes a plurality of particles. In some cases, the low index layer include a plurality of interconnected voids that are dispersed in a binder. In some cases, the first optical stack further includes a light diffusing layer that is disposed on the reflective polarizer layer.

In some cases, the optical stack has an average effective transmission that is not less or is less than by no more than about 10%, or about 5%, as compared to an optical stack that has the same construction except that no unitary discrete structure penetrates into the first optical adhesive layer. In some cases, the ratio of the average penetration depth to the average minimum penetration base dimension is at least 2, or at least 3, or at least 4, or at least 5, or at least 7, or at least 10. In some cases, each unitary discrete structure has a base and a minimum base dimension, where the plurality of unitary discrete structures has an average minimum base dimension, and where the average minimum penetration base dimension is less than about 10%, or about 8%, or about 6%, or about 5%, or about 4%, or about 3%, of the average minimum base dimension. In some cases, an illumination system includes a lightguide and the optical stack disposed on and adhering to the lightguide. The low index layer facilitates propagation of light within the lightguide by at least one of total internal reflection and enhanced internal reflection. In some cases, the lightguide includes a plurality of light extractors for extracting light that propagates within the lightguide by total internal reflection from the lightguide. In some cases, a display system includes an image forming panel, a back reflector, and the optical stack disposed between the image forming panel and the back reflector.

In another embodiment, an optical stack includes a first optical adhesive layer, a low index layer that is disposed on the first optical adhesive layer and includes a plurality of voids dispersed in a binder, a light directing film that is disposed on the low index layer and includes a plurality of unitary discrete structures, and a second optical adhesive layer that is disposed on the light directing film. Portions of each unitary discrete structure penetrate into the second optical adhesive layer. Portions of each unitary discrete structure do not penetrate into the second optical adhesive layer. Each unitary discrete structure defines a penetration depth and a penetration base at the interface between the penetrating and non-penetrating portions of the unitary discrete structure. The penetration base has a minimum penetration base dimension. The plurality of unitary discrete structures has an average penetration depth and an average minimum penetration base dimension. The ratio of the average penetration depth to the average minimum penetration base dimension is at least 1.5. The peel strength between the light directing film and the second optical adhesive layer is greater than about 30 grams/ inch. In some cases, the optical stack has an average effective transmission that is not less or is less than by no more than about 10% as compared to an optical stack that has the same construction except that no unitary discrete structure penetrates into the second optical adhesive layer. In some cases, each unitary discrete structure has a base and a minimum base dimension, where the plurality of unitary discrete structures has an average minimum base dimension, and where the average minimum penetration base dimension is less than about 10% of the average minimum base dimension.

In another embodiment, a lightguide includes a lightguide layer that is for propagating light across the lightguide layer by total internal reflection, and a plurality of discrete light extractors that are disposed on the lightguide layer. Each discrete light extractor is partially embedded in the lightguide layer for extracting light that propagates within the lightguide layer by total internal reflection from the lightguide layer. In some cases, each discrete light extractor in the plurality of discrete light extractors has a portion that is not embedded in the lightguide layer. In some cases, the index of refraction of each discrete light extractor in the plurality of discrete light extractors is different than the index of refraction of the lightguide layer. In some cases, the index of refraction of each discrete light extractor in the plurality of discrete light extractors is equal to the index of refraction of the lightguide layer. In some cases, the lightguide includes an optical film that is disposed on the lightguide layer and includes the plurality of discrete light extractors.

BRIEF DESCRIPTION OF DRAWINGS

The invention may be more completely understood and appreciated in consideration of the following detailed description of various embodiments of the invention in connection with the accompanying drawings, in which:

FIG. 52 is a schematic side-view of a lightguide.

In the specification, a same reference numeral used in multiple figures refers to the same or similar elements having the same or similar properties and functionalities.

DETAILED DESCRIPTION

The present invention generally relates to light directing films and displays that incorporate such light directing films. In particular, the invention relates to a light directing film that has a plurality of unitary discrete structures for directing and/or recycling light. The light directing film can bond to a surface, such as a major surface of an optical film or glass, via an optical adhesive layer, where the unitary discrete structures partially penetrate into the optical adhesive layer with no or very little loss in optical properties, such as optical gain or effective optical transmission.

Figure 1:
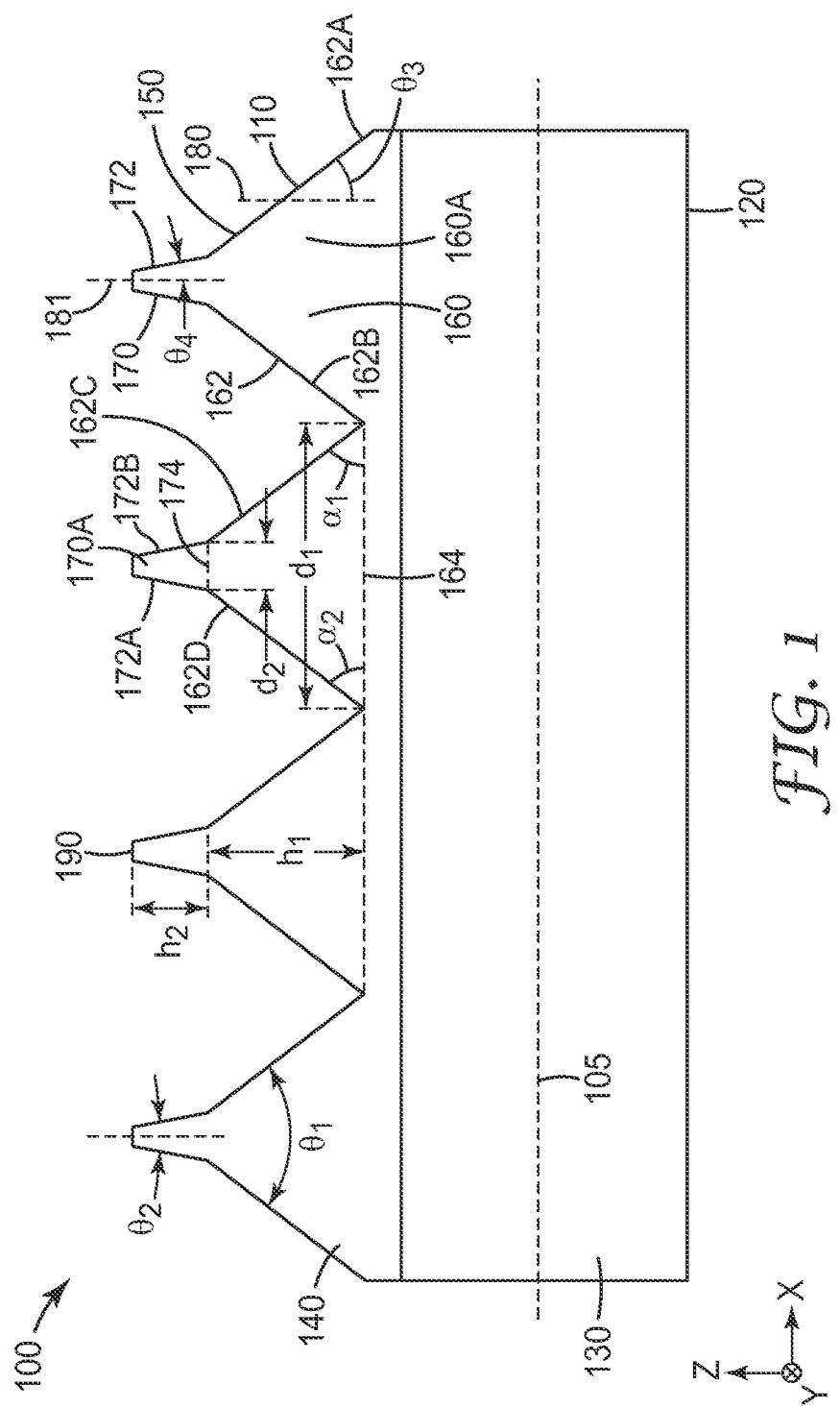
FIG. 1 is a schematic side-view of a light directing film.

FIG. 1 is a schematic side-view of a light directing film 100 that includes a first structured major surface 110 and an opposing second major surface 120. First structured major surface 110 includes a plurality of unitary discrete structures 150. Each unitary discrete structure 150 includes an upper portion or bonding portion 170 and a lower portion or light directing portion 160. As used herein, a unitary structure refers to a structure that is a single unit with no interior or internal physical or detectable interfaces between the different portions or segments of the structure. In other words, a unitary structure does not include any interfaces, such as a sharp interface, a gradient interface, or a distributed interface, within the interior of the structure. In some cases, a unitary structure is made of the same material composition meaning that different locations or portions within the structure have the same material composition and the same index of refraction. In some cases, a unitary structure can have a non-uniform material composition or index of refraction distribution. For example, in some cases, a unitary structure can have a gradient refractive index distribution along, for example, the thickness direction of the unitary structure.

Figure 2:
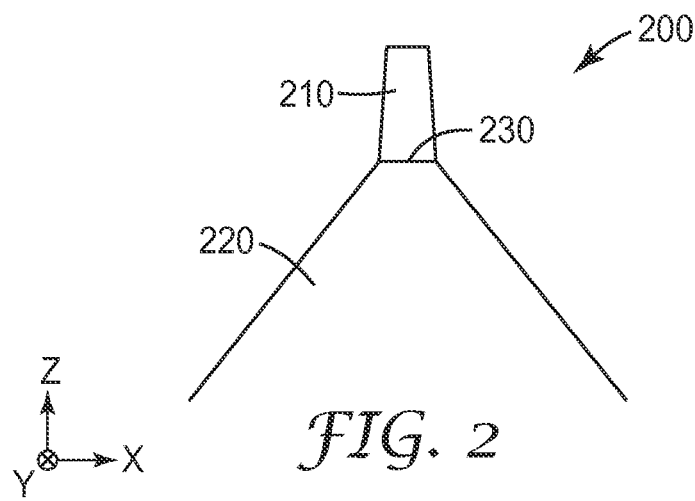
FIG. 2 is a schematic side-view of a composite structure.

For example, each unitary discrete structure 150 includes an upper portion 170 and a lower portion 160 that form a single unit without a physical or detectable interface between the upper and lower portions. As another example, FIG. 2 is a schematic side-view of a composite structure 200 that includes an upper portion 210 that is disposed on a lower portion 220, but is separated from the lower portion by a physical interface 230. Hence, exemplary composite structure 200 includes an internal and physical interface that physically separates two different portions in the composite structure. In some cases, portions 210 and 220 can have the same material composition. In such cases, structure 200 is still considered to be non-unitary if interface 230 can be detected between the two portions. A unitary structure is typically made or fabricated in a single step, meaning that the process of fabricating the unitary structure cannot reasonably be divided into multiple or separate steps. In some cases, however, a unitary structure can be made or fabricated in two or more steps. A non-unitary or composite structure is typically made in multiple steps. For example, composite structure 200 is made by first making lower portion 220 and then forming upper portion 210 on the lower portion.

Referring back to FIG. 1, unitary discrete structures 150 can have any shape, such as any regular or irregular shape, that may be desirable in an application. For example, in some cases, unitary discrete structures 150 can be or include a three-dimensional rectilinear body, such as a tetrahedron, a prism, or a pyramid, or a portion, or a combination, of such bodies, such as a frustum. In some cases, unitary discrete structures 150 can be or include a three-dimensional curvilinear body, such as a segment of a sphere, an asphere, an ellipsoid, a spheroid, a paraboloid, a cone, or a cylinder. In some cases, at least some of the unitary discrete structures 150 have prismatic profiles.

Unitary structures 150 are discrete, meaning that each unitary structure can be identified individually and as being separate from other similar unitary structures disposed on substrate 130. Each unitary discrete structure 150 includes light directing portion 160 that is primarily designed to direct light. Light directing portion 160 can also be designed to perform other functions, but the primary function of the light directing portion is to redirect light by, for example, refracting or reflecting, such as totally internally reflecting, light.

In general, light directing portion 160 can have any shape, such as any regular or irregular shape, that may be desirable in an application. For example, in some cases, light directing portion 160 can be or include a three-dimensional rectilinear body, such as a tetrahedron, a prism, or a pyramid, or a portion, or a combination, of such bodies, such as a frustum. In some cases, light directing portion 160 can be or include a three-dimensional curvilinear body, such as a segment of a sphere, an asphere, an ellipsoid, a spheroid, a paraboloid, a cone, or a cylinder. In some cases, light directing portions 160 can have a rotationally symmetric bullet-shape structure.

Figure 3:
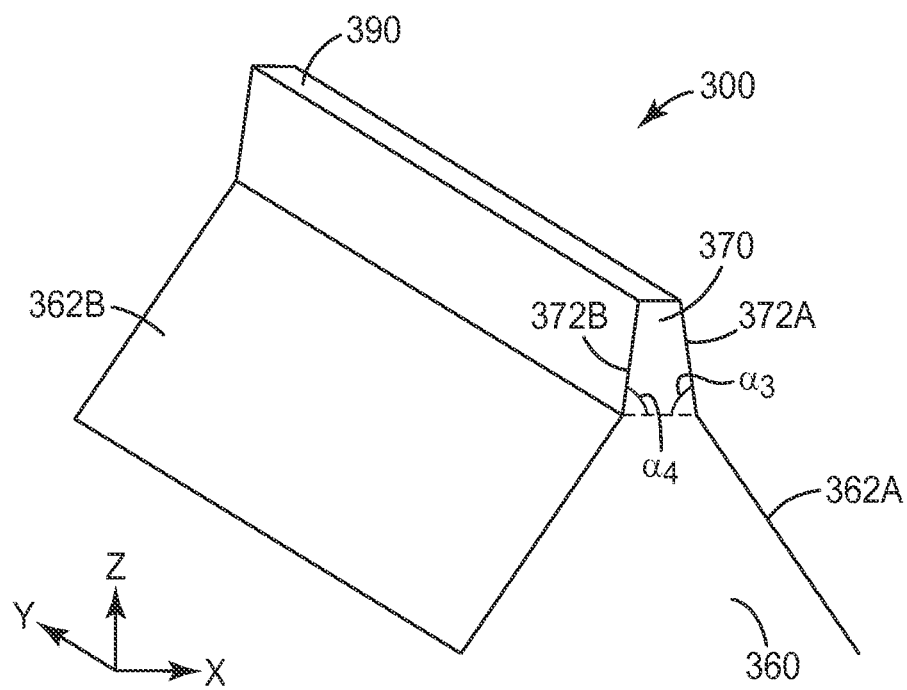
FIG. 3 is a schematic three-dimensional view of a unitary discrete structure.
Figure 4:
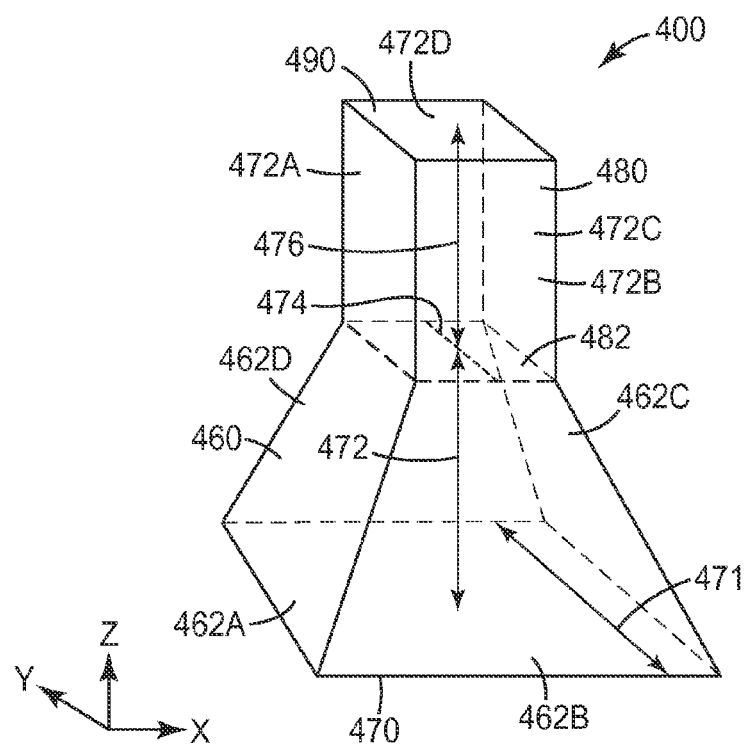
FIG. 4 is a schematic three-dimensional view of another unitary discrete structure.

Light directing portion 160 includes a plurality of first side facets 162. For example, in the exemplary light directing film 100, light directing portion 160A includes a first side facet 162A and an opposing first side facet 162B. In general, light directing portion 160 can have two or more side facets. For example, FIG. 3 is a schematic three-dimensional view of a unitary discrete structure 300 that is linear and extends along the y-axis or y-direction. Unitary discrete structure 300 includes a light directing portion 360 that includes opposing side facets 362A and 362B. In some cases, unitary discrete structure 300 can have in-plane (xy-plane) serpentine variations. As another example, FIG. 4 is a schematic three-dimensional view of a unitary discrete structure 400 that includes a light directing portion 460 that includes four first side facets: two opposing first side facets 462A and 462C, and two opposing first side facets 462B and 462D.

Figure 5:
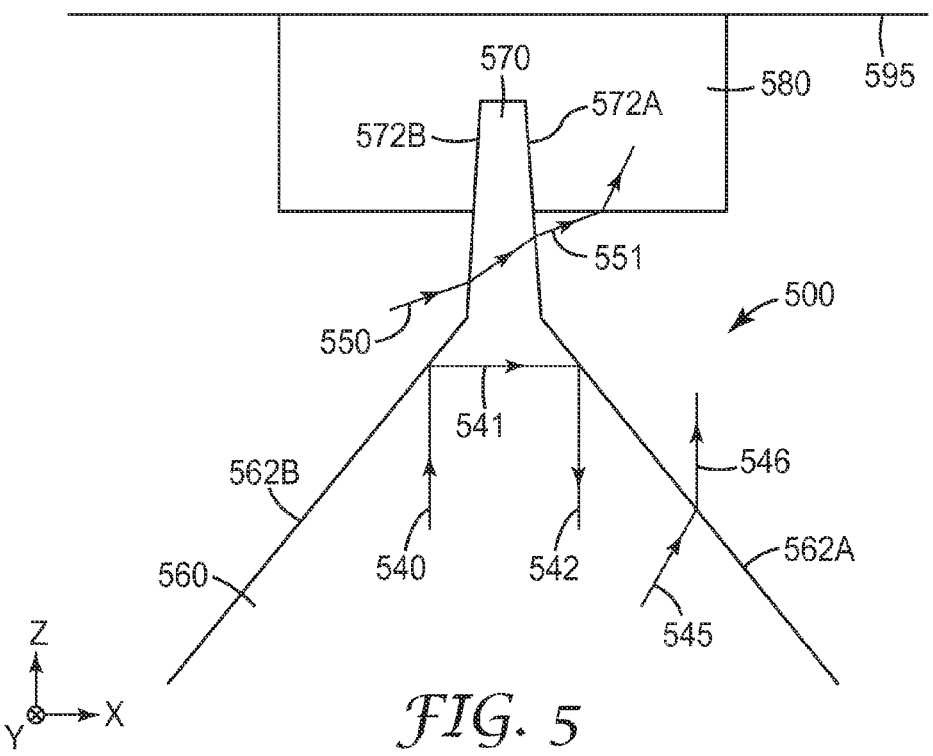
FIG. 5 is a schematic side-view of a unitary discrete structure partially penetrating an optical layer.

The light directing portions of the unitary discrete structures disclosed herein are primarily designed to redirect light by, for example, refraction or reflection. For example, FIG. 5 is a schematic side-view of a unitary discrete structure 500 that includes an upper or bonding portion 570 and a lower or light directing portion 560 that includes first side facets 562A and 562B and is primarily designed to direct light. For example, light directing portion 560 directs a light ray 540 as light ray 542 by first totally internally reflecting light ray 540 at side facet 562B as light ray 541 and then totally internally reflecting light ray 541 as light ray 542 at side facet 562A. As another example, light directing portion 560 directs light ray 545 as light ray 546 by refracting light ray 545 at side facet 562A.

Referring back to FIG. 1, each light directing portion 160 of unitary discrete structure 150 of light directing film 100 has a base that is the largest cross-section of the light directing portion that is parallel to the plane of the light directing film and is bound by the side facets of the light directing portion. For example, light directing portion 160 has a base 164 that is the largest cross-section of the light directing portion in a direction parallel to a plane 105 of the light directing film and is bound by side facets 162C and 162D. The exemplary light directing film 100 defines a plane 105 of the light directing film that is in the xy-plane.

Figure 6:
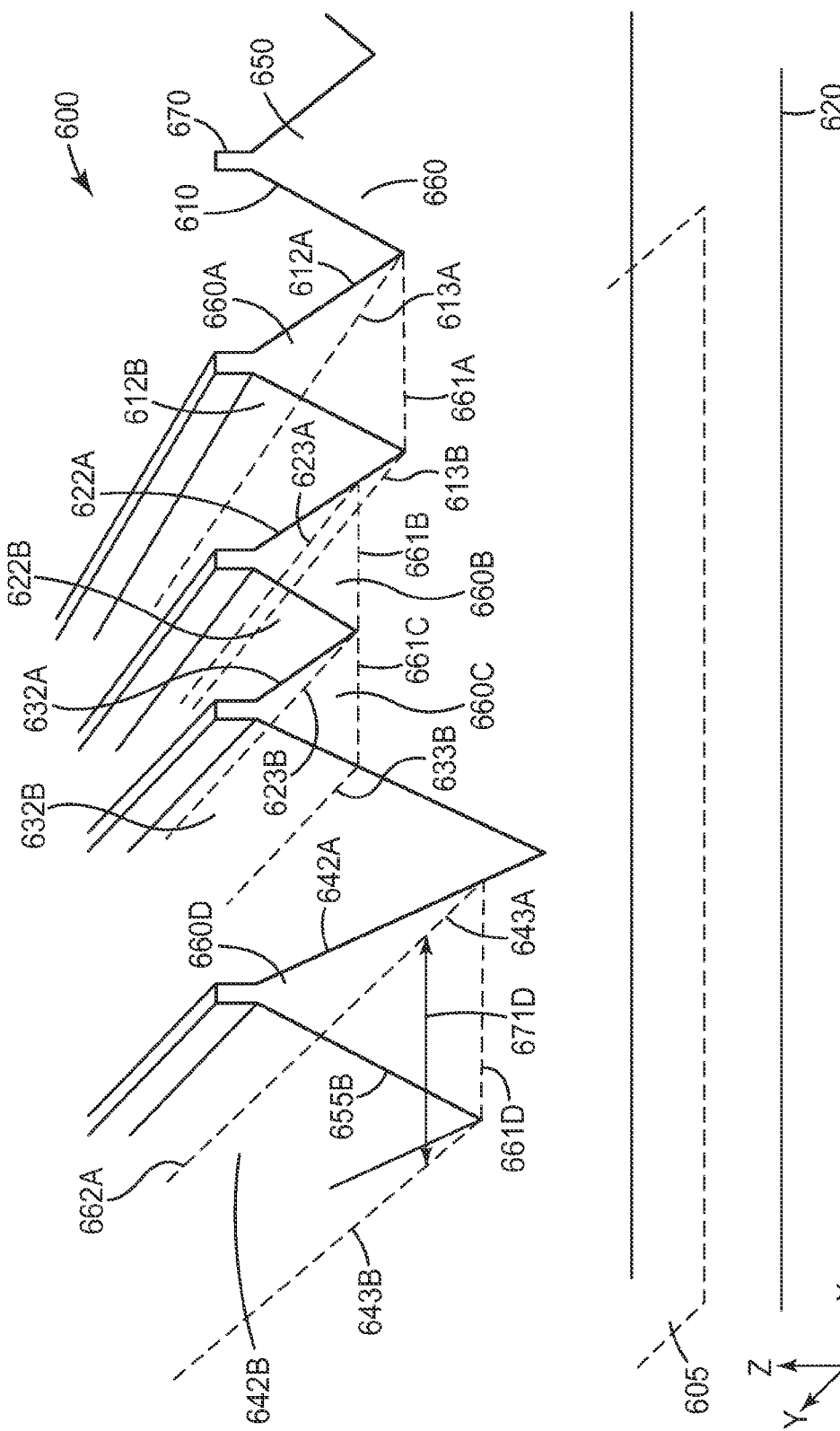
FIG. 6 is a schematic three-dimensional view of a light directing film.

As another example, FIG. 6 is a schematic three-dimensional view of a light directing film 600 that includes a first structured major surface 610 and an opposing second major surface 620. Light directing film 600 defines a plane 605 that is the plane of the light directing film, where in the exemplary light directing film 600, plane 605 is parallel to the xy-plane. In general, light directing film 600 is capable of generally defining plane 605 even though the light directing film has a major surface 610 that is structured. Structured major surface 610 includes a plurality of unitary discrete structures 650, where at least some structures 650 include a light directing portion 660 and a bonding portion 670 that is disposed on the light directing portion. Each light directing portion 660 is a linear structure that extends along the y-direction and includes two definable side facets that also extend along the y-axis or direction. Each light directing portion 660 has a base that is the largest cross-section of the light directing portion in the direction parallel to plane 605 and is bound by all the side facets of the light directing portions that are capable of being defined or identified. For example, light directing portion 660A includes a rectangular base 661A that is bound on one side by a side facet 612A defining an edge 613A of the base and on the other side by a side facet 612B defining an edge 613B of the base, light directing portion 660B includes a rectangular base 661B that is bound on one side by a side facet 622A defining an edge 623A of the base and on the other side by a side facet 622B defining an edge 623B of the base, light directing portion 660C includes a rectangular base 661C that is bound on one side by a side facet 632A defining edge 623B of the base and on the other side by a side facet 632B defining an edge 633B of the base, and light directing portion 660D includes a rectangular base 661D that is bound on one side by a side facet 642A defining an edge 643A of the base and on the other side by a side facet 642B defining an edge 643B of the base.

Figure 7:
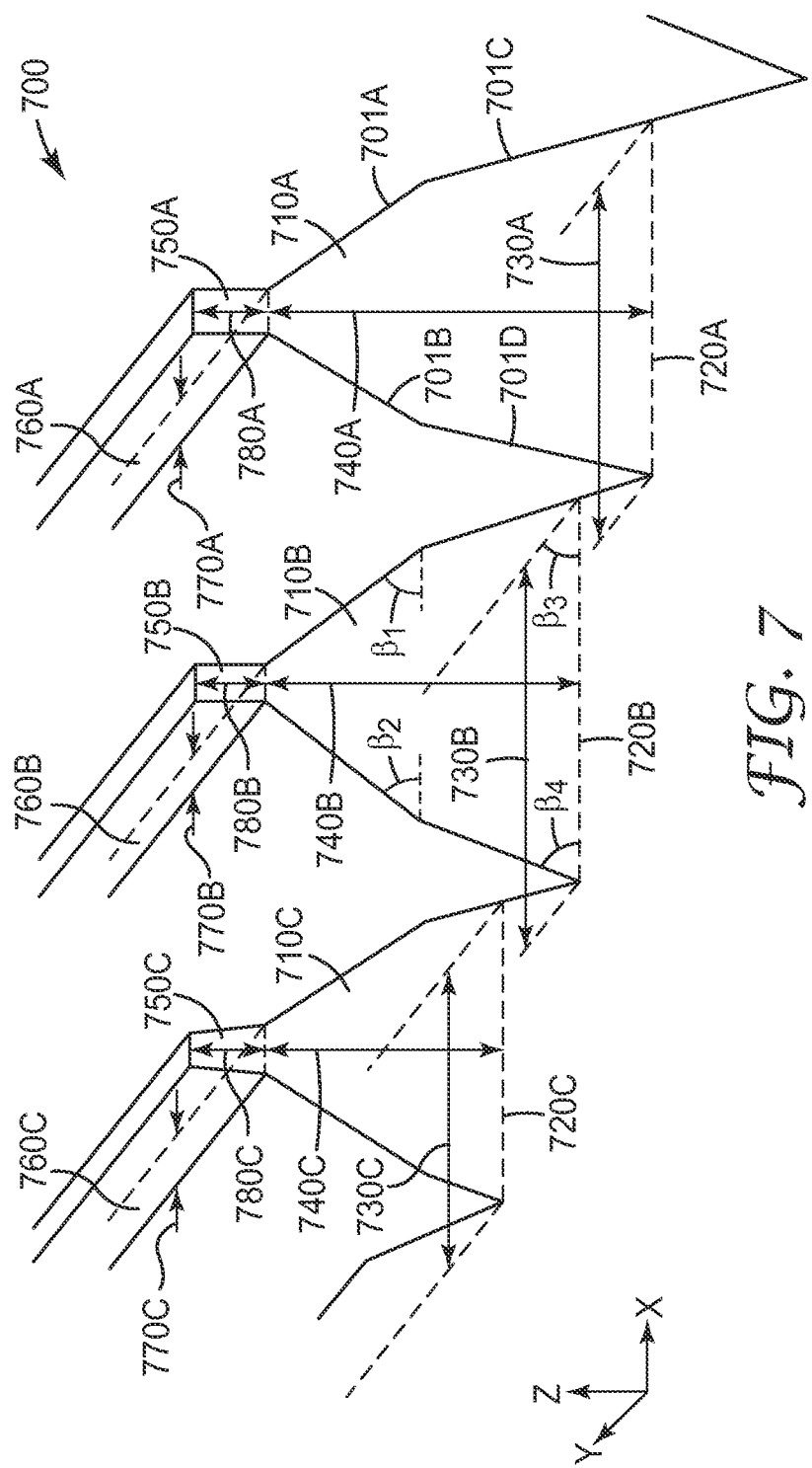
FIG. 7 is a schematic three-dimensional view of another light directing film.

As another example, FIG. 7 is a schematic three-dimensional view of a light directing film 700 that includes a light directing portion 710A that has a base 720A, a light directing portion 710B that has a base 720B, and a light directing portion 710C that has a base 720C.

Referring back to FIG. 1, base 164 includes a minimum dimension $d_1$ that, in the exemplary light directing film 100, is along the x-direction. For example, referring to FIG. 6, base 661D of light directing portion 660D has a minimum dimension 671D that is along the x-direction. As another example, referring to FIG. 4, light directing portion 460 has a base 470 in the xy-plane that includes a minimum dimension 471 along the y-direction. As yet another example, referring to FIG. 7, base 720A has a minimum dimension 730A that is along the x-direction, base 720B has a minimum dimension 730B that is along the x-direction, and base 720C has a minimum dimension 730C that is along the x-direction.

In general, the minimum dimension of the base of a light directing portion can be any value or size that may be desirable in an application. For example, in some cases, the minimum dimension $d_1$ can be less than about 500 microns, or less than about 400 microns, or less than about 350 microns, or less than about 300 microns, or less than about 250 microns, or less than about 200 microns, or less than about 150 microns, or less than about 100 microns, or less than about 90 microns, or less than about 80 microns, or less than about 70 microns, or less than about 60 microns, or less than about 50 microns, or less than about 40 microns, or less than about 30 microns, or less than about 20 microns.

Figure 8A:
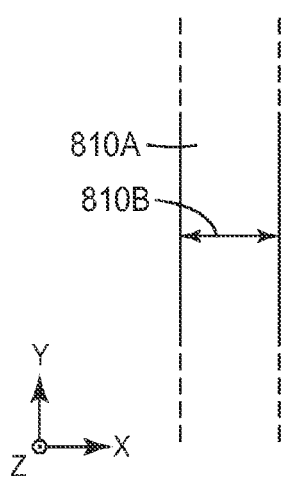
FIGS. 8A-8E are schematic top-view of bases of different structures.
Figure 8B:
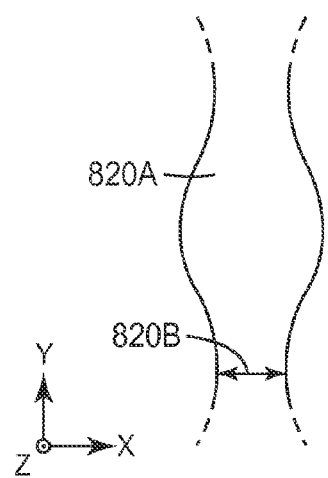
Figure 8C:
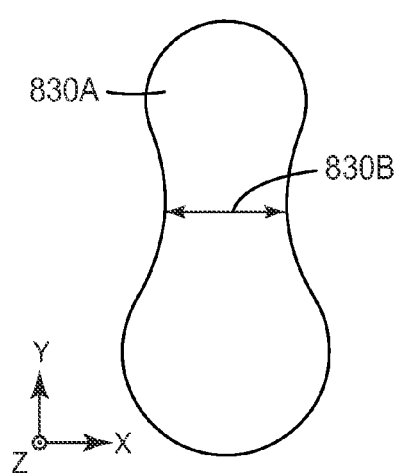
Figure 8D:
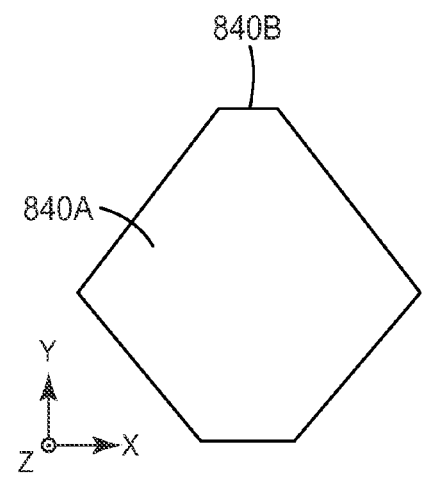
Figure 8E:
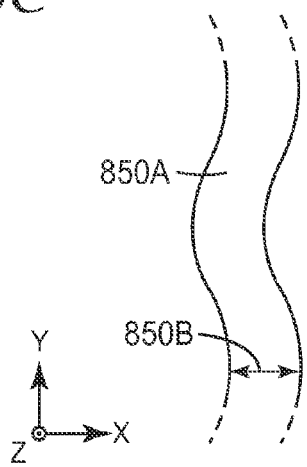

In general, the base of a light directing portion can have any shape, such as any regular or irregular shape, and any size minimum dimension that may be desirable in an application. For example, FIG. 8A is a schematic top-view of a linear base 810A that extends along the y-direction and has a minimum dimension 810B, FIG. 8B is a schematic top-view of a linear base 820A that extends along the y-direction and has a minimum dimension 820B, FIG. 8C is a schematic top-view of a base 830A that has a minimum dimension 830B, FIG. 8D is a schematic top-view of a hexagonal base 840A that has a minimum dimension 840B, and FIG. 8E is a schematic top-view of a linear base 850A that extends along the y-direction and has a minimum dimension 850B. In general, a base of a light directing portion can be linear meaning that the dimension, such as the average dimension, of the base along the linear direction of the base is substantially larger than the dimension, such as the average dimension, of the base along the orthogonal direction. For example, in such cases, the ratio of the average dimension of the base along the linear direction to the average dimension of the base along the orthogonal direction is at least about 10, or at least about 50, or at least about 100, or at least about 500, or at least about 1000. In some cases, such as when the ratio of the average dimension of the base along the linear direction to the average dimension of the base along the orthogonal direction is at least about 10,000, the base and the light directing portion and unitary discrete structure associated with the base can be considered to have an infinite or unlimited extent or dimension along the linear direction and a finite or limited extent or dimension along the orthogonal direction. In some cases, the base of a light direction portion can be in the shape of a rectilinear figure, such as a polygon. In some cases, the polygon can be an irregular polygon, such as a rectangle, or a regular polygon, such as an equilateral triangle, a square, a regular hexagon, or a regular octagon. In some cases, the base can be a trapezium, a trapezoid, a parallelogram, a rhombus, or deltoid. In some cases, the base can be in the shape of a curvilinear figure, such as a circle, an ellipse, or a parabola.

Figure 9:
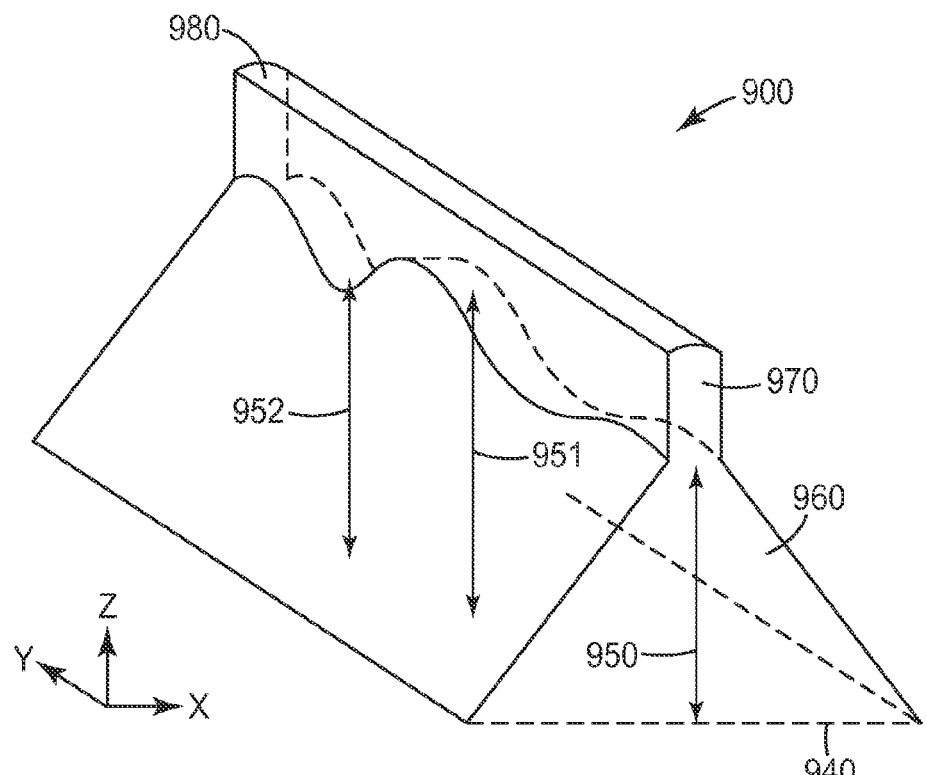
FIG. 9 is a schematic three-dimensional view of a unitary discrete structure.

Referring back to FIG. 1, light directing portion 160 has a maximum height $h_1$ which is the maximum dimension or distance between base 164 and bonding portion 170 in a direction that is perpendicular to base 164 or plane 105. For example, referring to FIG. 4, light directing portion 460 has a maximum height 472 that is along the z-direction and is the largest distance between base 470 and bonding portion 480 along the z-axis. As another example, referring to FIG. 7, light directing portion 710A has a maximum height 740A along the z-direction, light directing portion 710B has a maximum height 740B along the z-direction, and light directing portion 710C has a maximum height 740C along the z-direction. In general, the height of the light directing portions disclosed herein can vary along one or more directions. For example, FIG. 9 is a schematic three-dimensional view of a linear unitary discrete structure 900 that extends along the y-direction and includes a light directing portion 960 and a bonding portion 970 disposed on the light directing portion. Light directing portion 960 has a base 940 that lies in the xy-plane and extends along the y-direction, and a height 950 that is the distance between base 940 and bonding portion 970 along the z-direction. Height 950 varies along the y-direction. Light directing portion 960 has a maximum height 951 which is the largest distance between base 940 and bonding portion 970 along the z-direction, and a minimum height 952 which is the smallest distance between base 940 and bonding portion 970 along the z-direction.

In some cases, each first side facet of a light directing portion makes an angle with the plane of the light directing film that is in a range from about 30 degrees to about 60 degrees. For example, in light directing film 100, side facet 162C makes an angle $\alpha_1$ with plane 105 of the light directing film and side facet 162D makes an angle $\alpha_2$ with plane 105 of the light directing film, where each of $\alpha_1$ and $\alpha_2$ is in a range from about 30 degrees to about 60 degrees. As another example, referring to FIG. 7, light directing portion 710B includes four side facets that make angles $\beta_1$, $\beta_2$, $\beta_3$ and $\beta_4$ with base 720B, where each of the four angles $\beta_1$-$\beta_4$ can be in a range from about 30 degrees to about 60 degrees. In some cases, each first side facet of a light directing portion makes an angle with the plane of the light directing film that is in a range from about 35 degrees to about 55 degrees, or from about 40 degrees to about 50 degrees, or from about 41 degrees to about 49 degrees, or from about 42 degrees to about 48 degrees, or from about 43 degrees to about 47 degrees, or from about 44 degrees to about 46 degrees. In some cases, each first side facet of a light directing portion makes an angle with the plane of the light directing film that is about 45 degrees. For example, in some cases, each of angles $\alpha_1$ and $\alpha_2$ can be about 45 degrees.

Referring back to FIG. 1, unitary discrete structure 150 includes bonding portion 170 that is primarily designed to bond the light directing film to a surface. In some cases, bonding portion 170 can also perform, or be designed to perform, other functions, but the primary function of the light directing portion is to bond the light directing film to a neighboring surface via, for example, an adhesive layer. Bonding portion 170 is disposed on light directing portion 160. Bonding portion 170 is also disposed on and between side facets 162. For example, bonding portion 170A is disposed on and between side facets 162C and 162D.

In general, bonding portion 170 can have any shape, such as any regular or irregular shape, that may be desirable in an application. For example, in some cases, bonding portion 170 can be or include a three-dimensional rectilinear body, such as a tetrahedron, a prism, or a pyramid, or a portion, or a combination, of such bodies, such as a frustum. In some cases, bonding portion 170 can be or include a three-dimensional curvilinear body, such as a segment of a sphere, an asphere, an ellipsoid, a spheroid, a paraboloid, a cone, or a cylinder.

Bonding portion 170 includes a plurality of side facets 172. For example, in the exemplary light directing film 100, bonding portion 170A includes a side facet 172A and an opposing side facet 172B. In general, bonding portion 170 can have two or more side facets. For example, referring to FIG. 3, a unitary discrete structure 300 includes a bonding portion 370 that includes opposing side facets 372A and 372B. As another example, referring to FIG. 4, unitary discrete structure 400 includes a bonding portion 480 that includes four side facets: two opposing side facets 472A and 472C, and two opposing side facets 472B and 472D.

The bonding portions of the unitary discrete structures disclosed herein are primarily designed to bond the light directing portions to a neighboring surface. For example, referring to FIG. 5, unitary discrete structure 500 includes bonding portion 570 that includes side facets 572A and 572B and bonds or attaches light directing portion 560 to a neighboring surface 595 via an optical adhesive layer 580. The primary function of bonding portion 570 is to bond unitary discrete structure 500 or light directing portion 560 to surface 595. In some cases or applications, bonding portion 570 can also direct light. For example, bonding portion 570 can direct a light ray 550 as a light ray 551, but such light directing function is not the primary function of the bonding portion. Rather, the light directing function is a secondary function of the bonding portion.

Figure 10:
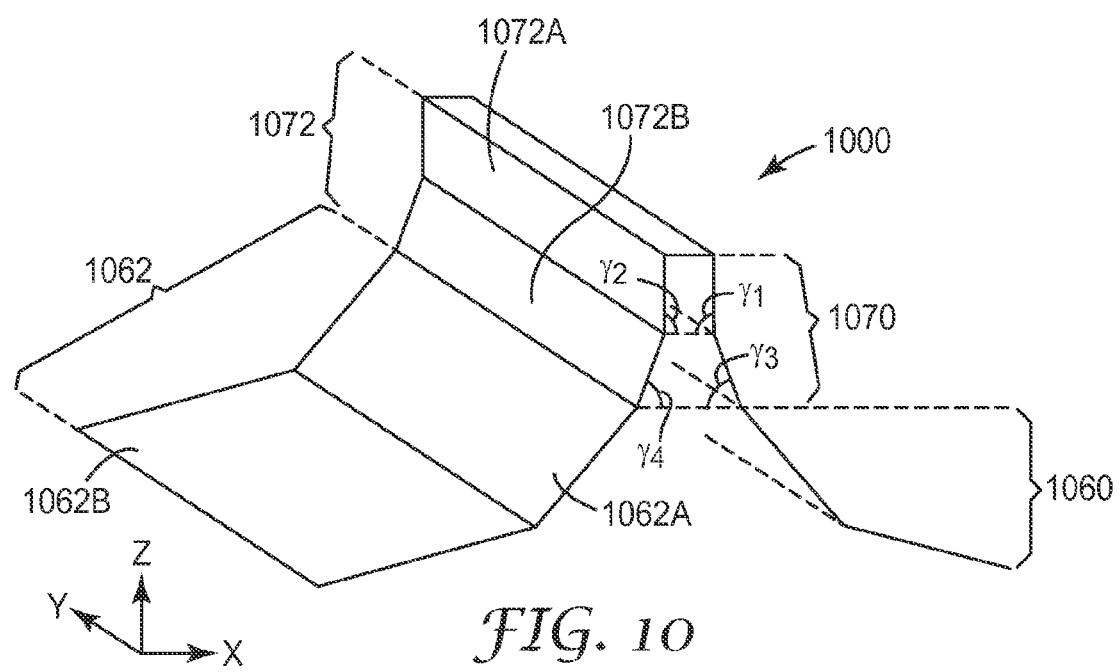
FIG. 10 is a schematic three-dimensional view of another unitary discrete structure.

The bonding portions and light directing portions of the unitary discrete structures disclosed herein have multiple or pluralities of side facets. In general, a side facet disclosed herein can have any shape, such as any regular or irregular shape, that may be desirable in an application. For example, in some cases, a side facet can be or include a planar portion. For example, referring to FIG. 4, side facets 462A-462D of light directing portion 460 and side facets 472A-472D of bonding portion 480 are planar. In some cases, a side facet can be piecewise planar. For example, FIG. 10 is a schematic three-dimensional view of a unitary discrete structure 1000 that includes a light directing portion 1060 and a bonding portion 1070 that is disposed on the light directing portion. Each of the light directing and bonding portions has a piecewise planar side facet. In particular, light directing portion 1060 includes a piecewise planar side facet 1062 that includes planar portions 1062A and 1062B, and bonding portion 1070 includes a piecewise planar side facet 1072 that includes planar portions 1072A and 1072B.

Figure 11:
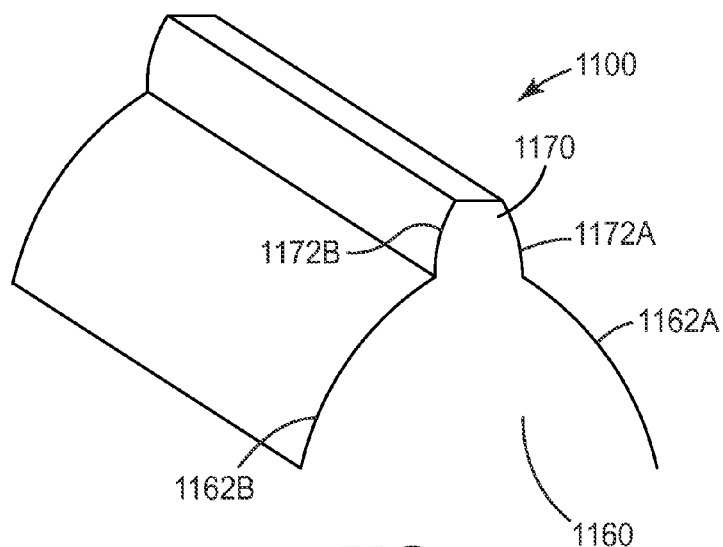
FIG. 11 is a schematic three-dimensional view of another unitary discrete structure.

In some cases, a side facet can be or include a curved portion. For example, FIG. 11 is a schematic three-dimensional view of a unitary discrete structure 1100 that includes a light directing portion 1160 and a bonding portion 1170 that is disposed on the light directing portion. Each of the light directing and bonding portions has curved side facets. In particular, light directing portion 1160 includes curved side facets 1162A and 1162B, and bonding portion 1170 includes curved side facets 1172A and 1172B.

Figure 12:
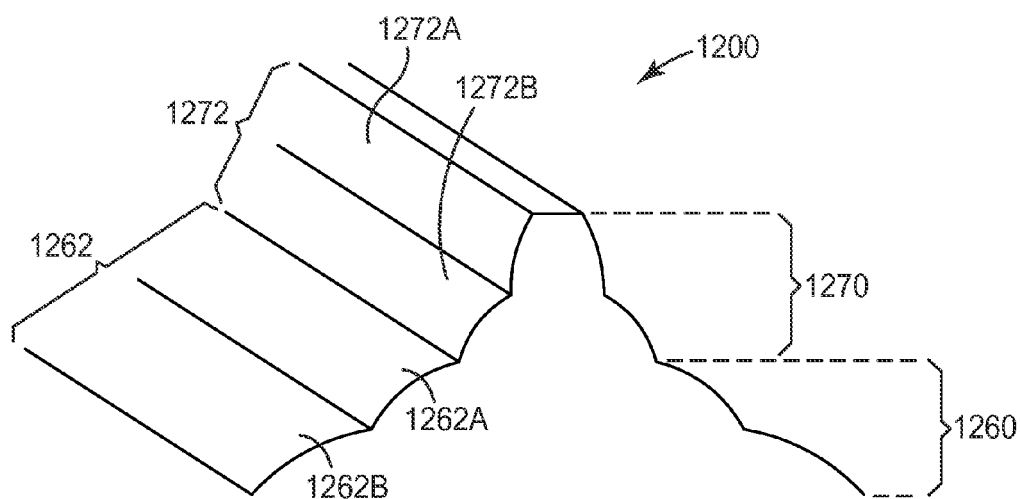
FIG. 12 is a schematic three-dimensional view of yet another unitary discrete structure.

In some cases, a side facet can be piecewise curved. For example, FIG. 12 is a schematic three-dimensional view of a unitary discrete structure 1200 that includes a light directing portion 1260 and a bonding portion 1270 that is disposed on the light directing portion. Each of the light directing and bonding portions has a piecewise curved side facet. In particular, light directing portion 1260 includes a piecewise curved side facet 1262 that includes curved portions 1262A and 1262B, and bonding portion 1270 includes a piecewise curved side facet 1272 that includes curved portions 1272A and 1272B. In some cases, a side facet of a unitary discrete structure can be planar, or piecewise planar and another side facet of the unitary discrete structure can be curved or piecewise curved.

Referring back to FIG. 1, each bonding portion 170 of unitary discrete structure 150 of light directing film 100 has a base that is the largest cross-section of the bonding portion that is parallel to the plane of the light directing film and is bound by the side facets of the bonding portion. Base 174 is bound by side facets 172. For example bonding portion 170 has a base 174 that is the largest cross-section of the bonding portion that is parallel to plane 105 of the light directing film and is bound by side facets 172A and 172B of the bonding portion. As another example, referring to FIG. 4, bonding portion 480 has a base 482 that is the largest cross-section of the bonding portion in the direction parallel to the xy-plane. Base 482 is bound by all the side facets of the light directing portions that are capable of being defined. In the exemplary unitary discrete structure 400, base 482 is rectangular and bound by side facets 472A-472D.

Figure 13:
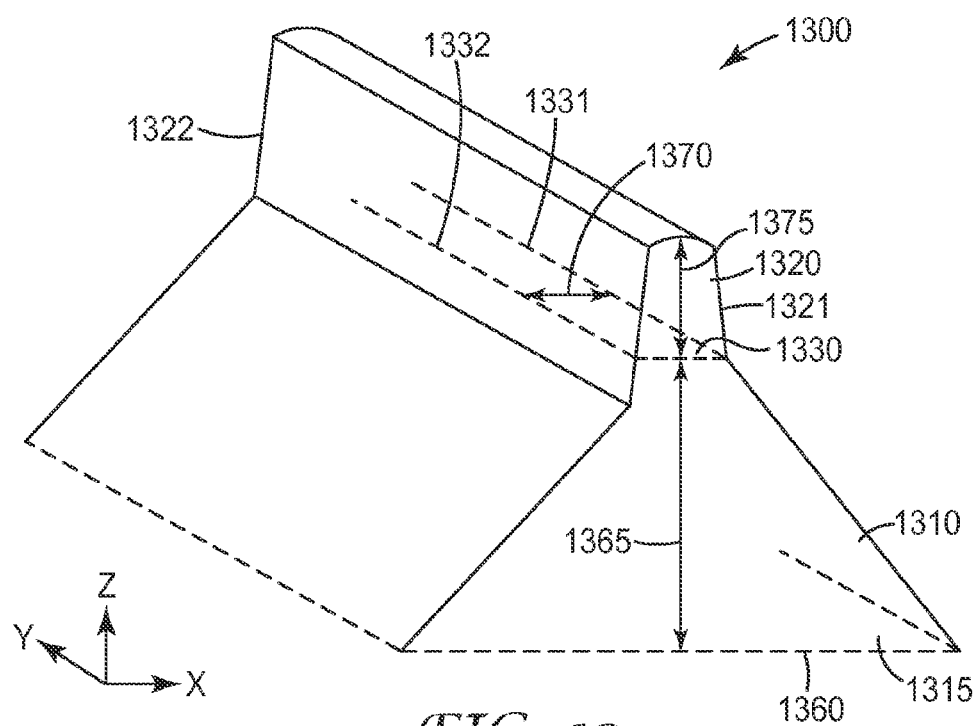
FIG. 13 is a schematic three-dimensional view of yet another unitary discrete structure.

As another example, referring to FIG. 7, light directing film 700 includes a bonding portion 750A that has a base 760A, a bonding portion 750B that has a base 760B, and a bonding portion 750C that has a base 760C. As another example, FIG. 13 is a schematic three-dimensional view of a unitary discrete structure 1300 that is linear and extends along the y-direction. The unitary discrete structure includes a light directing portion 1310 that has a base 1315 that is in the xy-plane, and a bonding portion 1320 that has a base 1330 that is the largest cross-section of the bonding portion that is parallel to the xy-plane and is bound by side facet 1321 defining an edge 1331 of the base and side facet 1322 defining an edge 1332 of the base.

Referring back to FIG. 1, base 174 includes a minimum dimension $d_2$ that, in the exemplary light directing film 100, is along the x-direction. For example, referring to FIG. 4, base 482 has a minimum dimension 474 that is along the y-direction. As another example, referring to FIG. 7, base 760A has a minimum dimension 770A that is along the x-direction, base 760B has a minimum dimension 770B that is along the x-direction, and base 760C has a minimum dimension 770C that is along the x-direction.

In general, a base of a bonding portion can have any shape, such as any regular or irregular shape, and any size minimum dimension that may be desirable in an application. For example, linear base 810 in FIG. 8A can be the base of a bonding portion that extends along the y-direction and has a minimum dimension 810B, linear base 820A in FIG. 8B can be the base of a bonding portion that extends along the y-direction and has a minimum dimension 820B, base 830A in FIG. 8C can be the base of a bonding portion that has a minimum dimension 830B, base 840A in FIG. 8D can be the base of a bonding portion that has a minimum dimension 840B, and linear base 850A in FIG. 8E can be the base of a bonding portion that extends along the y-direction and has a minimum dimension 850B. In general, the base of a bonding portion can be linear meaning that the dimension, such as the average dimension, of the base along the linear direction of the base is substantially larger than the dimension, such as the average dimension, of the base along the orthogonal direction. For example, in such cases, the ratio of the average dimension of the base along the linear direction to the average dimension of the base along the orthogonal direction is at least about 10, or at least about 50, or at least about 100, or at least about 500, or at least about 1000. In some cases, such as when the ratio of the average dimension of the base along the linear direction to the average dimension of the base along the orthogonal direction is at least about 10,000, the base, the bonding portion and the unitary discrete structure associated with the base can be considered to have an infinite or unlimited extent or dimension along the linear direction and a finite or limited extent or dimension along the orthogonal direction. In some cases, the base of a bonding portion can be in the shape of a rectilinear figure, such as a polygon. In some cases, the polygon can be an irregular polygon, such as a rectangle, or a regular polygon, such as an equilateral triangle, a square, a regular hexagon, or a regular octagon. In some cases, the base can be a trapezium, a trapezoid, a parallelogram, a rhombus, or deltoid. In some cases, the base can be in the shape of a curvilinear figure, such as a circle, an ellipse, or a parabola.

Figure 14:
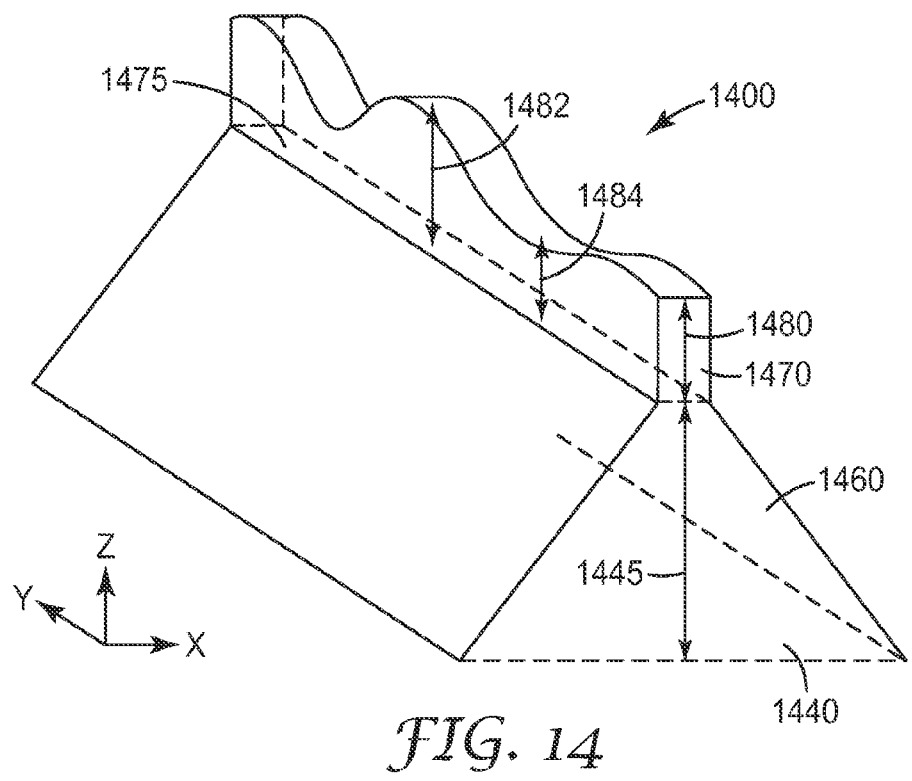
FIG. 14 is a schematic three-dimensional view of yet another unitary discrete structure.

Referring back to FIG. 1, bonding portion 170 has a maximum height $h_2$ which is the maximum dimension or distance between base 174 and the top of the bonding portion in a direction that is perpendicular to base 174 or plane 105 of the light directing film. For example, referring to FIG. 4, bonding portion 480 has a maximum height 476 that is along the z-direction and is the largest distance between base 482 and a top surface 490 of the bonding portion. As another example, referring to FIG. 7, bonding portion 750A has a maximum height 780A along the z-direction, bonding portion 750B has a maximum height 780B along the z-direction, and bonding portion 750C has a maximum height 780C along the z-direction. In general, the height of the bonding portions disclosed herein can vary along one or more directions. For example, FIG. 14 is a schematic three-dimensional view of a linear unitary discrete structure 1400 that extends along the y-direction and includes a light directing portion 1460 and a bonding portion 1470 disposed on the light directing portion. Bonding portion 1470 has a base 1475 that lies in the xy-plane and extends along the y-direction, and a height 1480 that is the distance between base 1475 and the top of the bonding portion along the z-direction. Height 1480 varies along the y-direction. Bonding portion 1470 has a maximum height 1482 which is the largest distance between base 1475 and the top of the bonding portion along the z-direction, and a minimum height 1484 which is the smallest distance between base 1475 and the top of the bonding portion along the z-direction. Light directing portion 1460 has a base 1440 that is in the xy-plane, and a constant height 1445 that is the distance between base 1440 of the light directing portion and base 1475 of the bonding portion along the z-direction.

In general, the height of the disclosed linear unitary discrete structures can remain constant or vary along the length of the unitary discrete structures. For example, the height of unitary discrete structure 1400 varies along the linear extent of the structure. As another example, unitary discrete structure 1300 in FIG. 13 has a constant height along the linear direction of the structure.

In some cases, each side facet of a bonding portion makes an angle with the plane of the light directing film that is greater than about 60 degrees. For example, in unitary discrete structure 300, side facet 372A makes an angle $\alpha_3$ with the xy-plane and side facet 372B makes an angle $\alpha_4$ with the xy-plane, where each of $\alpha_3$ and $\alpha_4$ is greater than about 60 degrees. As another example, referring to FIG. 10, bonding portion 1070 includes four side facets that make angles $\gamma_1$, $\gamma_2$, $\gamma_3$ and $\gamma_4$ with the xy-plane or the plane of the light directing film associated with unitary discrete structure 1000, where each of the four angles $\gamma_1$-$\gamma_4$ can be greater than about 60 degrees. In some cases, each side facet of a bonding portion makes an angle with the plane of the light directing film that is greater than about 65 degree, or greater than about 70 degrees, or greater than about 75 degrees, or greater than about 80 degrees, or greater than about 85 degrees.

In some cases, each unitary discrete structure in a light directing film disclosed herein includes a plurality of side facets, where the side facets that make an angle with the plane of the light directing film that is in a range from about 35 degrees to about 55 degrees, or from about 40 degrees to about 50 degrees, or from about 41 degrees to about 49 degrees, or from about 42 degrees to about 48 degrees, or from about 43 degrees to about 47 degrees, or from about 44 degrees to about 46 degrees, form or define the light directing portion of the unitary discrete structure, and the side facets that make an angle with the plane of the light directing film that is greater than about 60 degree, or greater than about 65 degrees, or greater than about 70 degrees, or greater than about 75 degrees, or greater than about 80 degrees, or greater than about 85 degrees, form or define the bonding portion of the unitary discrete structure.

In some cases, the minimum dimension of the base of the bonding portion of a unitary discrete structure is substantially less than the minimum dimension of the base of the light directing portion of the unitary discrete structure. For example, referring to FIG. 1, in some cases, the minimum dimension $d_2$ is substantially less than the minimum dimension $d_1$. For example, in such cases, the minimum dimension $d_2$ is less than about 20%, or less than about 18%, or less than about 16%, or less than about 14%, or less than about 12%, or less than about 10%, or less than about 9%, or less than about 8%, or less than about 7%, or less than about 6%, or less than about 5%, or less than about 4%, or less than about 3%, or less than about 2%, or less than about 1%, of the minimum dimension $d_1$.

In some cases, bonding portions 170 have aspect ratios that are greater than 1. For example, in some cases, the ratio of the maximum height $h_2$ of bonding portion 170 to the second minimum dimension $d_2$ of the bonding portion is greater than 1. For example, in such cases, the ratio $h_2/d_2$ is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

Figure 15:
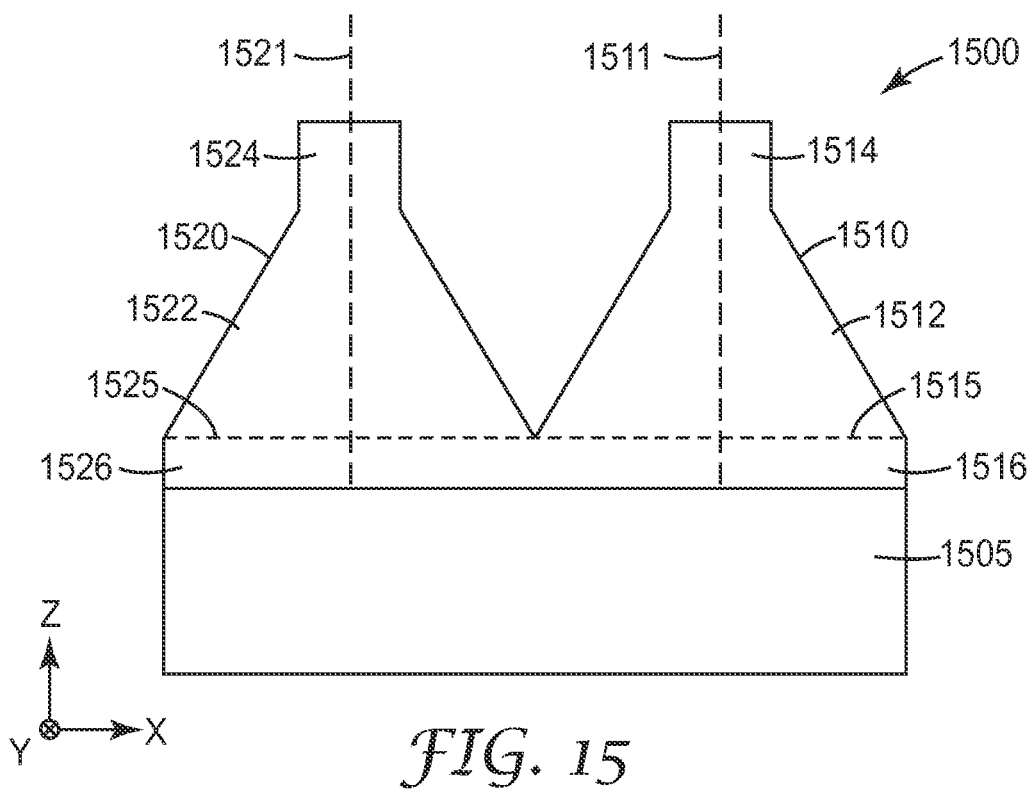
FIG. 15 is a schematic side-view of a light directing film.

FIG. 15 is a schematic side-view of a light directing film 1500 that includes a plurality of unitary discrete structures, such as unitary discrete structures 1510 and 1520, disposed on a substrate 1505, where the substrate provides support for the unitary structures. Unitary discrete structure 1510 includes a bonding portion 1514 disposed on a light directing portion 1512 that has a base 1515, and unitary discrete structure 1520 includes a bonding portion 1524 disposed on a light directing portion 1522 that has a base 1525. In some cases, such as in the exemplary light directing film illustrated in FIG. 15, at least some of the unitary discrete structures include a landing portion disposed between the base of the light directing portion and the substrate that supports the unitary discrete structure. In some cases, the primary functions of the land portion can include transmitting light with high efficiency, providing support for the light directing portion and the bonding portion, and providing sufficient adhesion between the unitary discrete structure and the substrate. For example, unitary discrete structure 1510 includes a land portion 1516 that is disposed between base 1515 and substrate 1505, and unitary discrete structure 1520 includes a land portion 1526 that is disposed between base 1525 and substrate 1505.

Figure 16:
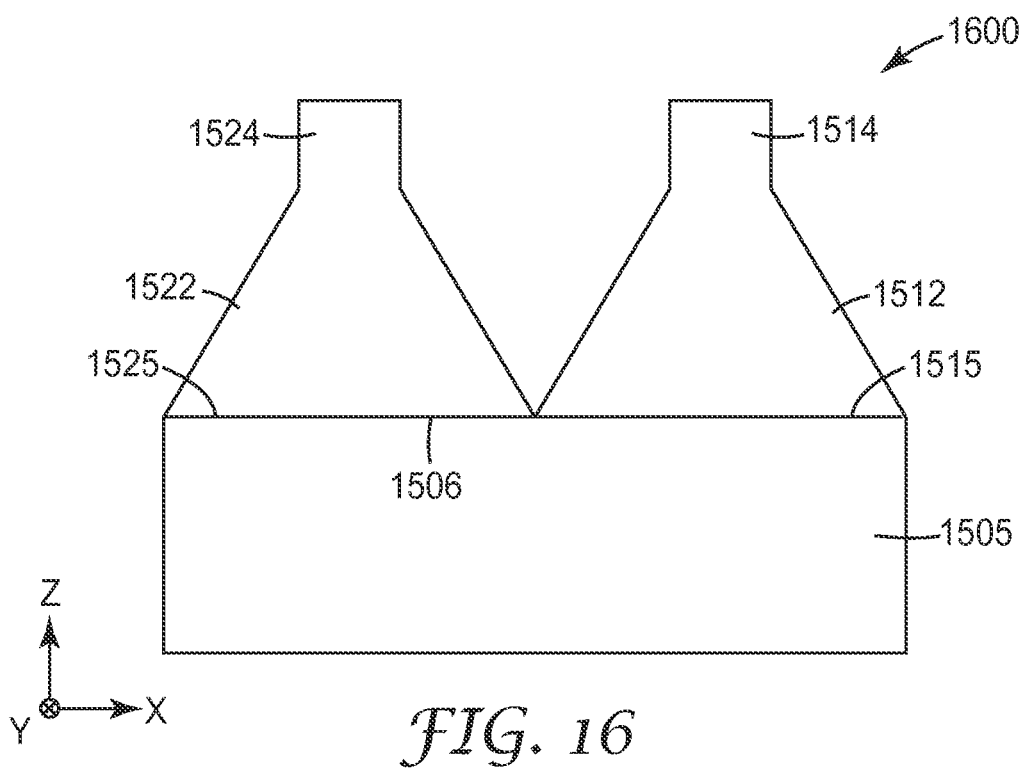
FIG. 16 is a schematic side-view of another light directing film.
Figure 17:
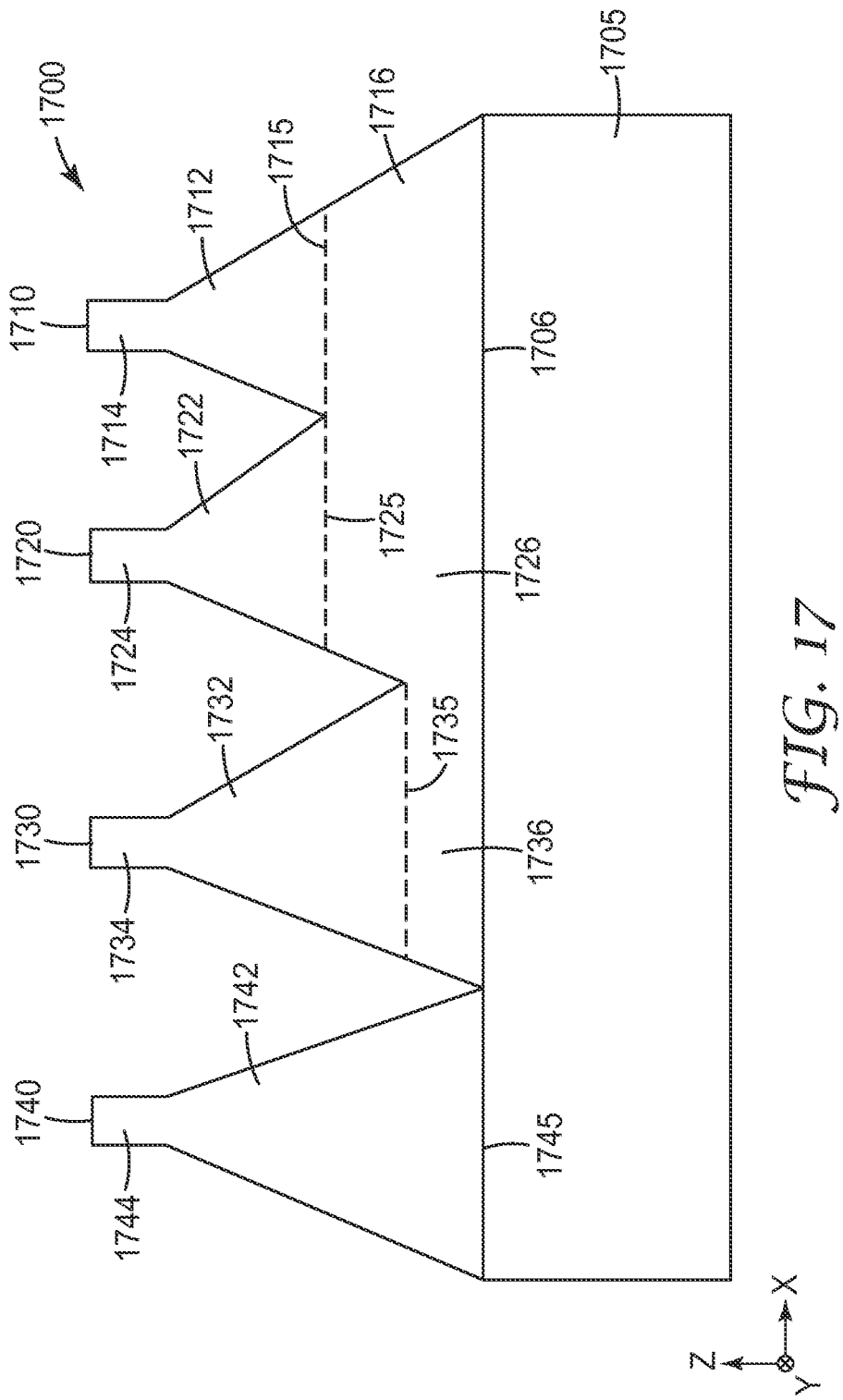
FIG. 17 is a schematic side-view of another light directing film.

In general, the unitary discrete structures in a light directing film may or may not have land portions. In some cases, such as in the case of light directing film 1500 illustrated schematically in FIG. 15, the unitary discrete structures have land portions. In some cases, the unitary discrete structures do not have land portions. For example, FIG. 16, is a schematic side-view of a light directing film 1600 that is similar to light directing film 1500 except that the unitary discrete structures do not have land portions. In particular, base 1515 of light directing portion 1512 coincides, or substantially coincides, with a top surface 1506 of substrate 1505, and base 1525 of light directing portion 1522 coincides, or substantially coincides, with top surface 1506 of substrate 1505. In some cases, some unitary discrete structures in a light directing film have land portions and some unitary discrete structures in the light directing film do not have land portions. For example, FIG. 17 is a schematic side-view of a light directing film 1700 that includes a plurality of unitary light structures, such as unitary discrete structures 1710, 1720, 1730 and 1740, disposed on a top surface 1706 of a substrate 1705. Unitary discrete structure 1710 includes a light directing portion 1712 that has a base 1715, a bonding portion 1714 that is disposed on the light directing portion, and a land portion 1716 that is disposed between base 1715 of the light directing portion and top surface 1706 of the substrate. Unitary discrete structure 1720 includes a light directing portion 1722 that has a base 1725, a bonding portion 1724 that is disposed on the light directing portion, and a land portion 1726 that is disposed between base 1725 of the light directing portion and top surface 1706 of the substrate. Unitary discrete structure 1730 includes a light directing portion 1732 that has a base 1735, a bonding portion 1734 that is disposed on the light directing portion, and a land portion 1736 that is disposed between base 1735 of the light directing portion and top surface 1706 of the substrate. Unitary discrete structure 1740 includes a light directing portion 1742 that has a base 1745 that coincides, or substantially coincides, with top surface 1706 of substrate 1705, and a bonding portion 1744 that is disposed on the light directing portion. Unitary discrete structures 1710, 1720 and 1730 include land portions and unitary discrete structure 1740 does not include a land portion.

In some cases, at least some of the unitary discrete structures in a plurality of unitary discrete structures in a light directing film have symmetric cross-sectional profiles in a direction perpendicular to the light directing film, where by a symmetric unitary discrete structure it is meant that the light directing portion and the bonding portion of the unitary discrete structure have symmetric profiles. For example, a unitary discrete structure is considered to have a symmetric profile if the bonding and light directing portions of the unitary discrete structure have symmetric profiles, even if other parts, such as the land portion, of the unitary discrete structure have asymmetric profiles.

For example, referring to FIG. 15, unitary discrete structures 1510 and 1520 have symmetric cross-sectional profiles in directions that are perpendicular to the light directing film. In particular, unitary discrete structure 1510 in light directing film 1500 has a symmetric cross-sectional profile in a direction 1511 that is perpendicular to the light directing film, and unitary discrete structure 1520 in light directing film 1500 has a symmetric cross-sectional profile in a direction 1521 that is perpendicular to the light directing film. Direction 1511 is a symmetry axis for unitary discrete structure 1510, and direction 1521 is a symmetry axis for unitary discrete structure 1520.

Figure 18:
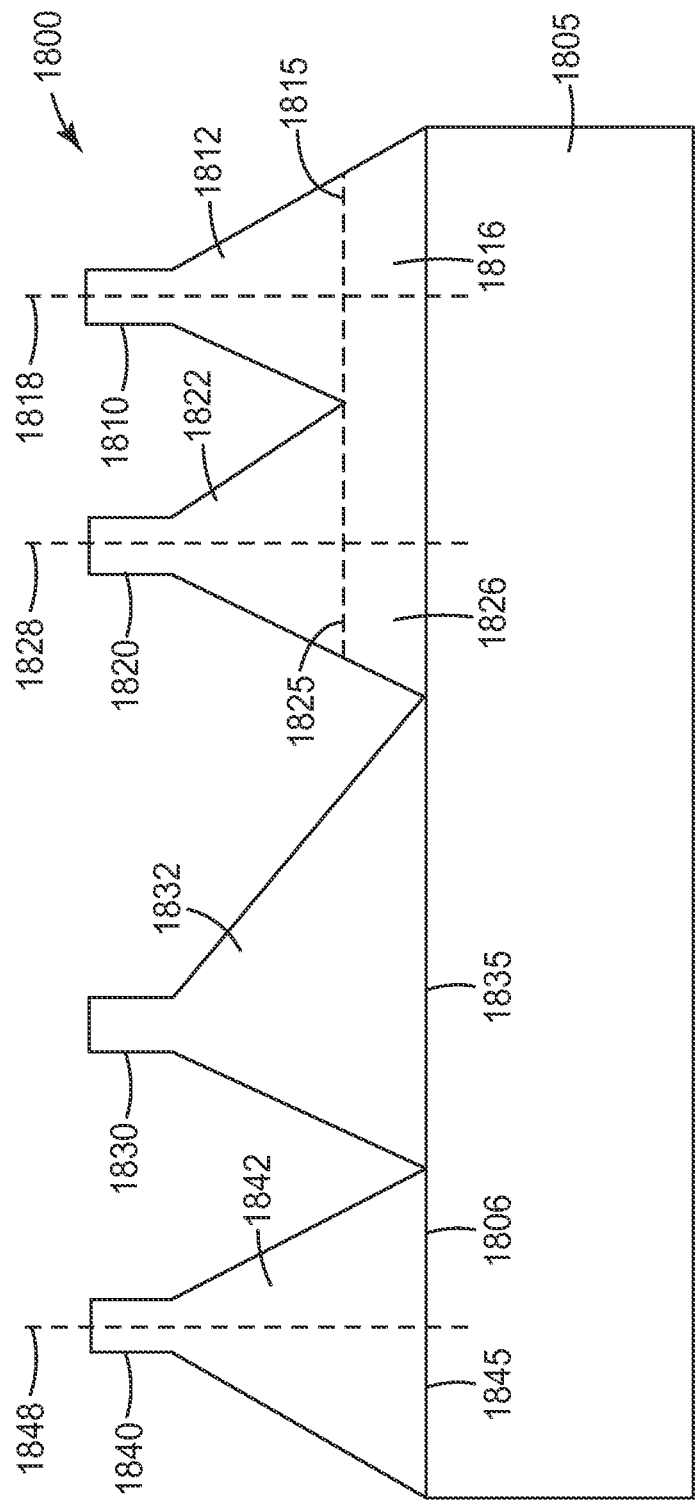
FIG. 18 is a schematic side-view of yet another light directing film.

In some cases, at least some of the unitary discrete structures in a plurality of unitary discrete structures in a light directing film have asymmetric cross-sectional profiles in a direction perpendicular to the light directing film. For example, FIG. 18 is a schematic side-view of a light directing film 1800 that includes symmetric unitary discrete structures 1810, 1820 and 1840, and asymmetric unitary discrete structure 1830 disposed on a top surface 1806 of a substrate 1805. Unitary discrete structure 1810 includes a light directing portion 1812 that includes a base 1815 and a land portion 1816 that is disposed between base 1815 of the light directing portion and top surface 1806 of substrate 1805. Unitary discrete structure 1810 has a symmetric cross-sectional profile in a direction 1818 that is along the z-direction and perpendicular to the light directing film. Unitary discrete structure 1820 includes a light directing portion 1822 that includes a base 1825 and a land portion 1826 that is disposed between base 1825 of the light directing portion and top surface 1806 of substrate 1805. Unitary discrete structure 1820 has a symmetric cross-sectional profile in a direction 1828 that is along the z-direction and perpendicular to the light directing film. Unitary discrete structure 1830 includes a light directing portion 1832 that includes a base 1835 that coincides, or substantially coincides, with top surface 1806 of substrate 1805. Unitary discrete structure 1830 has an asymmetric cross-sectional profile. Unitary discrete structure 1840 includes a light directing portion 1842 that includes a base 1845 that coincides, or substantially coincides, with top surface 1806 of substrate 1805. Unitary discrete structure 1840 has a symmetric cross-sectional profile in a direction 1848 that is along the z-direction and perpendicular to the light directing film.

Figure 20:
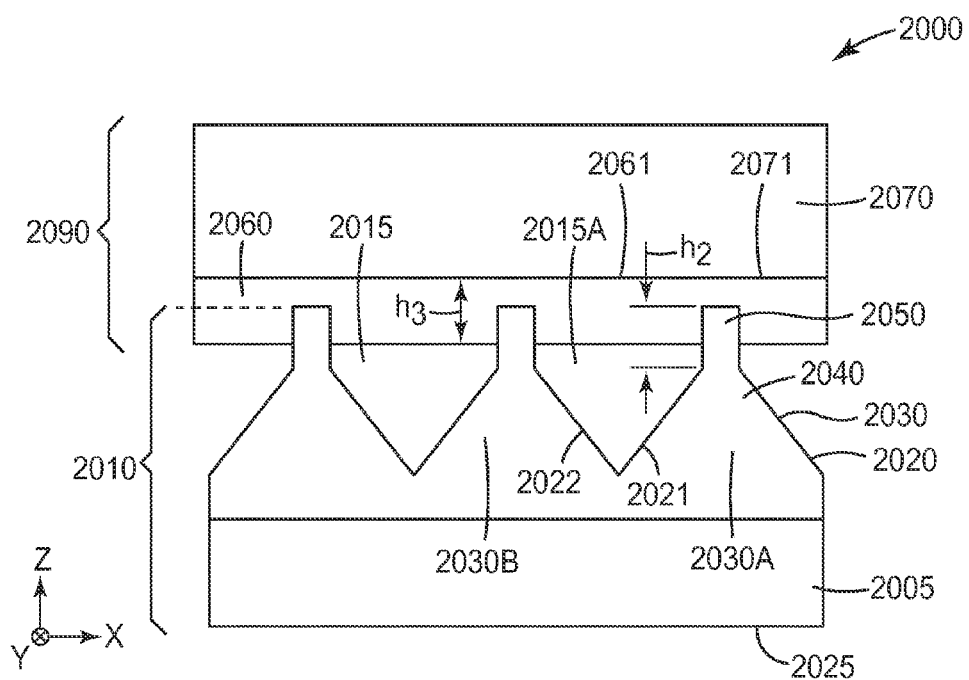
FIG. 20 is a schematic side-view of an optical stack.

FIG. 20 is a schematic side-view of an optical stack 2000 that includes an optical film 2090 that is disposed on a light directing film 2010, where light directing film 2010 can be any light directing film disclosed herein. Light directing film 2010 includes a first structured major surface 2020 and an opposing second major surface 2025. First structured major surface 2020 includes a plurality of unitary discrete structures 2030 that are disposed on a substrate 2005. Each of at least some unitary discrete structures include a light directing portion 2040 primarily for directing light and a bonding portion 2050 primarily for bonding the light directing film to optical film 2090. In some cases, such as in the case of the exemplary optical stack 2000, at least portions of at least some bonding portions 2050 of light directing film 2010 penetrate into optical film 2090 and at least portions of at least some light directing portions 2040 of light directing film 2010 do not penetrate into optical film 2090. In such cases, optical stack 2000 includes a plurality of unfilled voids 2015 between light directing film 2010 and optical film 2090, where the unfilled voids can contain air and/or a gas. In some cases, each of at least some of the plurality of unfilled voids 2015 substantially covers a region that is defined by optical film 2090 and portions of two or more adjacent unitary discrete structures 2030 that do not penetrate into the optical film and immediately surround the region. For example, in such cases, an unfilled void covers at least 50%, or at least 60%, or at least 70%, or at least 80%, or at least 90%, of a region that is defined by optical film 2090 and portions of two or more adjacent unitary discrete structures 2030 that do not penetrate into the optical film. For example, in the case of linear unitary discrete structures 2030, unfilled void 2015 substantially covers the region that is defined on the top by optical film 2090, on the right side by portion 2021 of linear unitary discrete structure 2030A that has not penetrated into the optical film, and on the left side by portion 2022 of linear unitary discrete structure 2030B that has not penetrated into the optical film.

Optical film 2090 includes an optical layer 2070 that is disposed on an optical adhesive layer 2060. The portions of bonding portions 2050 of light directing film 2010 that penetrate into the optical film penetrate into the optical adhesive layer. Optical adhesive layer 2060 attaches or bonds light directing film 2010 to optical layer 2070 or major surface 2071 of optical layer 2070 while substantially maintaining an air environment or surrounding for light directing portions 2040. In some cases, bonding portions 2050 have high aspect ratios which can result in strong bonding between optical film 2090 and light directing film 2010.

Bonding portions 2050 that penetrate into optical adhesive layer have an average maximum height $h_{2,avg}$ which is the average of the maximum heights $h_2$ of the individual bonding portions that have penetrated into the optical adhesive layer. In some cases, $h_{2,avg}$ is greater than the average thickness $h_3$ of optical adhesive layer 2060. For example, in such cases, $h_{2,avg}$ is greater than $h_3$ by at least 0.2 microns, or at least 0.3 microns, or at least 0.4 microns, or at least 0.5 microns, or at least 0.7 microns, or at least 1 micron, or at least 1.2 microns, or at least 1.5 microns, or at least 1.7 microns, or at least 2 microns.

In general, optical film 2090 can include any optical layer 2070 that may be desirable in an applications. For example, in some cases, optical layer 2070 can be or include an absorbing polarizer. As another example, in some cases, optical film 2090 or optical layer 2070 can include a reflective polarizer. In some cases, the reflective polarizer can include a multilayer optical film wherein at least some of the layers are birefringent. In some cases, the reflective polarizer can include alternating layers, where at least one of the alternating layers includes a birefringent material. In some cases, the reflective polarizer can include a wire grid reflective polarizer, or a cholesteric reflective polarizer. In some cases, the reflective polarizer can be or include a fiber polarizer. In such cases, the reflective polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, the entireties of which are incorporated herein by reference.

In some cases, the reflective polarizer can be a partially reflecting layer that has an intermediate on-axis average reflectance in the pass state. For example, the partially reflecting layer can have an on-axis average reflectance of at least about 90% for visible light polarized in a first plane, such as the xy-plane (for example, for visible light linearly polarized along the x-direction), and an on-axis average reflectance in a range from about 25% to about 90% for visible light polarized in a second plane, such as the xz-plane (for example, for visible light linearly polarized along the z-direction) perpendicular to the first plane.

In some cases, the reflective polarizer can be an extended band reflective polarizer that is capable of polarizing light at smaller incident angles and substantially reflecting one polarization state, or two mutually perpendicular polarization states, at larger incident angles as described in U.S. Patent Application Ser. No. 61/254,691 titled "Immersed Reflective Polarizer with High Off-Axis Reflectivity", filed on Oct. 24, 2009; and U.S. Patent Application Ser. No. 61/254,692 "Immersed Reflective Polarizer With Angular Confinement in Selected Planes of Incidence",filed on Oct. 24, 2009, the disclosures of which are incorporated herein in their entireties by reference.

In some cases, the reflective polarizer can be a diffuse reflective polarizer substantially transmitting one polarization state and substantially diffusely reflecting an orthogonal polarization state. Diffuse reflective polarizer films typically include a disperse phase of polymeric particles disposed within a continuous birefringent matrix. The film is oriented, typically by stretching, in one or more directions to develop the birefrengence. Examples of diffuse reflective polarizers are described in, for example, U.S. Pat. Nos. 6,999,233 and 6,987,612 the disclosures of which are incorporated herein in their entireties by reference.

As another example, optical layer 2070 can be or include a substrate for providing, for example, support to optical film 2090. In general, a substrate disclosed herein, such as substrate 130, substrate 2005, or substrate 2070, can be or include any material that may be desirable in an application. For example, a substrate 2070 can include or be made of glass and/or polymers such as polyethylene terephthalate (PET), polycarbonates, and acrylics. In some cases, the substrate can have multiple layers. In some cases, optical layer 2070 can be glass. For example, a glass layer 2070 can be a glass layer in a liquid crystal panel.

As another example, optical layer 2070 can be or include a release liner that provides a transferable light directing film 2010, meaning that, for example, the exposed major surface 2025 of the light directing film may be placed in contact with a substrate or surface and the release liner may thereafter be stripped away to expose a major surface 2061 of optical adhesive layer 2060 that can, for example, be bonded to another substrate or surface. The release force for releasing optical adhesive layer 2060 or light directing film 2010 from a release liner 2070 is generally less than about 200 g-force/inch, or less than about 150 g-force/inch, or less than about 100 g-force/inch, or less than about 75 g-force/inch, or less than about 50 g-force/inch.

Figure 21:
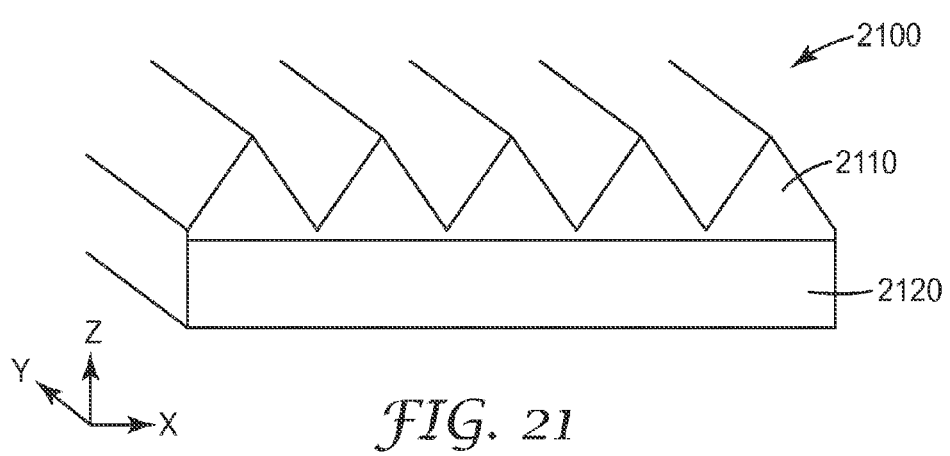
FIG. 21 is a schematic three-dimensional view of a light directing film.

As yet another example, in some cases, optical layer 2070 can be or include a second light directing film that includes a plurality of linear prismatic structures. For example, FIG. 21 is a schematic three dimensional view of a light directing film 2100 that includes a plurality of linear prismatic structures 2110 that are disposed on a substrate 2120 and extend linearly along the y-direction. In some cases, optical layer 2070 can be or include light directing film 2100. In such cases, unitary discrete structures 2030 of light directing film 2010 can also be linear structures that extend in a direction that is perpendicular to the linear direction of linear prismatic structures 2110. In some cases, substrate 2120 can be similar to optical layer 2070 and may include any optical layer and provide any function that may be desirable in an application.

In general, a substrate disclosed herein, such as substrate 130 or substrate 2005, can include any optical layer and provide any function that may be desirable in an application.

For example, in some cases, a disclosed substrate may primarily provide support for other layers. As another example, in some cases, a disclosed substrate may polarize light by including, for example, a reflective or absorbing polarizer, diffuse light by including an optical diffuser, direct or redirect light by including a light directing film, or have transferring capabilities by, for example, including a release liner.

Bonding portions 2050 allow for secure attachment of light directing film 2010 to optical film 2090 or surface 2071 with no or very little loss in optical properties, such as brightness. In particular, the bonding portions have sufficiently large aspect ratios to provide sufficient exterior surface to enhance adhesion between the light directing film and the optical film. The bonding portions are also sufficiently narrow relative to the width of the light directing portions so that there is no or very little loss in the effective transmission of the light directing film and/or the optical stack. As used herein, effective transmission (ET), or optical gain, is the ratio of the luminance of an optical system, such as a display system, with the film in place in the optical system to the luminance of the optical system without the film in place.

Unitary discrete structures 2030 can have any index of refraction that may be desirable in an application. For example, in some cases, the index of refraction of the unitary discrete structures is in a range from about 1.4 to about 1.8, or from about 1.5 to about 1.8, or from about 1.5 to about 1.7. In some cases, the index of refraction of the unitary discrete structures is not less than about 1.5, or not less than about 1.55, or not less than about 1.6, or not less than about 1.65, or not less than about 1.7.

In general, the peel strength of light redirecting film 2010 and optical adhesive layer 2060, surface 2071, or optical film 2090 is sufficiently large to provide secure adhesion between light directing film 2010 and optical film 2090 so that optical stack 2000 can be handled as a single film or unit without bonding portions 2050 delaminating or separating from optical film 2090. In some cases, the peel strength of light redirecting film 2010 and optical adhesive layer 2060 is greater than about 20 grams/inch, or about 25 grams/inch, or about 30 grams/inch, or about 35 grams/inch, or about 40 grams/inch, or about 45 grams/inch, or about 50 grams/inch, or about 60 grams/inch, or about 70 grams/inch, or about 80 grams/inch, or about 90 grams/inch, or about 100 grams/inch, or about 110 grams/inch, or about 120 grams/inch, or about 130 grams/inch, or about 140 grams/inch, or about 150 grams/inch.

Figure 29:
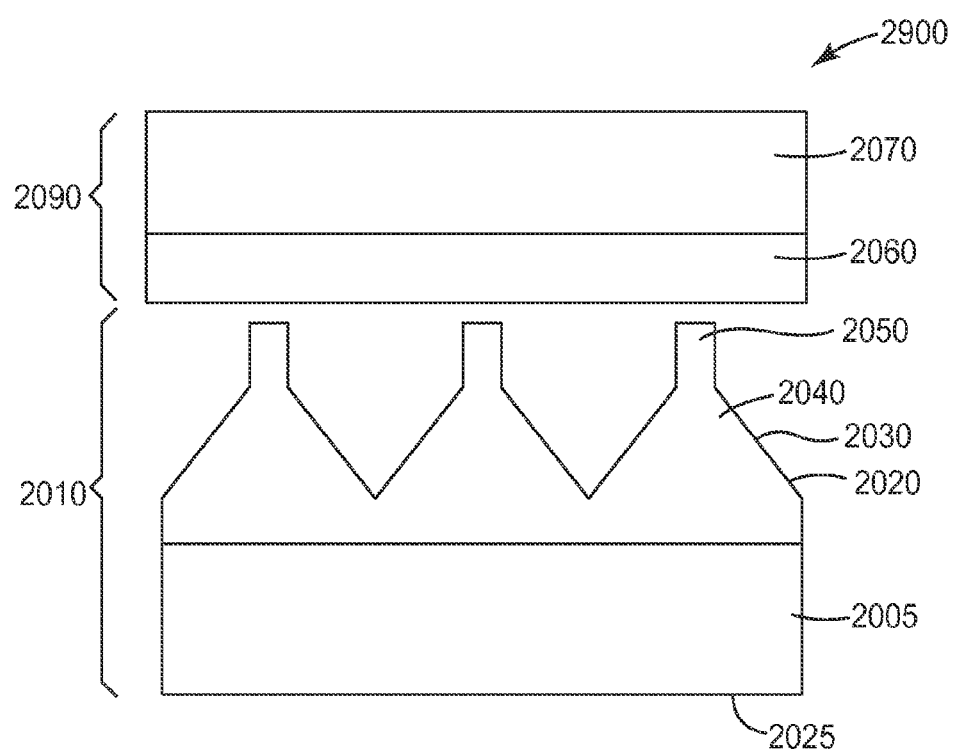
FIG. 29 is a schematic side-view of an optical stack.

Bonding portions 2050 are designed primarily to provide sufficient adhesion between light directing film 2010 and optical film 2090 by sufficiently penetrating into the optical film. While providing sufficient adhesion between the two films, the bonding portions are sufficiently narrow so as to have no, or very little, effect on the effective transmission of light directing film 2010 or optical stack 2000. For example, in some cases, an optical stack that is similar to optical stack 2000 except that no bonding portion 2050 or unitary discrete structure 2030 penetrates into optical adhesive layer 2060 or optical film 2090, has the same effective transmission or an effective transmission that is only slightly larger than the effective transmission of optical stack 2000. For example, FIG. 29 is a schematic side-view of an optical stack 2900 that has the same construction as optical stack 2000 except that no unitary discrete structure 2030 penetrates into optical adhesive layer 2060. In some cases, the effective transmission of optical stack 2000 is not less or is less than by no more than about 20%, or about 15%, or about 10%, or about 9%, or about 8%, or about 7%, or about 6%, or about 5%, or about 4%, or about 3%, or about 2%, or about 1%, as compared to optical stack 2900.

In some cases, in FIG. 29, optical adhesive layer 2060 can be absent or can be replaced with an optical layer that is non-adhesive. In such cases, such as when optical adhesive layer 2060 is absent, bonding portions 2050 can be anti-wetout structures preventing, or substantially reducing, optical coupling between light directing film 2010 and optical layer 2070. In some cases, at least some bonding portions 2050 of unitary discrete structures 2030 physically contact but do not penetrate into optical layer 2070. In some cases, no bonding portion 2050 of unitary discrete structures 2030 penetrates into optical layer 2070.

Figure 19:
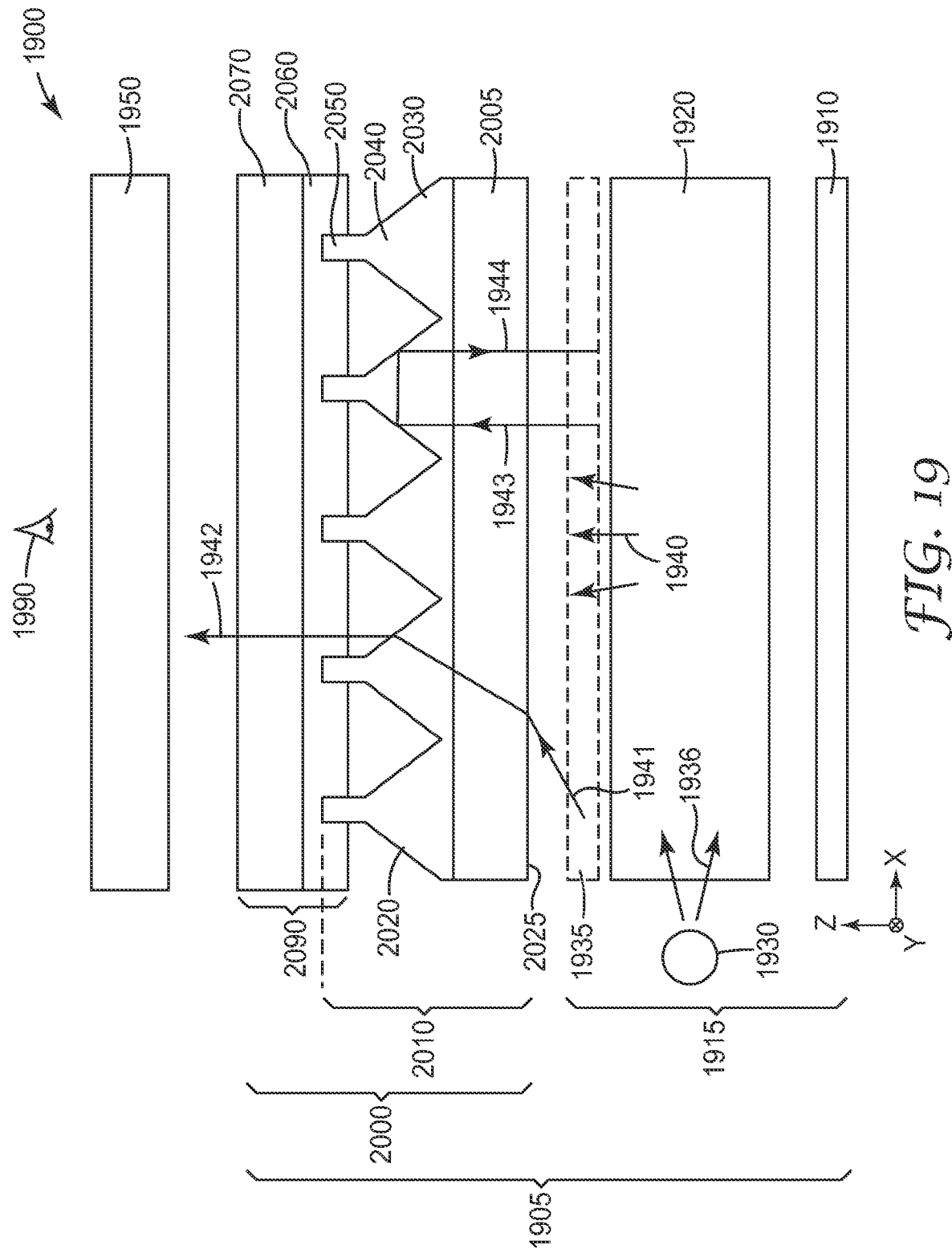
FIG. 19 is a schematic side-view of a display system.

In some cases, a light directing portion of a disclosed unitary discrete structure is designed to recycle light so that, for example, the brightness of an image viewed by a viewer is increased or enhanced. For example, FIG. 19 is a schematic side-view of a display system 1900 that includes an image forming panel 1950 that is capable of forming an image and displaying the image to a viewer 1990 and is disposed to receive light from an illumination system 1905. Illumination system 1905 includes optical stack 2000 disposed on a light source 1915 that includes a lightguide 1920; a lamp 1930 for emitting light 1936 that enters the lightguide, propagates within the lightguide by total internal reflection, and exits the lightguide as light 1940 towards the image forming panel; and a back reflector 1910 for redirecting light that is incident on the back reflector towards the image forming panel. Light directing portions 2040 are designed primarily to either redirect light that exits lightguide 1920 toward image forming panel 1950, or reflect light that exits the lightguide for recycling. For example, light directing portions 2040 redirect light 1941 that exits lightguide 1920 as light 1942 towards the image forming panel or the viewer. As another example, light directing portions 2040 receive light 1943 that exits the lightguide and totally internally reflect back the received light as light 1944 for recycling.

In general, image forming panel 1950 can be any type panel that is capable of forming and image and displaying the image to viewer 1990. In some cases, image forming panel 1950 can be or include a liquid crystal panel. In such cases, a liquid crystal image forming panel 1950 can include a layer of liquid crystal disposed between two panel plates such as glass plates, an upper light absorbing polarizer layer disposed above the liquid crystal layer and a lower absorbing polarizer disposed below the liquid crystal layer. The upper and lower light absorbing polarizers and the liquid crystal layer, in combination, control the transmission of light to viewer 1990. In some cases, image forming panel 1950 can be a monolithic image forming panel or a tiled image forming panel that includes a plurality of image forming tiles. In some cases, light source 1915 can be a monolithic light source or a tiled light source that includes a plurality of light source tiles. In some cases, display system 1900 includes a monolithic image forming panel 1950 and a tiled light source 1915. A tiled light source 1915 can include a plurality of independently controlled tiled lightguides 1920, where each lightguide can illuminate a different zone in a displayed image.

In some cases, display system 1900 or illumination system 1905 can include one or more optional layers 1935 that are disposed between optical stack 2000 and lightguide 1920. Exemplary optional layers 1935 include, light diffusing layers and polarization retardation layers.

In general, the disclosed light directing films include a first structured major surface that include a plurality of unitary discrete structures, and a second major surface that opposes the first structured major surface. In some cases, a disclosed light directing film is designed primarily to receive light from the second major surface side of the light directing film. For example, light directing film 2010 in FIG. 19, is designed primarily to receive light from second major surface 2025 and emit or transmit light from first structured major surface 2020.

Figure 22:
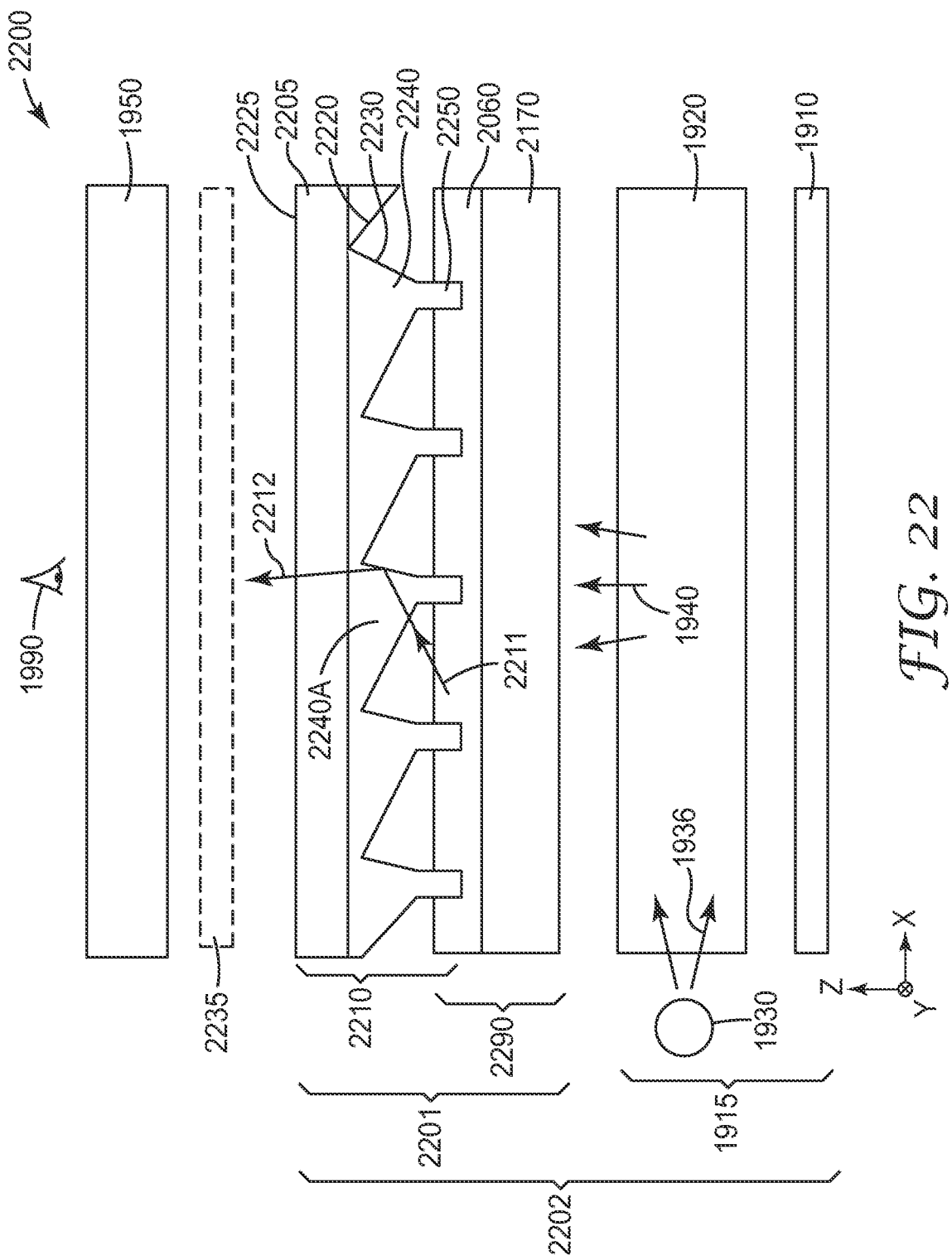
FIG. 22 is a schematic side-view of a display system.

In some cases, a light directing portion of a disclosed unitary discrete structure is designed primarily to redirect, but not recycle, light. For example, FIG. 22 is a schematic side-view of a display system 2200 for displaying information or an image to viewer 1990. Display system 2200 includes image forming panel 1950 disposed on an illumination system 2202 that includes an optical stack 2201 that is disposed on light source 1915. Optical stack 2201 includes a light directing film 2210 disposed on an optical film 2290. Light directing film 2210 can be any light directing film disclosed herein and includes a first structured major surface 2220 that includes a plurality of unitary discrete structures 2230 disposed on a substrate 2205 and a second major surface 2225 that opposes major surface 2220. Unitary discrete structures 2230 include bonding portions 2250 disposed on light directing portions 2240. At least portions of bonding portions 2250 penetrate optical film 2290 and at least portions of light directing portions 2240 do not penetrate the optical film. Light directing film 2210 and light directing portions 2240 are designed primarily to direct or redirect, but not recycle, light. For example, light directing portion 2240A is designed primarily to direct light 2211 that exits lightguide 1920 as light 2212 towards image forming panel 1950 and viewer 1990.

In general, the disclosed light directing films include a first structured major surface that include a plurality of unitary discrete structures, and a second major surface that opposes the first structured major surface. In some cases, a disclosed light directing film is designed primarily to receive light from the first structured major surface side of the light directing film. For example, light directing film 2210 in FIG. 22, is designed primarily to receive light from first structured major surface 2220 and emit or transmit light from second major surface 2225.

In some cases, optical film 2290 does not include optical layer 2170. In such cases, optical adhesive layer 2060 can directly adhere to lightguide 1920 resulting in light directing film 2210 being securely adhered to lightguide 1920.

In some cases, such as in the exemplary illumination system 2200 illustrated in FIG. 22, optical film 2290 is disposed between light directing film 2210 and light source 1915. In some cases, such as in the exemplary illumination system 1905 illustrated in FIG. 19, light directing film 2010 is disposed between optical film 2090 and light source 1915.

In some cases, optical layer 2170 can be a lightguide, such as lightguide 1920. In such cases, unitary discrete structures 2230 can extract light from the lightguide and can be considered as light extractors of a lightguide 2170. In some cases, unitary discrete structures 2230 may penetrate directly into a lightguide, an exemplary side-view of which is illustrated schematically in FIG. 52. In particular, in FIG. 52, a light source 5230 includes a lightguide 5210 that is disposed on back reflector 1910. Lightguide 5210 includes a lightguide layer 5220 that receives light 1936 that is emitted by lamp 1930 from a side 5550 of the lightguide layer. The light that enters the lightguide layer propagates across the lightguide layer along, for example, the x-direction by total internal reflection. Light directing film 2210 is disposed on lightguide 5210 and includes a plurality of discrete structures 5280 that are similar to unitary discrete structures 2230. Each discrete structure 5280 is partially embedded in lightguide layer 5220 and extracts light that propagates within the lightguide layer by total internal reflection from the lightguide layer. For example, discrete structures 5280 extract light 5240 that propagates within lightguide layer 5220 by total internal reflection from the lightguide layer as light 5241. As a result, each discrete structure 5280 can be considered to be a discrete light extractor 5280 of lightguide 5210. Each discrete light extractor 5280 includes a first portion 5260 that penetrates into, or is embedded in, lightguide layer 5220 and a second portion 5270 that does not penetrate into, or is not embedded in, lightguide layer 5220. In general, each discrete light extractor 5280 can be unitary or composite.

In some cases, the index of refraction of each discrete light extractor 5280 is different than the index of refraction of lightguide layer 5220. In some cases, the index of refraction of each discrete light extractor 5280 is equal to the index of refraction of lightguide layer 5220.

Figure 23:
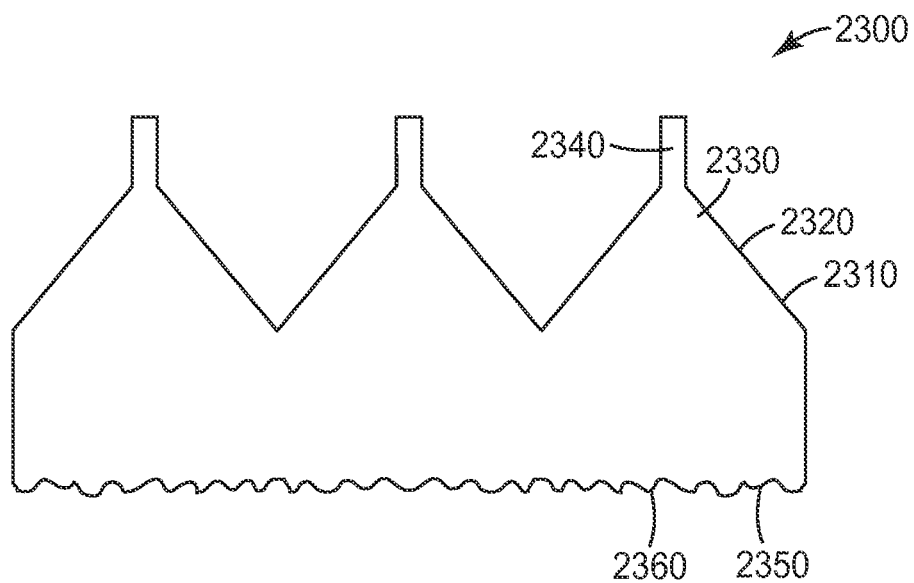
FIG. 23 is a schematic side-view of a light directing film.

Referring back to FIG. 1, in some cases, second major surface 120 includes a plurality of structures to assist in, for example, diffusing light, hiding or masking defects such as dust particles or scratches, and/or reducing the visibility of an undesirable optical effect such as moiré. For example, FIG. 23 is a schematic side-view of a light directing film 2300 that is similar to light directing film 100 and includes a first structured major surface 2310 and an opposing second structured major surface 2350. First structured major surface 2310 includes a plurality of unitary discrete structures 2320. Each unitary discrete structure 2320 includes a light directing portion 2330 that is designed primarily to direct light and a bonding portion 2340 that is disposed on the light directing portion and is designed primarily to bond the light directing film to a surface.

Structured major surface 2350 includes a plurality of structures 2360. In some cases, structures 2360 are irregularly arranged. For example, in such cases, structures 2360 can form a random pattern. In some cases, structures 2360 are regularly arranged.

For example, in such cases, structures 2360 can form a periodic pattern along one direction or two mutually orthogonal directions.

Figure 24:
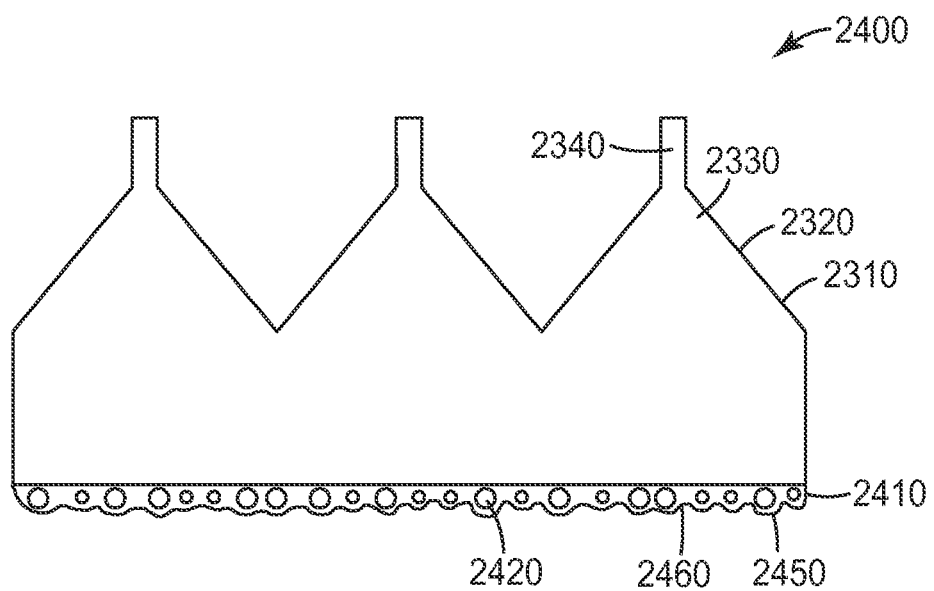
FIG. 24 is a schematic side-view of another light directing film.

The exemplary light directing film 2300 is a unitary film as there are no internal interfaces within the light directing film. In some cases, structures 2360 can be part of a separate layer that can, for example, be coated onto the light directing film. For example, FIG. 24 is a schematic side-view of a light directing film 2400 that includes first structured major surface 2310 and an opposing second structured major surface 2450 that includes a plurality of structures 2460. Light directing film 2400 is similar to light directing film 2300 except that second structured major surface 2450 is part of a light diffusing layer 2410 that is applied to, for example coated on, light directing film 2400. In general, light diffusing layer 2410 may or may not include particles. In some cases, such as in the exemplary case illustrated in FIG. 24, light diffusing layer 2410 includes a plurality of particles 2420. In general, the plurality of structures 2460 have a first average height and the plurality of particles 2420 have a second average size. In some cases, such as when the average size of particles 2420 is of the same order of magnitude as the average height of structures 2460, the ratio of the first average height to the second average size is less than about 50, or less than about 40, or less than about 30, or less than about 20, or less than about 10, or less than about 5, or less than about 2, or less than about 1. In some cases, such as when the average size of particles 2420 is substantially less than the average height of structures 2460, the ratio of the first average height to the second average size is greater than about 50, or greater than about 100, or greater than about 500, or greater than about 1000.

Referring back to FIG. 1, in some cases, at least some of the unitary discrete structures 150 are linear structures and extend along the same direction. For example, referring to FIG. 6, unitary discrete structures 650 are linear structures and extend along the y-direction. In some cases, the heights of the light directing portions of the unitary discrete structures that extend along the same direction do not vary along that direction. For example, referring to FIG. 7, heights of light directing portions 710A, 710B and 710C do not vary along the y-direction which is the linear direction of the light directing portions or their associated unitary discrete structures. In some cases, the heights of the light directing portions of the unitary discrete structures that extend along the same direction vary along that direction. For example, referring to FIG. 9, height 950 of light directing portion 960 varies along the y-direction which is the linear direction of light directing portion 960 or unitary discrete structure 900. In some cases, height 950 can vary regularly along the y-direction. In some cases, height 950 can vary irregularly along the y-direction.

In general, the light directing portions can have multiple side facets. In some cases, such as in the case of linear unitary discrete structures, each light directing portion can include two opposing side facets. For example, referring to FIG. 6, light directing film 600 includes a plurality of linear unitary discrete structures 650 that extend along the y-direction, and where each light directing portion includes two opposing side facets. For example, light directing portion 660A includes two opposing side facets: side facet 612A and opposing side facet 612B. In some cases, each light directing portion includes only two opposing side facets.

As another example, light directing portion 710A in FIG. 7 includes four side facets or two pairs of opposing side facets. In particular, light directing portion 710A includes a first pair of opposing side facets 701A and 701B and a second pair of opposing side facets 701C and 701D.

Referring back to FIG. 1, opposing side facets 162 of light directing portions 160 define an included angle $\theta_1$ which is the angle between the two opposing side facets. In some cases, the included angle $\theta_1$ is in a range from about 60 degrees to about 120 degrees, or about 65 degrees to about 115 degrees, or about 70 degrees to about 110 degrees, or about 75 degrees to about 105 degrees, or about 80 degrees to about 100 degrees, or about 85 degrees to about 95 degrees. In some cases, the included angle $\theta_1$ is about 88 degrees, or about 89 degrees, or about 90 degrees, or about 91 degrees, or about 92 degrees.

Side facet 162A of light directing portion 160A makes and angle $\theta_3$ with a normal line 180 that is perpendicular to light directing film 100 or plane 105 of the light directing film. In some cases, the angle $\theta_3$ between a side facet of a light directing portion and the normal to the light directing film is in a range from about 30 degrees to about 60 degrees, or from about 35 degrees to about 55 degrees, or from about 40 degrees to about 50 degrees, or from about 42 degrees to about 48 degrees, or from about 43 degrees to about 47 degrees, or from about 44 degrees to about 46 degrees.

Opposing side facets 172 of bonding portion 170 define an included angle $\theta_2$ which is the angle between the two opposing side facets. In some cases, the included angle $\theta_2$ between two opposing side facets of a bonding portion is less than about 40 degrees, or less than about 35 degrees, or less than about 30 degrees, or less than about 25 degrees, or less than about 20 degrees, or less than about 15 degrees, or less than about 12 degrees, or less than about 10 degrees, or less than about 9 degrees, or less than about 8 degrees, or less than about 7 degrees, or less than about 6 degrees, or less than about 5 degrees, or less than about 4 degrees, or less than about 3 degrees, or less than about 2 degrees, or less than about 1 degree. In some cases, opposing side facets 172 of bonding portion 170 are parallel to each other. In such cases, the included angle between the two opposing side facets is zero.

Side facets 172 of bonding portions 170 make an angle $\theta_4$ with a normal line 181 that is perpendicular to light directing film 100 or plane 105 of the light directing film. In some cases, the angle $\theta_4$ between a side facet 172 of a bonding portion 170 and a normal 181 to the light directing film 100 is in a range from about zero degree to about 40 degrees, or from about zero degree to about 35 degrees, or from about zero degree to about 30 degrees, or from about zero degree to about 25 degrees, or from about zero degree to about 20 degrees, or from about zero degree to about 15 degrees, or from about zero degree to about 10 degrees, or from about zero degree to about 5 degrees.

In some cases, a side facet of the light directing portion of a unitary discrete structure 150 makes an angle $\theta_3$ with a normal, such as normal 180, to light directing film 100, and a side facet of the bonding portion of the same unitary discrete structure makes an angle $\theta_4$ with the normal, such as normal 180, to light directing film 100. In some cases, $\theta_4$ is less than $\theta_3$. In some cases, $\theta_4$ is less than $\theta_3$ by at least about 5 degrees, or about 10 degrees, or about 15 degrees, or about 20 degrees, or about 25 degrees, or about 30 degrees, or about 35 degrees, or about 40 degrees.

In some cases, each side facet of the light directing portion of a unitary discrete structure 150 makes an angle $\theta_3$ with a normal, such as normal 180, to light directing film 100, and each side facet of the bonding portion of the same unitary discrete structure makes an angle $\theta_4$ with the normal, such as normal 180, to light directing film 100. In some cases, $\theta_4$ is less than $\theta_3$. In some cases, $\theta_4$ is less than $\theta_3$ by at least about 5 degrees, or about 10 degrees, or about 15 degrees, or about 20 degrees, or about 25 degrees, or about 30 degrees, or about 35 degrees, or about 40 degrees.

In some cases, the light directing portions of a light directing film can have substantially equal maximum heights. For example, light directing portions 160 can have substantially equal maximum heights $h_1$. In some cases, at least two light directing portions can have unequal maximum heights. For example, referring to FIG. 7, maximum height 740A of light directing portion 710A is different than maximum height 740C of light directing portion 710C. In some cases, the maximum heights of some of the light directing portions is less than the maximum heights of some other light directing portions. For example, maximum height 740C is less than maximum height 740A.

In some cases, the maximum height of a disclosed light directing portion is less than about 500 microns, or less than about 400 microns, or less than about 300 microns, or less than about 200 microns, or less than about 100 microns, or less than about 90 microns, or less than about 80 microns, or less than about 70 microns, or less than about 60 microns, or less than about 50 microns, or less than about 40 microns, or less than about 30 microns, or less than about 20 microns, or less than about 10 microns.

Referring back to FIG. 1, each bonding portion 170 includes a top surface 190 that connects the plurality of side facets 172 of the bonding portion. In some cases, top surface 190 can be substantially planar. For example, referring to FIG. 3, top surface 390 of bonding portion 370 is substantially planar. As another example, referring to FIG. 4, top surface 490 of bonding portion 480 is substantially planar.

Figure 25:
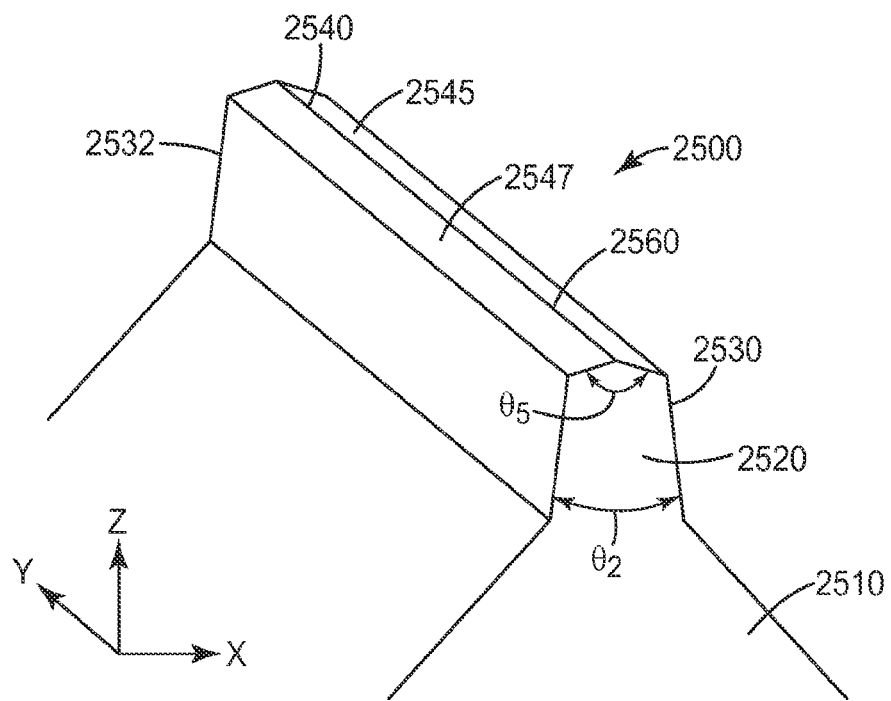
FIG. 25 is a schematic three-dimensional view of a unitary discrete structure.

In general, the top surface of a bonding portion can have any shape, such as any regular or irregular shape, or profile that may be desirable in an application. For example, in some cases, the top surface of a bonding portion is substantially piecewise planar. For example, FIG. 25 is a schematic three-dimensional view of a linear unitary discrete structure 2500 that extends along the y-direction and includes a light directing portion 2510 and a bonding portion 2520 that is disposed on the light directing portion. Bonding portion 2520 includes a side facet 2530 and an opposing side facet 2532, where the two side facets have an included angle $\theta_2$. In some cases, each side facet 2530 makes an angle with the xy-plane or the plane of the light directing film that is associated with unitary discrete structure 2500, that is greater that about 60 degrees, or about 65 degrees, or about 70 degrees, or about 75 degrees, or about 80 degrees, or about 85 degrees. The bonding portion also includes and a top surface 2540 that connects side facets 2530 and 2532. Top surface 2540 is piecewise planar and includes a first planar surface 2545 and a second planar surface 2547. In some cases, each of the top planar surfaces 2545 and 2547 makes an angle with the xy-plane that is less than about 60 degrees, or about 55 degrees, or about 50 degrees, or about 45 degrees, or about 40 degrees, or about 35 degrees, or about 30 degrees, or about 25 degrees, or about 20 degrees, or about 15 degrees, or about 10 degrees. The two planar surfaces intersect at a peak 2560 of top surface 2540, bonding portion 2520, and unitary discrete structure 2500, where peak 2560 is a line peak. Peak 2540 of the top surface or the bonding portion has an included angle $\theta_5$ between the two planar surfaces that, in some cases, can be different than included angle $\theta_2$. In general, included angle $\theta_5$ can be any angle, such as any angle from about zero degree to about 180 degrees, that may be desirable in an application. For example, in some cases, included angle $\theta_5$ can be greater than about 90 degrees, or about 100 degrees, or about 110 degrees, or about 120 degrees, or about 130 degrees, or about 140 degrees, or about 150 degrees, or about 160 degrees, or about 170 degrees. In some cases, the included angle $\theta_5$ is less than about 70 degrees, or about 65 degrees, or about 60 degrees, or about 55 degrees, or about 50 degrees, or about 45 degrees, or about 40 degrees, or about 35 degrees, or about 30 degrees, or about 25 degrees, or about 20 degrees.

Figure 26:
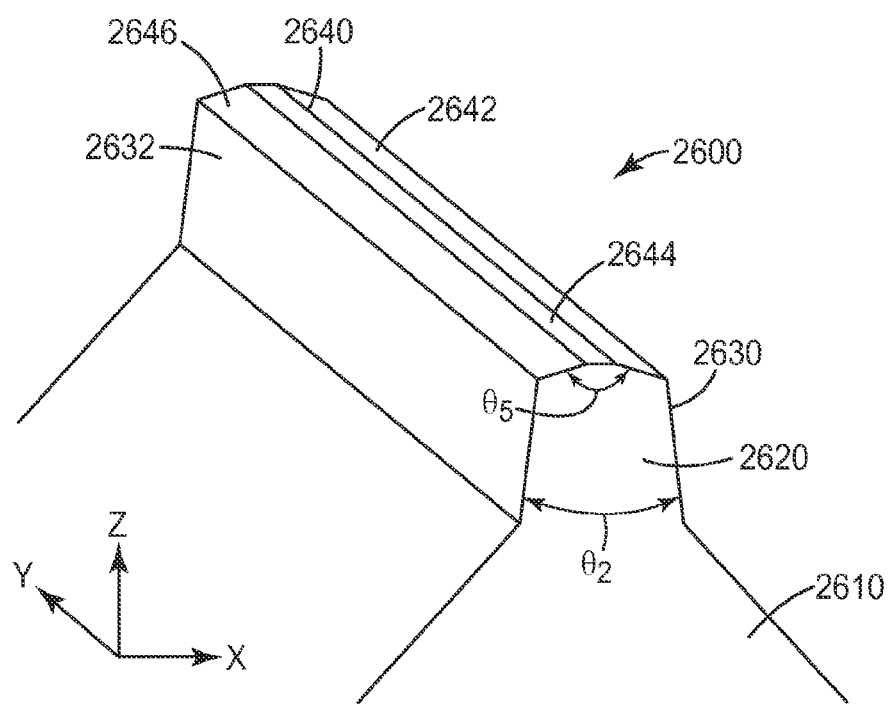
FIG. 26 is a schematic three-dimensional view of another unitary discrete structure.

As another example, FIG. 26 is a schematic three-dimensional view of a linear unitary discrete structure 2600 that extends along the y-direction and includes a light directing portion 2610 and a bonding portion 2620 that is disposed on the light directing portion. Bonding portion 2620 includes a side facet 2630 and an opposing side facet 2632, where the two side facets have an included angle $\theta_2$. The bonding portion also includes a top surface 2640 that connects side facets 2630 and 2632. Top surface 2640 is piecewise planar and includes a first planar surface 2642, a second planar surface 2644, and a third planar surface 2646. Planar surface 2644 also forms a peak of top surface 2640, bonding portion 2620, and unitary discrete structure 2600. Peak 2644 has an included angle $\theta_5$ that, in some cases, can be different than included angle $\theta_2$.

In some cases, such as when the facets are planar, facets of a bonding portion of a light directing film that make an angle with the plane of the light directing film that is greater that about 60 degrees, or about 65 degrees, or about 70 degrees, or about 75 degrees, or about 80 degrees, or about 85 degrees, form the side facets of the bonding portion and facets of the bonding portion that make an angle with the plane of the light directing film that is less than about 60 degrees, or about 55 degrees, or about 50 degrees, or about 45 degrees, or about 40 degrees, or about 35 degrees, or about 30 degrees, or about 25 degrees, or about 20 degrees, or about 15 degrees, or about 10 degrees, form the top facets of the bonding portion.

Figure 27:
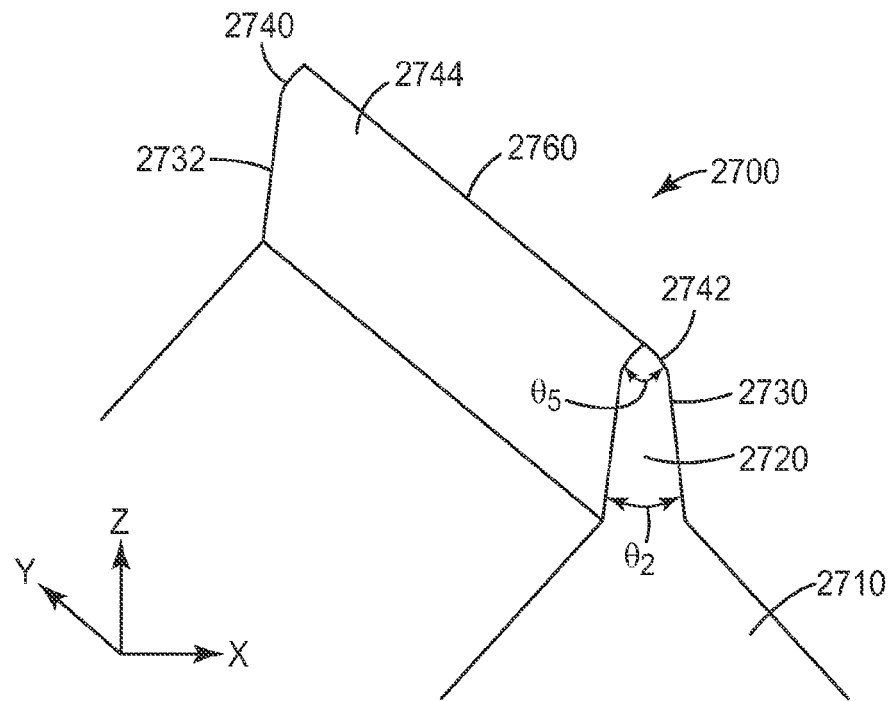
FIG. 27 is a schematic three-dimensional view of another unitary discrete structure.

In some cases, the top surface of a bonding portion can be substantially curved. For example, referring to FIG. 9, top surface 980 of bonding portion 970 is substantially curved. In some cases, the top surface of a bonding portion can be substantially piecewise curved. For example, FIG. 27 is a schematic three-dimensional view of a linear unitary discrete structure 2700 that extends along the y-direction and includes a light directing portion 2710 and a bonding portion 2720 that is disposed on the light directing portion. Bonding portion 2720 includes a side facet 2730 and an opposing side facet 2732, where the two side facets have an included angle $\theta_2$. The bonding portion also includes a top surface 2740 that connects side facets 2730 and 2732. Top surface 2740 is piecewise curved and includes a first curved surface 2742 and a second curved surface 2744. The two curved surfaces intersect at a peak 2760 of top surface 2740, bonding portion 2720, and unitary discrete structure 2700, where peak 2760 is a line peak. Peak 2760 of the top surface, the bonding portion, and the unitary discrete structure has an included angle $\theta_5$ between the two curved surfaces that, in some cases, can be different than included angle $\theta_2$. In some cases, the included angle $\theta_5$ is less than about 70 degrees, or about 65 degrees, or about 60 degrees, or about 55 degrees, or about 50 degrees, or about 45 degrees, or about 40 degrees, or about 35 degrees, or about 30 degrees, or about 25 degrees, or about 20 degrees.

Figure 28:
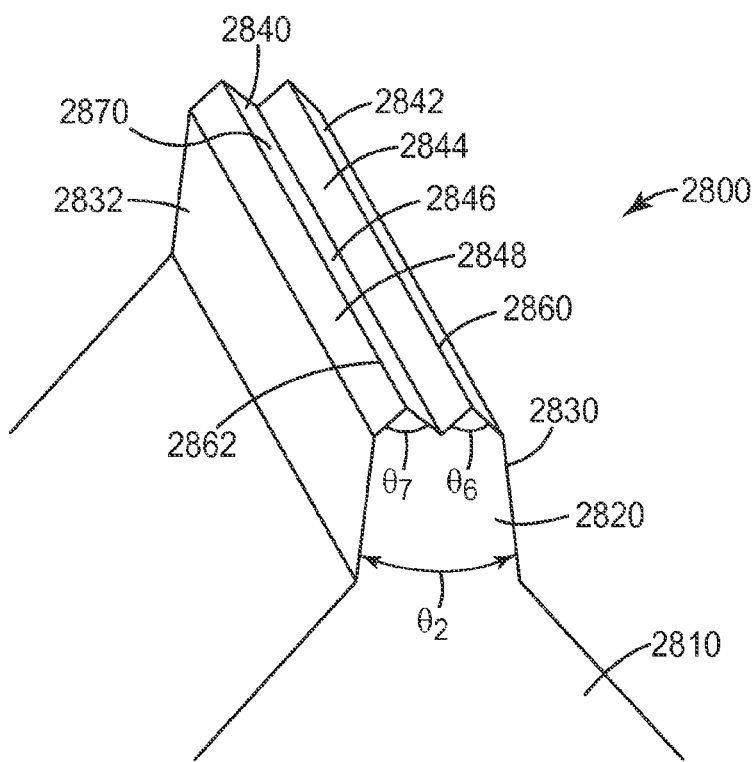
FIG. 28 is a schematic three-dimensional view of yet another unitary discrete structure.

In some cases, the top surface of a bonding portion can include one or more recessions. For example, FIG. 28 is a schematic three-dimensional view of a linear unitary discrete structure 2800 that extends along the y-direction and includes a light directing portion 2810 and a bonding portion 2820 that is disposed on the light directing portion. Bonding portion 2820 includes a side facet 2830 and an opposing side facet 2832, where the two side facets have an included angle $\theta_2$. The bonding portion also includes a top surface 2840 that connects side facets 2830 and 2832. Top surface 2840 is piecewise planar and includes a first planar surface 2842, a second planar surface 2844, a third planar surface 2846, and a fourth planar surface 2848. Adjacent planar surfaces 2842 and 2844 intersect at a first peak 2860 of top surface 2840, bonding portion 2820, and unitary discrete structure 2800, where first peak 2860 is a line peak. Top planar surfaces 2842 and 2844 define an included angle $\theta_6$ at first peak 2860 that, in some cases, can be different than included angle $\theta_2$. Adjacent planar surfaces 2846 and 2846 intersect at a second peak 2862 of top surface 2840, bonding portion 2820, and unitary discrete structure 2800, where first peak 2862 is a line peak. Top planar surfaces 2846 and 2848 define an included angle $\theta_7$ at second peak 2862 that, in some cases, can be different than included angles $\theta_2$ and/or $\theta_6$. Top surface 2840 includes a recession 2870 in the form of a recessed surface that is disposed between first peak 2860 and second peak 2862. In some cases, a sharp peak of a top surface of a bonding portion of a light directing film can assist the bonding portion in penetrating into an optical film or an optical adhesive layer of an optical film that is to be attached to the light directing film. In some cases, the top surface of a bonding portion, or a cross-section of the top surface in a direction perpendicular to the base of the bonding portion, can have multiple discrete peaks. For example, top surface 2840 of bonding portion 2820 includes two discrete peaks 2860 and 2862. In general, the peak angles $\theta_6$ and $\theta_7$ of respective peaks 2860 and 2862 of top surface 2840 can have any value that may be desirable in an application. For example, in some cases, the peak angle of at least one of the multiple discrete peaks 2860 and 2862 can be less than about 70 degrees, or about 65 degrees, or about 60 degrees, or about 55 degrees, or about 50 degrees, or about 45 degrees, or about 40 degrees, or about 35 degrees, or about 30 degrees, or about 25 degrees, or about 20 degrees.

Figure 30:
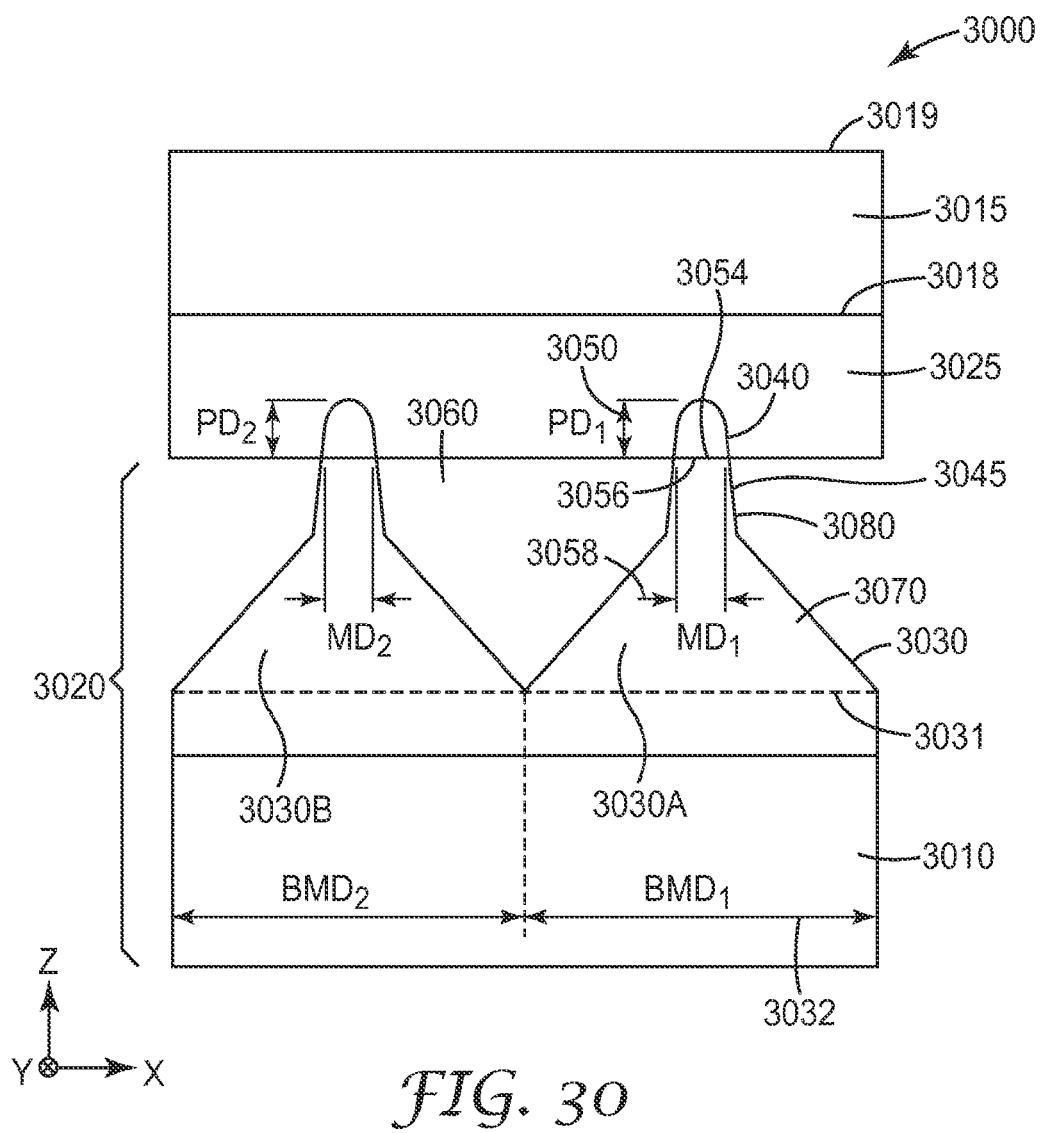
FIG. 30 is a schematic side-view of another optical stack.

FIG. 30 is a schematic side-view of an optical stack 3000 that includes a light directing film 3020 that includes a plurality of unitary discrete structures 3030 disposed on a first substrate 3010, a second substrate 3015 having a major surface 3018 facing the light directing film and an opposing major surface 3019 facing away from the light directing film, and an optical adhesive layer 3025 disposed between light directing film 3020 and second substrate 3015 for bonding or adhering the light directing film to surface 3018 of the second substrate.

Portion 3040 of each unitary discrete structure 3030 penetrates into optical adhesive layer 3025 and can be referred to as the penetrating portion 3040 of the unitary discrete structure. Portion 3045 of each unitary discrete structure 3030 does not penetrate into optical adhesive layer 3025 and can be referred to as the non-penetrating portion 3045 of the unitary discrete structure. Each penetrating unitary discrete structure defines a penetration depth 3050 which is the longest penetration distance normal to the optical stack (z-direction). For example, unitary discrete structure 3030A has a penetration depth $PD_1$ and unitary discrete structure 3030B has a penetration depth $PD_2$. Each unitary discrete structure also defines a penetration base 3054 at interface 3056 between penetrating portion 3040 and non-penetrating portion 3045 of the unitary discrete structure. Penetration base 3054 has a minimum penetration base dimension 3058 that, in some cases, can be the width of the penetration base along the x-axis. For example, unitary discrete structure 3030A has a minimum penetration base dimension $MD_1$ and unitary discrete structure 3030B has a minimum penetration base dimension $MD_2$. The plurality of unitary discrete structures 3030 has an average penetration depth and an average minimum penetration base dimension. For example, the unitary discrete structures 3030A and 3030B have an average penetration depth $PD_{avg}$ that is equal to $(PD_1+PD_2)/2$ and an average minimum penetration base dimension $MD_{avg}$ that is equal to $(MD_1+MD_2)/2$. The ratio of the average penetration depth to the average minimum penetration base dimension is sufficiently large so as to provide sufficient adhesion between light directing film 3020 and surface 3018. In some cases, the ratio of the average penetration depth to the average minimum penetration base dimension is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

Each unitary discrete structure 3030 includes a base 3031 that has a minimum base dimension 3032, where base 3031 is also the base of light directing portion 3070. For example, the base of unitary discrete structure 3030A has a minimum base dimension $BMD_1$ and the base of unitary discrete structure 3030B has a minimum base dimension $BMD_2$. The plurality of unitary discrete structures 3030 has an average minimum base dimension. For example, the unitary discrete structures 3030A and 3030B have an average minimum base dimension $BMD_{avg}$ that is equal to $(BMD_1+BMD_2)/2$. The average minimum penetration base dimension $MD_{avg}$ is sufficiently smaller than the average minimum base dimension $BMD_{avg}$ so that there is no, or very little loss, in the effective transmission of optical stack 3000. For example, in some cases, the average minimum penetration base dimension is less than about 20%, or about 15%, or about 10%, or about 9%, or about 8%, or about 7%, or about 6%, or about 5%, or about 4%, or about 3%, or about 2%, or about 1%, of the average minimum base dimension.

In some cases, the peel strength between light directing film 3020 and surface 3018 or second substrate 3015 is greater than about 20 grams/inch, or about 25 grams/inch, or about 30 grams/inch, or about 35 grams/inch, or about 40 grams/inch, or about 45 grams/inch, or about 50 grams/inch, or about 60 grams/inch, or about 70 grams/inch, or about 80 grams/inch, or about 90 grams/inch, or about 100 grams/inch, or about 110 grams/inch, or about 120 grams/inch, or about 130 grams/inch, or about 140 grams/inch, or about 150 grams/inch.

In some cases, optical stack 3000 includes a plurality of voids 3060 between optical adhesive layer 3025 and light directing film 3020. In some cases, the voids are discrete meaning that each void can be identified individually and as being separate from other voids. In some cases, a discrete void is bound on top by optical adhesive layer 3025, on bottom by light directing film 3020, on one side by the non-penetrating portion of a unitary discrete structure, and on the opposite side by the non-penetrating portion of a neighboring or adjacent unitary discrete structure.

In some cases, the penetration of penetrating portions 3040 or unitary discrete structures 3030 into optical adhesive layer 3025 results in no, or very little, loss in the effective transmission of optical stack 3000. For example, in such cases, the average effective transmission of optical stack 3000 is not less or is less than by no more than about 20%, or about 15%, or about 10%, or about 9%, or about 8%, or about 7%, or about 6%, or about 5%, or about 4%, or about 3%, or about 2%, or about 1%, as compared to an optical stack that has the same construction except that no unitary discrete structure penetrates into optical adhesive layer 3025.

Each unitary discrete structure 3030 includes a light directing portion 3070 that is designed primarily for directing light and a bonding portion 3080 that is designed primarily for bonding light directing film 3020 to surface 3018 or second substrate 3015. In some cases, at least portions of the bonding portion of each unitary discrete structure penetrates into optical adhesive layer 3025 and at least portions of the light directing portion of each unitary discrete structure does not penetrate into the optical adhesive layer. In some cases, such as when it is desirable to effectively direct light to enhance brightness, only at least portions of bonding portions 3080 penetrate into optical adhesive layer 3025 and no, or very little, portions of light directing portions 3070 penetrate into optical adhesive layer 3025.

In the exemplary optical stack 3000, unitary discrete structures 3030 of light directing film 3020 penetrate into optical adhesive layer 3025. In general, unitary discrete structures 3030 may penetrate into any optical layer that is capable of being penetrated and is desirable in an application. In general, optical stack 3000 includes light directing film 3020 that includes a first plurality of unitary discrete structures 3030. Optical stack 3000 also includes an optical layer 3025 that is disposed on light directing film 3020. Portions of each unitary discrete structure 3030 in the first plurality of unitary discrete structures penetrate into optical layer 3025. Portions of each unitary discrete structure 3030 in the first plurality of unitary discrete structures does not penetrate into optical layer 3025. Each unitary discrete structure (for example, unitary discrete structure 3030A) in the first plurality of unitary discrete structures defines a penetration depth (for example, $PD_1$) and a penetration base (for example, penetration base 3054) at an interface (for example, interface 3056) between the penetrating and non-penetrating portions of the unitary discrete structure. The penetration base has a minimum penetration base dimension (for example, $MD_1$). The first plurality of unitary discrete structures 3030 has an average penetration depth and an average minimum penetration base dimension. The ratio of the average penetration depth to the average minimum penetration base dimension is at least 1.5 and the peel strength between light directing film 3020 and optical layer 3025 is greater than about 30 grams/inch.

In some cases, optical layer 3025 can be a pressure sensitive adhesive, a structural adhesive, or a hot melt adhesive. In some cases, optical layer 3025 can be a lightguide, such as lightguide 3110 in FIG. 32, that includes means, such as light extractors 3112, for extracting light that propagates within the lightguide by total internal reflection.

In some cases, optical stack 3000 has a maximum operating temperature $T_{max}$ and optical layer 3025 has a glass transition $T_g$ that is greater than $T_{max}$. In such cases, optical stack 3000 can be prepared by first increasing the temperature of optical layer 3025 to a temperature that is greater than $T_g$ of the optical layer. Next, the heated optical layer and light directing film 3070 can be pressed against each other so that portions of unitary discrete structures 3030 penetrate into the heated optical layer. Next, the temperature of the optical layer can be reduced to, for example, room temperature. Since, $T_{max}$ is less than $T_g$, the optical stack remains intact and laminated when used at temperatures less than $T_{max}$.

All the structures in the first plurality of unitary discrete structures are unitary. Furthermore, only a portion of each structure penetrates into optical layer 3025 resulting in an average penetration depth and an average minimum penetration base dimension. In addition, the ratio of the average penetration depth to the average minimum penetration base dimension is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

In some cases, light directing film 3020 can include a second plurality of unitary discrete structures, where at least one unitary discrete structure in the second plurality of unitary discrete structures does not penetrate into optical layer 3025. For example, some unitary discrete structures in the second plurality of structures may be sufficiently shorter than structures 3030 so that they do not penetrate into optical layer 3025. For example, referring to FIG. 34, the first plurality of unitary discrete structures may include structures 3320 and the second plurality of unitary discrete structures may include structures 3330 that do not penetrate into an optical layer 3420 because they are shorter than structures 3320. In some case, light directing film 3020 can include a second plurality of structures that are composite and not unitary. For example, the second plurality of structures can include composite structures similar to composite structure 200 illustrated in FIG. 2.

Figure 31:
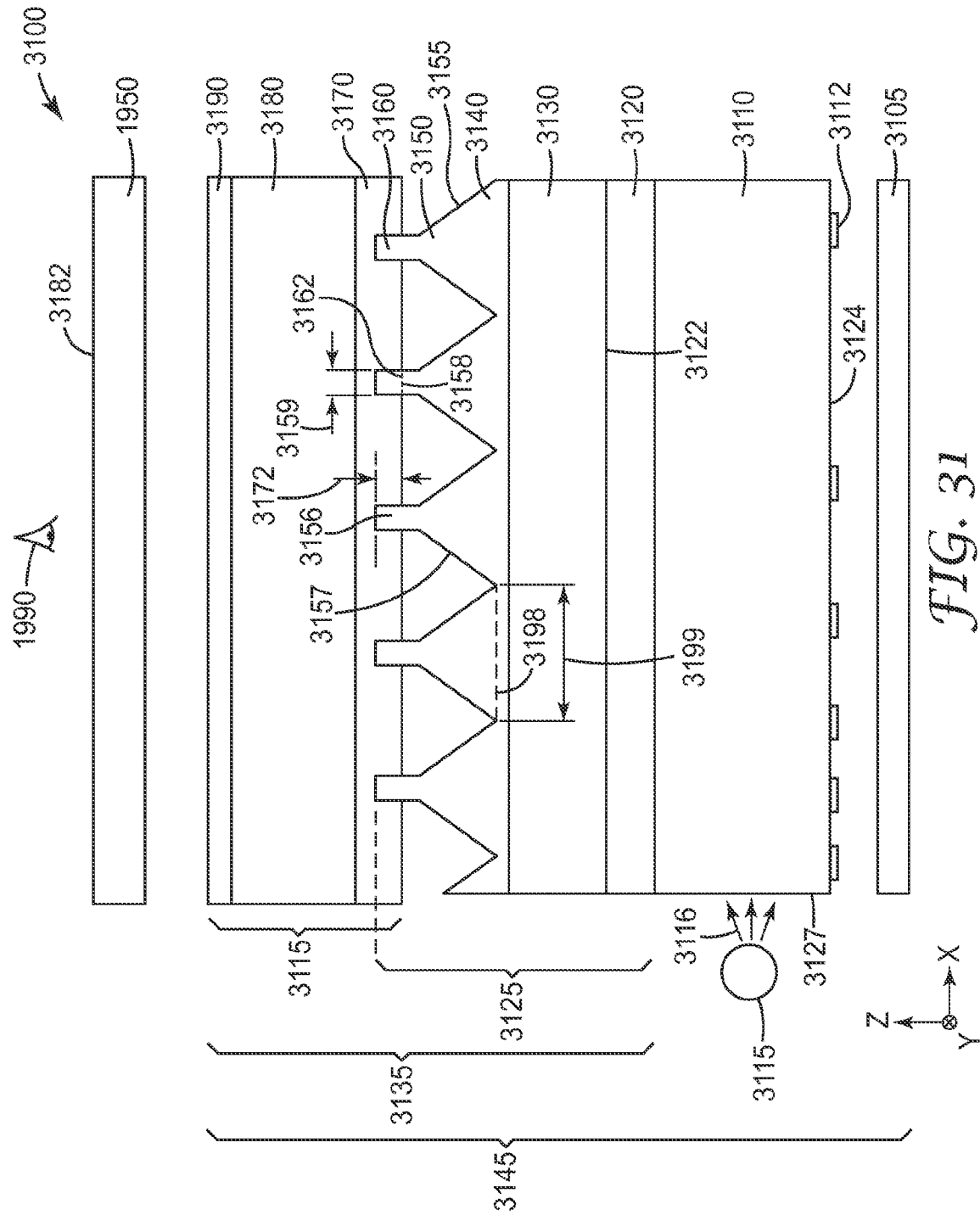
FIG. 31 is a schematic side-view of a display system.

FIG. 31 is a schematic side-view of a display system 3100 that includes image forming panel 1950 for forming and displaying information to viewer 1990. Image forming panel 1950 is disposed on an illumination system 3145 that includes a back reflector 3105 for reflecting light that is incident on the back reflector towards image forming panel 1950 and viewer 1990, a lightguide 3110 receiving light 3116 emitted by a lamp 3115 and emitting the received light towards image forming panel 1950, and an optical stack 3135 disposed on and adhering to lightguide 3110.

Optical stack 3135 includes a first optical stack 3115 disposed on and securely attached to a second optical stack 3125. First optical stack 3115 includes a first optical adhesive layer 3170 for adhering the first optical stack to the second optical stack and a reflective polarizer layer 3180 disposed on first optical adhesive layer 3170. Reflective polarizer layer 3180 substantially reflects light of a first polarization state and substantially transmits light of a second polarization state orthogonal to the first polarization state. For example, reflective polarizer layer 3180 reflects at least 50%, or at least 60%, or at least 70%, or at least 80%, or at least 90%, of a first polarization state and transmits at least 50%, or at least 60%, or at least 70%, or at least 80%, or at least 90%, of a second polarization state orthogonal to the first polarization state. In general, the pass or transmission axis of reflective polarizer layer 3180 can be oriented along any direction that may be desirable in an application. For example, in some cases, the pass axis of the reflective polarizer layer can be along the x-axis or the y-axis or make a 45 degree angle with the x- and y-axes. In some cases, reflective polarizer layer 3180 can have light collimating effects along one or more directions meaning that the reflective polarizer layer can confine light into a narrower viewing cone in one or more directions. For example, in some cases, reflective polarizer layer 3180 can reduce the viewing cone in the xz-plane, yz-plane or both.

In some cases, display system 3100 does not include a reflective polarizer layer 3180. In such cases, the display system may include a second light directing film adhered to first optical adhesive layer 3170.

Second optical stack 3125 includes a second optical adhesive layer 3120 for adhering the second optical stack to lightguide 3110, a low index layer 3130 disposed on the second optical adhesive layer, and a light directing film 3140 disposed on low index layer 3130.

Low index layer 3130 includes a plurality of voids dispersed in a binder having an index of refraction $n_b$. In some cases, the plurality of voids is or includes a plurality of interconnected voids dispersed in the binder.

In some cases, the low index layer has low optical haze. For example, in such cases, the optical haze of low index layer is not greater than about 8%, or not greater than about 7%, or not greater than about 6%, or not greater than about 5%, or not greater than about 4%, or not greater than about 3%, or not greater than about 2%, or not greater than about 1%. For light normally incident on low index layer 3130, optical haze, as used herein, is defined as the ratio of the transmitted light that deviates from the normal direction by more than 4 degrees to the total transmitted light. Haze values disclosed herein were measured using a Haze-guard Plus haze meter (BYK-Gardiner, Silver Springs, Md.) according to the procedure described in ASTM D1003.

In some cases, the voids in low index layer 3130 are sufficiently smaller than the wavelengths in the visible range of the spectrum, so that the low index layer has an effective index of refraction that is substantially less than the index of refraction $n_b$ of the binder in the low index layer. In such cases, the effective index of the low index layer is the volume weighted average of the indices of refraction of the voids and the binder. For example, a low index layer 3130 that has a void volume fraction of about 50% and a binder that has an index of refraction of about 1.5, has an effective index of about 1.25. In some cases, the average effective refractive index of the low index layer in the visible range of the spectrum is less than about 1.4, or less than about 1.35, or less than about 1.3, or less than about 1.25, or less than about 1.2, or less than about 1.15, or less than about 1.1, or less than about 1.09, or less than about 1.08, or less than about 1.07, or less than about 1.06, or less than about 1.05.

In some cases, low index layer 3130 has a large optical haze. In such cases, the optical haze of low index layer is not less than about 10%, or not less than about 15%, or not less than about 20%, or not less than about 25%, or not less than about 30%, or not less than about 35%, or not less than about 40%, or not less than about 45%, or not less than about 50%, or not less than about 60%, or not less than about 70%, or not less than about 80%. In such cases, low index layer 3130 can be capable of enhancing internal reflection meaning that the reflection is greater than what a material with index $n_b$ (binder index) would produce. In such cases, low index layer 3130 is sufficiently thick so that the evanescent tail of a light ray that undergoes total internal reflection at a surface of the low index layer, does not optically couple, or optically couples very little, across the thickness of the low index layer. In such cases, the thickness of low index layer 3130 is not less than about 1 micron, or not less than about 1.1 micron, or not less than about 1.2 microns, or not less than about 1.3 microns, or not less than about 1.4 microns, or not less than about 1.5 microns, or not less than about 1.7 microns, or not less than about 2 microns. A sufficiently thick low index layer 3130 can prevent or reduce an undesired optical coupling of the evanescent tail of an optical mode across the thickness of the low index layer.

In some cases, low index layer 3130 also includes a plurality of particles dispersed in the binder. The particles can have any size or shape, such as any regular or irregular shape, that may be desirable in an application. For example, in some cases, at least a majority of the particles, such as at least 60%, or at least 70%, or at least 80%, or at least 90%, or at least 95%, of the particles have a size that is in a desired range. For example, in some cases, at least a majority of the particles, such as at least 60%, or at least 70%, or at least 80%, or at least 90%, or at least 95%, of the particles have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, the particles have an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, the particles in the low index layer are sufficiently small so that the primary optical effect of the particles is to affect the effective index of low index layer 3130. For example, in such cases, the particles have an average size that is not greater than about $\lambda/5$, or not greater than about $\lambda/6$, or not greater than about $\lambda/8$, or not greater than about $\lambda/10$, or not greater than about $\lambda/20$, where $\lambda$ is the average wavelength of visible light. As another example, in such cases, the average particle size is not greater than about 70 nm, or not greater than about 60 nm, or not greater than about 50 nm, or not greater than about 40 nm, or not greater than about 30 nm, or not greater than about 20 nm, or not greater than about 10 nm.

The particles in low index layer 3130 can have any shape that may be desirable in an application. For example, the particles can have a regular or irregular shape. For example, the particles can be approximately spherical. As another example, the particles can be elongated.

In general, low index layer 3130 can have uniform or non-uniform effective index of refraction and/or optical haze. For example, in some cases, low index layer 3130 can have uniform effective index of refraction and uniform optical haze. As another example, in some cases, low index layer 3130 can have non-uniform optical haze. For example, in some cases, low index layer 3130 can have a gradient optical haze along, for example, the thickness direction of the low index layer. As another example, low index layer 3130 can include multilayers, where at least some of the layers have different effective refractive indices and/or optical haze values. For example, in some cases, low index layer 3130 can include multilayers, where each layer has a different effective index of refraction and/or optical haze. In such cases, the low index layer 3130 can have a staircase effective refractive index profile. As another example, low index layer 3130 can include multilayers having alternating high and low optical haze. Exemplary low index layers 3130 having non-uniform optical haze and/or effective refractive index are described in, for example, U.S. patent application Ser. No. 61/254,673 titled "Gradient Low Index Article and Method", filed on Oct. 24, 2009, and U.S. patent application Ser. No. 61/254,674 titled "Process for Gradient Nanovoided Article", filed on Oct. 24, 2009, the disclosures of which are incorporated herein in their entireties by reference.

Light directing film 3140 includes a plurality of unitary discrete structures 3155. A portion 3156 of each unitary discrete structure 3155 penetrates into first optical adhesive layer 3170 and can be considered as the penetrating portion 3156 of the unitary discrete structure. A portion 3157 of each unitary discrete structure 3155 does not penetrate into first optical adhesive layer 3170 and can be considered as the non-penetrating portion 3157 of the unitary discrete structure. Each unitary discrete structure 3155 defines a penetration depth 3172 and a penetration base 3158 at an interface 3162 between the penetrating portion 3156 and the non-penetrating portion 3157 of the unitary discrete structure. Penetration base 3158 has a minimum penetration base dimension 3159 that, in some cases, can be the width of the penetration base along the x-direction. The plurality of unitary discrete structures 3155 has an average penetration depth which is the average of the penetration depths of the individual unitary discrete structures, and an average minimum penetration base dimension that is the average of the minimum penetration base dimensions of the all the penetration bases. In some cases, the ratio of the average penetration depth to the average minimum penetration base dimension is at least about 1.2, or at least about 1.3, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

Each unitary discrete structure 3155 includes a base 3198 that has a minimum base dimension 3199, where base 3198 is also the base of light directing portion 3150. The plurality of unitary discrete structures 3155 has an average minimum base dimension. The average minimum penetration base dimension is sufficiently smaller than the average minimum base dimension so that there is no, or very little loss, in the effective transmission of optical stack 3135. For example, in some cases, the average minimum penetration base dimension is less than about 20%, or about 15%, or about 10%, or about 9%, or about 8%, or about 7%, or about 6%, or about 5%, or about 4%, or about 3%, or about 2%, or about 1%, of the average minimum base dimension.

In some cases, the peel strength between first optical stack 3115 and second optical stack 3125 is greater than about 20 grams/inch, or about 25 grams/inch, or about 30 grams/inch, or about 35 grams/inch, or about 40 grams/inch, or about 45 grams/inch, or about 50 grams/inch, or about 60 grams/inch, or about 70 grams/inch, or about 80 grams/inch, or about 90 grams/inch, or about 100 grams/inch, or about 110 grams/inch, or about 120 grams/inch, or about 130 grams/inch, or about 140 grams/inch, or about 150 grams/inch.

In some cases, unitary discrete structures 3155 are linear structures that extend along any direction that may be desirable in an application. For example, in some cases, the linear direction of structures 3155 can be parallel to the pass axis of reflective polarizer layer 3180. As another example, in some cases, the linear direction of structures 3155 can be perpendicular to the pass axis of reflective polarizer layer 3180.

In some cases, substantial portions of each two neighboring major surfaces in each of the first and second optical stacks are in physical contact with each other. For example, in such cases, at least 50%, or at least 60%, or at least 70%, or at least 80%, or at least 90%, of each two neighboring major surfaces in each of the first and second optical stacks are in physical contact with each other.

Light 3116 emitted by lamp 3115 enters lightguide 3110 from a side 3127 of the lightguide and propagates across the length of the lightguide along the x-direction. Low index layer 3130 facilitates the propagation of light within lightguide 3110 by supporting total internal reflection and/or enhancing internal reflection at an interface 3122 between low index layer 3130 and second optical adhesive layer 3120. In general, lightguide 3110 includes one or more means for extracting light that propagates within the lightguide toward the general direction of image forming panel 1950. For example, in some cases, lightguide 3110 includes a plurality of light extractors 3112 disposed, in some cases, on a bottom surface 3124 of the lightguide for extracting light. As another example, in some cases, the lightguide can be a wedge lightguide. Light extractors 3112 can be any type structure that is capable of extracting light by disrupting TIR. For example, light extractors 3112 can be depression or protrusions. In some cases, light extractors can be formed by printing, such as inkjet or screen printing or etching, such wet or dry etching.

In general, the lightguides disclosed herein, such as lightguides 1920 and 3110, can be any type lightguide that may be desirable in an application. For example, in some cases, a disclosed lightguide can be a thin film lightguide having a thickness that is less than about 500 microns, or about 400 microns, or about 300 microns, or about 200 microns, or about 100 microns, or about 75 microns, or about 50 microns, or about 25 microns. As another example, in some cases, a disclosed lightguide can be a plate lightguide having a thickness that is greater than about 0.5 mm, or about 1 mm, or about 1.5 mm, or about 2 mm. In some cases, a disclosed lightguide can be a slab lightguide having parallel major surfaces or a wedge lightguide having non-parallel, such as converging or diverging, major surfaces. In some cases, a disclosed lightguide can be rectangular or square. In some cases, a disclosed lightguide can be substantially flat or curved. In general, the disclosed lightguides can be made of any sufficiently optically transparent material that may be desirable in an application. Exemplary materials include polymers such as polycarbonate, acrylic and cyclo olefin polymer (COP) and glass.

First optical stack 3115 also includes a light diffusing layer 3190 that can be a surface and/or bulk diffuser. Light diffusing layer 3190 can assist in diffusing light, hiding or masking defects such as dust particles or scratches, and/or reducing the visibility of undesirable optical effects such as moiré. In some cases, light diffusing layer 3190 can be replaced by, or include, an optical layer or film disclosed herein. For example, in some cases, light diffusing layer 3190 can be replaced by a reflective polarizer or a light directing film such as light directing film 4100 or 4300. In such cases, a light directing film 3190 can include linear structures that extend along a first direction and light directing film 3140 can include linear unitary discrete structures that extend along a second direction, where the angle between the first and second directions can be any angle that may be desirable in an application. For example, the angle between the first and second directions can be about 90 degrees, or less than about 90 degrees, or less than about 80 degrees, or less than about 70 degrees, or less than about 60 degrees, or less than about 50 degrees, or less than about 40 degrees, or less than about 30 degrees, or less than about 20 degrees, or less than about 10 degrees. In some cases, reflective polarizer layer 3180 can be replaced by, or include a light directing film such as light directing film 4100 or 4300. In some cases, display system 3100 does not include any light diffusing layer, such as light diffusing layer 3190, between reflective polarizer layer 3180 and image forming panel 1950.

Each unitary discrete structure 3155 includes a light directing portion 3150 primarily for directing light and a bonding portion 3160 primarily for securely bonding second optical stack 3125 to first optical stack 3115 without reducing, or reducing very little, the effective transmission of optical stack 3135. In some cases, the penetration of penetrating portions 3156 or unitary discrete structures 3155 into first optical adhesive layer 3170 results in no, or very little, loss in the effective transmission of optical stack 3135. For example, in such cases, the average effective transmission of optical stack 3135 is not less or is less than by no more than about 20%, or about 15%, or about 10%, or about 9%, or about 8%, or about 7%, or about 6%, or about 5%, or about 4%, or about 3%, or about 2%, or about 1%, as compared to an optical stack that has the same construction except that no unitary discrete structure penetrates into first optical adhesive layer 3170.

In some cases, unitary discrete structures 3155 are linear structures that are substantially parallel to side 3127 of lightguide 3110, where side 3127 is the side of the lightguide that receives light 3116 emitted by lamp 3115. For example, in such cases, linear unitary discrete structures 3155 and side 3127 can extend along the y-direction. In some cases, side 3127 may extend along one direction, such as the y-direction, and the linear unitary discrete structures may extend along an orthogonal direction, such as the x-direction.

In general, display system 3100 can include any additional optical layer that is not expressly illustrated in FIG. 31. For example, in some cases, display system 3100 can include one or more additional layers between, for example, reflective polarizer layer 3180 and first optical adhesive layer 3170. As another example, in some cases, display system 3100 can include a sealing or barrier layer disposed between low index layer 3130 and second optical adhesive layer 3120 for preventing the adhesive layer from diffusing into and filling the voids in the low index layer.

Back reflector 3105 can be any light reflector that may be desirable in an application. For example, in some cases, back reflector 3105 can be primarily a specular reflector or primarily a diffuse reflector. As another example, in some cases, back reflector 3105 can be partially a diffuse reflector and partially a specular reflector. In some cases, back reflector 3105 can be an aluminized film, a silver coated film, or a multilayer polymeric reflective film, such as an enhanced specular reflector (ESR) film available from 3M Company, St. Paul, Minn. In some cases, back reflector 3105 can diffusely reflect light by including a surface and/or volume diffuser.

Figure 49:
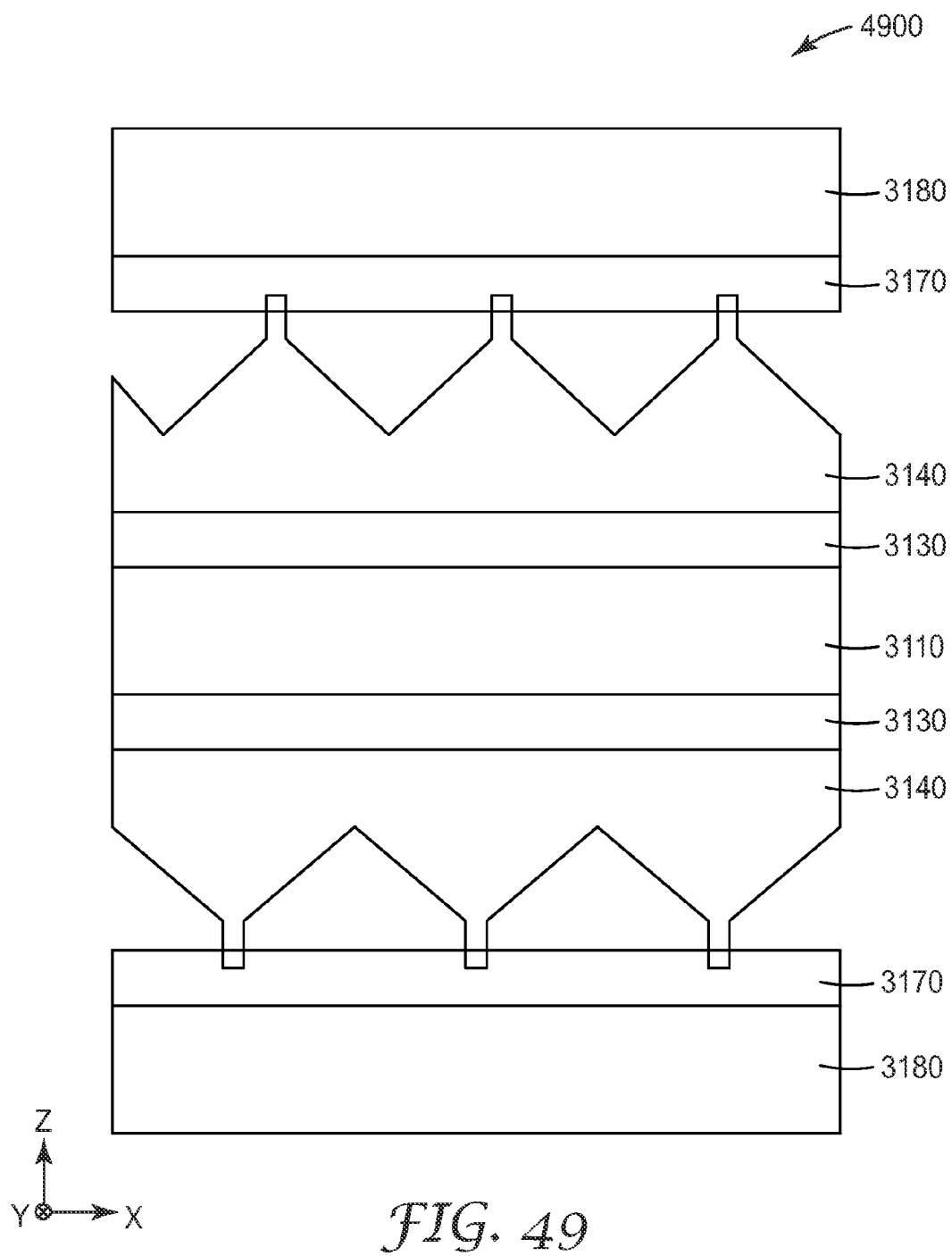
FIG. 49 is a schematic side-view of an optical stack.

In the exemplary display system 3100 light that is extracted from lightguide 3110 is directed along the positive z-direction towards image forming device 1950. In some cases, light that is extracted from the lightguide may be directed along more than one direction. For example, FIG. 49 is a schematic side-view of an optical stack 4900 that directs a portion of light that is extracted from lightguide along the positive z-direction and directs another portion of the extracted light along the negative z-direction.

In some cases, the reflective polarizers, such as reflective polarizer layer 3180, disclosed herein can be replaced with a partially reflecting layer that reflects a portion of an incident light and transmits another portion of the incident light. In general, each of the reflected and transmitted beams can have a specular portion and a diffuse portion. For example, a portion of an incident light can be specularly reflected by the partially reflecting layer and another portion of the incident light can be diffusely reflected by the partially reflecting layer. As another example, a portion of an incident light can be specularly transmitted by the partially reflecting layer and another portion of the incident light can be diffusely transmitted by the partially reflecting layer. As another example, a partially reflecting layer 3180 can specularly transmit light and diffusely reflect light, or diffusely transmit light and specularly reflect light. In some cases, a partially reflecting layer 3180 can be a non-polarizing partially reflecting layer. For example, a partially reflecting layer 3180 can include a partially reflective metal and/or dielectric layer. In some cases, a partially reflecting layer 3180 can be a polarizing partially reflecting layer similar to the reflective polarizers disclosed herein.

Figure 32:
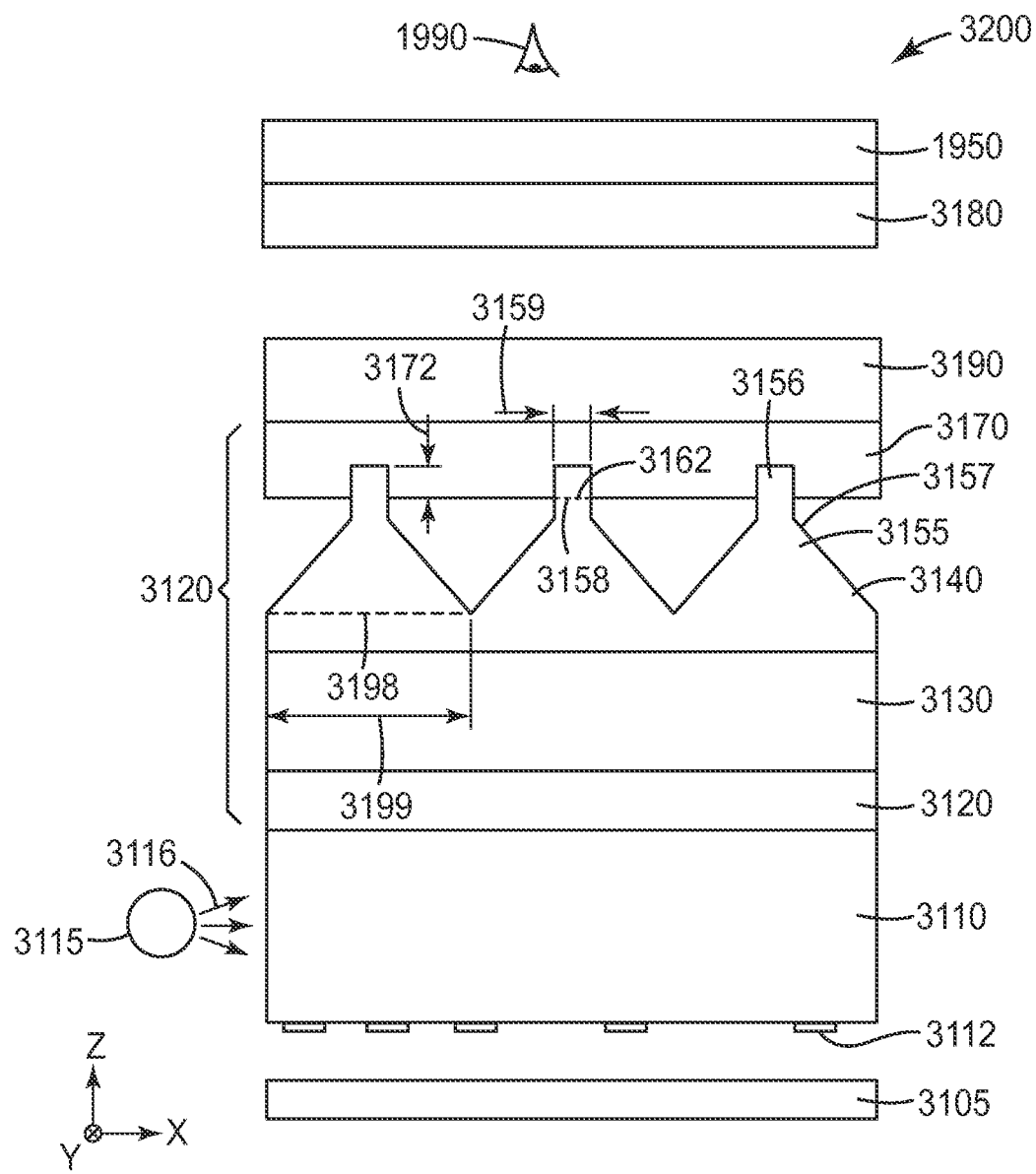
FIG. 32 is a schematic side-view of another display system.

FIG. 32 is a schematic side-view of a display system 3200 that is similar to display system 3100. In display system 3200, reflective polarizer layer 3180 is disposed on and adhered to image forming panel 1950 and light diffusing layer 3190 is disposed on first optical adhesive layer 3170. An optical stack 3210 in display system 3200 includes second optical adhesive layer 3120, low index layer 3130 disposed on the second optical adhesive layer, light directing film 3140 that is disposed on the low index layer and includes plurality of unitary discrete structures 3155, and first optical adhesive layer 3170 that is disposed on the light directing film. Portions 3156 of each unitary discrete structure penetrates into first optical adhesive layer 3170 and portions 3157 of each unitary discrete structure does not penetrate into first optical adhesive layer 3170. Each unitary discrete structure 3155 defines a penetration depth 3172 and a penetration base 3158 at an interface 3162 between the penetrating and non-penetrating portions of the unitary discrete structure. Penetration base 3158 has a minimum dimension 3159. Plurality of unitary discrete structures 3155 has an average penetration depth and an average minimum dimension. The ratio of the average penetration depth to the average minimum dimension is at least about 1.2, or at least about 1.3, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

In some cases, the penetration of penetrating portions 3156 or unitary discrete structures 3155 into first optical adhesive layer 3170 results in no, or very little, loss in the effective transmission of optical stack 3210. For example, in such cases, the average effective transmission of optical stack 3210 is not less or is less than by no more than about 20%, or about 15%, or about 10%, or about 9%, or about 8%, or about 7%, or about 6%, or about 5%, or about 4%, or about 3%, or about 2%, or about 1%, as compared to an optical stack that has the same construction except that no unitary discrete structure penetrates into first optical adhesive layer 3170.

Each unitary discrete structure 3155 includes a base 3198 that has a minimum base dimension 3199. The plurality of unitary discrete structures 3155 has an average minimum base dimension. The average minimum penetration base dimension is sufficiently smaller than the average minimum base dimension so that there is no, or very little loss, in the effective transmission of optical stack 3210. For example, in some cases, the average minimum penetration base dimension is less than about 20%, or about 15%, or about 10%, or about 9%, or about 8%, or about 7%, or about 6%, or about 5%, or about 4%, or about 3%, or about 2%, or about 1%, of the average minimum base dimension.

In some cases, the peel strength between light directing film 3140 and first optical adhesive layer 3170 is greater than about 20 grams/inch, or about 25 grams/inch, or about 30 grams/inch, or about 35 grams/inch, or about 40 grams/inch, or about 45 grams/inch, or about 50 grams/inch, or about 60 grams/inch, or about 70 grams/inch, or about 80 grams/inch, or about 90 grams/inch, or about 100 grams/inch, or about 110 grams/inch, or about 120 grams/inch, or about 130 grams/inch, or about 140 grams/inch, or about 150 grams/inch.

Figure 50:
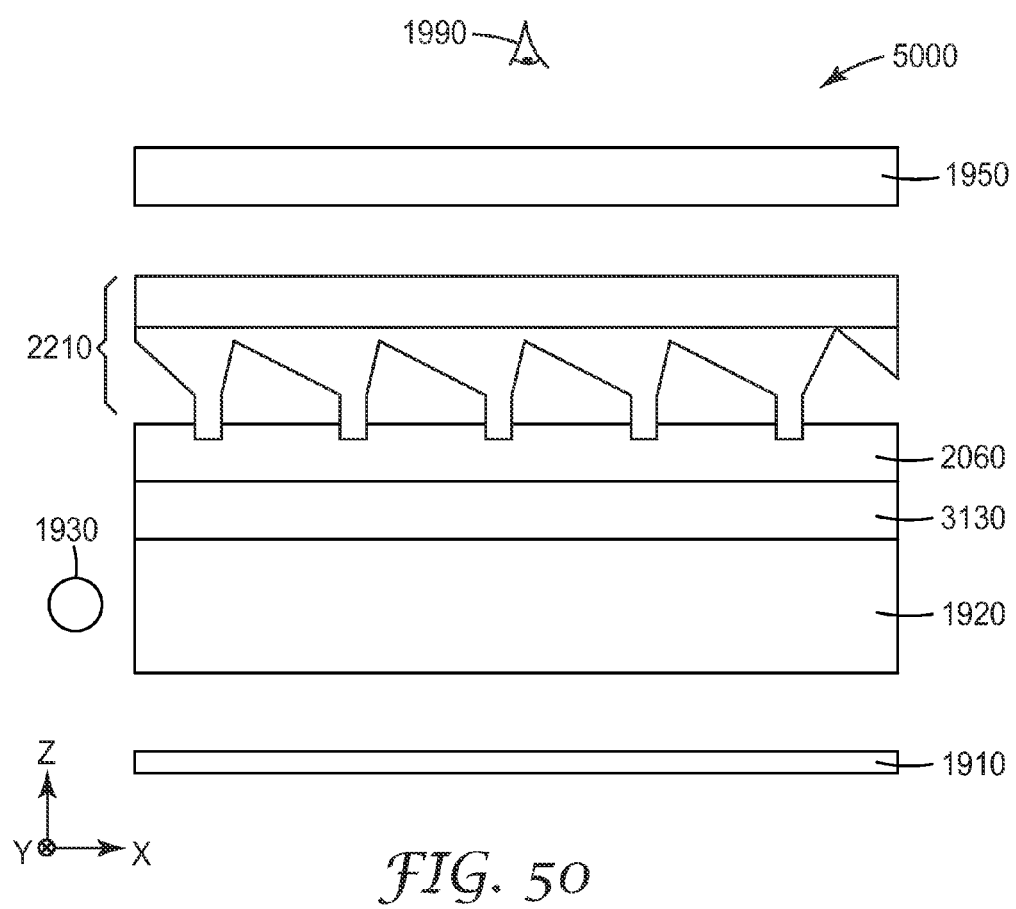
FIG. 50 is a schematic side-view of a display system.

In some cases, a light directing film that is primarily designed to direct, but not recycle light, can be adhered to a lightguide via a low index layer. For example, FIG. 50 is a schematic side-view of a display system 5000 that includes light directing film 2210 from FIG. 22 laminated to lightguide 1920 via optical adhesive layer 2060 and low index layer 3130. In some cases, light directing film 2210 can be laminated to image forming device 1950 via an optical adhesive layer not expressly illustrated in FIG. 50.

Low index layer 3130 can be any optical layer that includes a plurality of voids dispersed in a binder. For example, low index layer 3130 can be an optical layer described in U.S. patent application Ser. No. 61/169,466 titled "Optical Film", filed on Apr. 15, 2009; and U.S. patent application Ser. No. 61/169,521 "Optical Construction and Display System Incorporating Same", filed on Apr. 15, 2009. As another example, low index layer 3130 can be an optical layer described in U.S. Patent Application Ser. No. 61/254,676 titled "Voided Diffuser", filed on Oct. 24, 2009; and U.S. patent application Ser. No. 61/254,243 "Optical Construction and Method of Making the Same", filed on Oct. 23, 2009; the disclosures of which are incorporated herein in their entireties by reference.

The disclosed optical adhesive layers, such as optical adhesive layers 2060, 3025, 3120 and 3170 can be or include any optical adhesive that may be desirable in an application. Exemplary optical adhesives include pressure sensitive adhesives (PSAs), heat-sensitive adhesives, solvent-volatile adhesives, and UV-curable adhesives such as UV-curable optical adhesives available from Norland Products, Inc. Exemplary PSAs include those based on natural rubbers, synthetic rubbers, styrene block copolymers, (meth)acrylic block copolymers, polyvinyl ethers, polyolefins, and poly(meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

In some cases, an optical adhesive layer disclosed herein can be or include a structural adhesive. Generally, useful structural adhesives contain reactive materials that cure to form a strong adhesive bond. The structural adhesive may cure spontaneously upon mixing (such as a 2 part epoxy adhesive) or upon exposure to air (such as a cyanoacrylate adhesive) or curing may be effected by the application of heat or radiation (such as UV light). Examples of suitable structural adhesives include epoxies, acrylates, cyanoacrylates, urethanes, and the like.

In some cases, a disclosed optical adhesive layer can be a removable adhesive such as those described in, for example, U.S. Pat. Nos. 3,691,140; 4,166,152; 4,968,562; 4,994,322; 5,296,277; 5,362,516, the disclosures of which are incorporated herein in their entireties by reference. The phrase "removable adhesive" for adhering a film to a substrate means an adhesive that affords convenient, manual removal of the film from the substrate without damaging the substrate or exhibiting excessive adhesive transfer from the film to the substrate.

In some cases, a disclosed optical adhesive layer can be a reusable and/or repositionable adhesive such as those described in, for example, U.S. Pat. No. 6,197,397; U.S. Patent Publication No. 2007/0000606; and PCT Publication No. WO 00/56556, the disclosures of which are incorporated herein in their entireties by reference. The phrases "reusable adhesive" or "repositionable adhesive" for adhering a film to a substrate mean an adhesive that (a) affords a temporary, secure attachment of the film to the substrate while affording convenient, manual removal of the film from the substrate without damaging the substrate or exhibiting excessive adhesive transfer from the film to the substrate, and (b) then affords subsequent reuse of the film on, for example, another substrate.

In some cases, a disclosed optical adhesive layer can be optically diffusive. In such cases, the optical adhesive layer can be optically diffusive by including a plurality of particles dispersed in an optical adhesive where the particles and the optical adhesive have different indices of refraction. The mismatch between the two indices of refraction can result in light scattering. In some cases, a disclosed optical adhesive can be a continuous layer. In some cases, a disclosed optical adhesive layer can be patterned.

Figure 33:
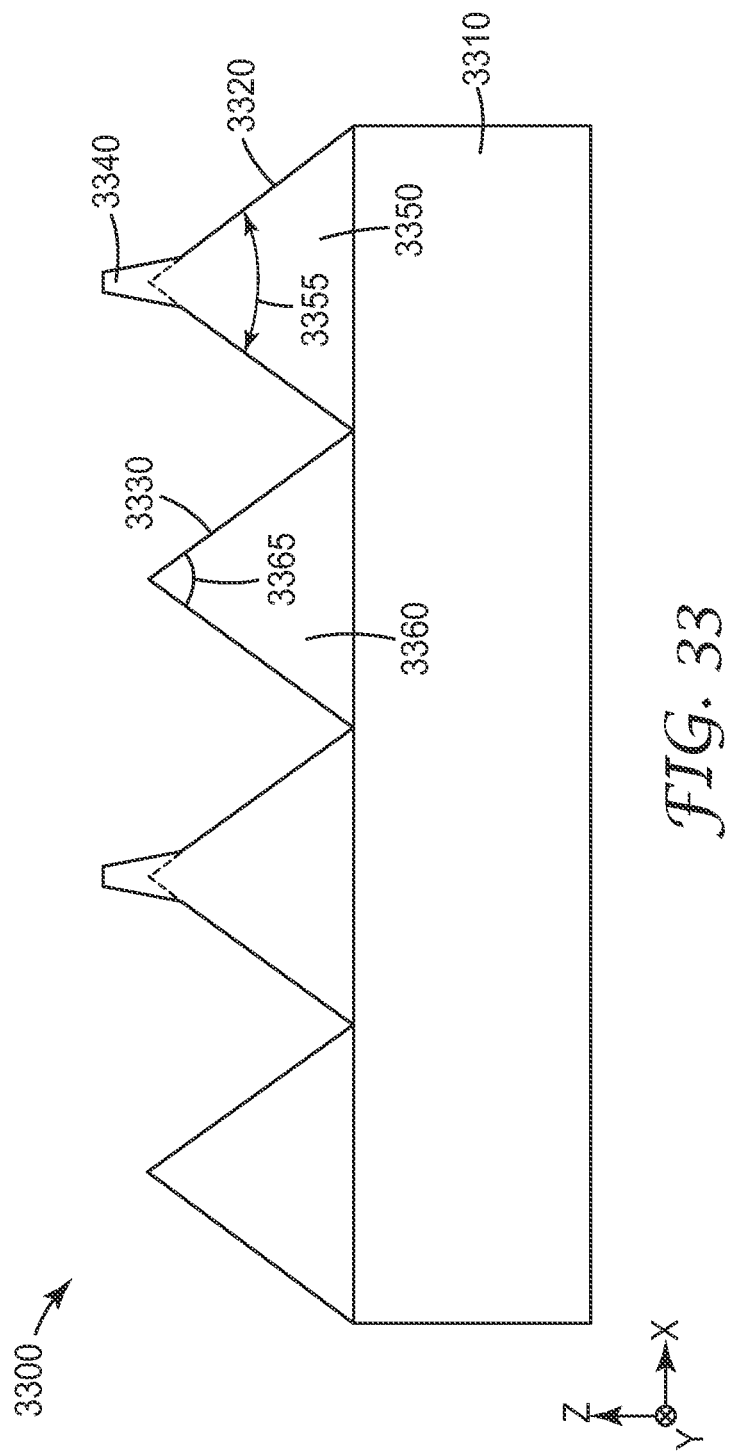
FIG. 33 is a schematic side-view of a light directing film.

In some cases, some discrete structures in a light directing film can have bonding portions and light directing portions and some other discrete structures may have no bonding portions and may only have light directing portions. For example, FIG. 33 is a side-view schematic of a light directing film 3300 that includes a first plurality of unitary discrete structures 3320 and a second plurality of discrete structures 3330 disposed on a substrate 3310. Unitary discrete structures 3320 includes bonding portions 3340 designed primarily for bonding the light directing film to a surface and light directing portions 3350 designed primarily for directing light and have an included angle 3355. Discrete structures 3330 do not include bonding portions and only include light directing portions 3360 that are prismatic and have an apex angle 3365. In some cases, apex angle 3365 and included angle 3355 can be substantially equal and can, for example, be about 90 degrees. In general, unitary discrete structures can be any unitary discrete structure disclosed herein and discrete structures 3330 can be any discrete structure that is capable of directing light. In some cases, unitary discrete structures 3320 and discrete structures 3330 can be linear structures extending along the same direction, such as, for example, the y-direction. In the exemplary light directing film 3300, the rows of the discrete structures alternate between unitary discrete structures 3320 and discrete structures 3330. In general, each of unitary discrete structures 3320 and discrete structures 3330 can form any pattern or arrangement that may be desirable in an application. For example, discrete structures 3320 and 3330 can form a regular, such as periodic, or an irregular, such as a random, pattern.

Figure 34:
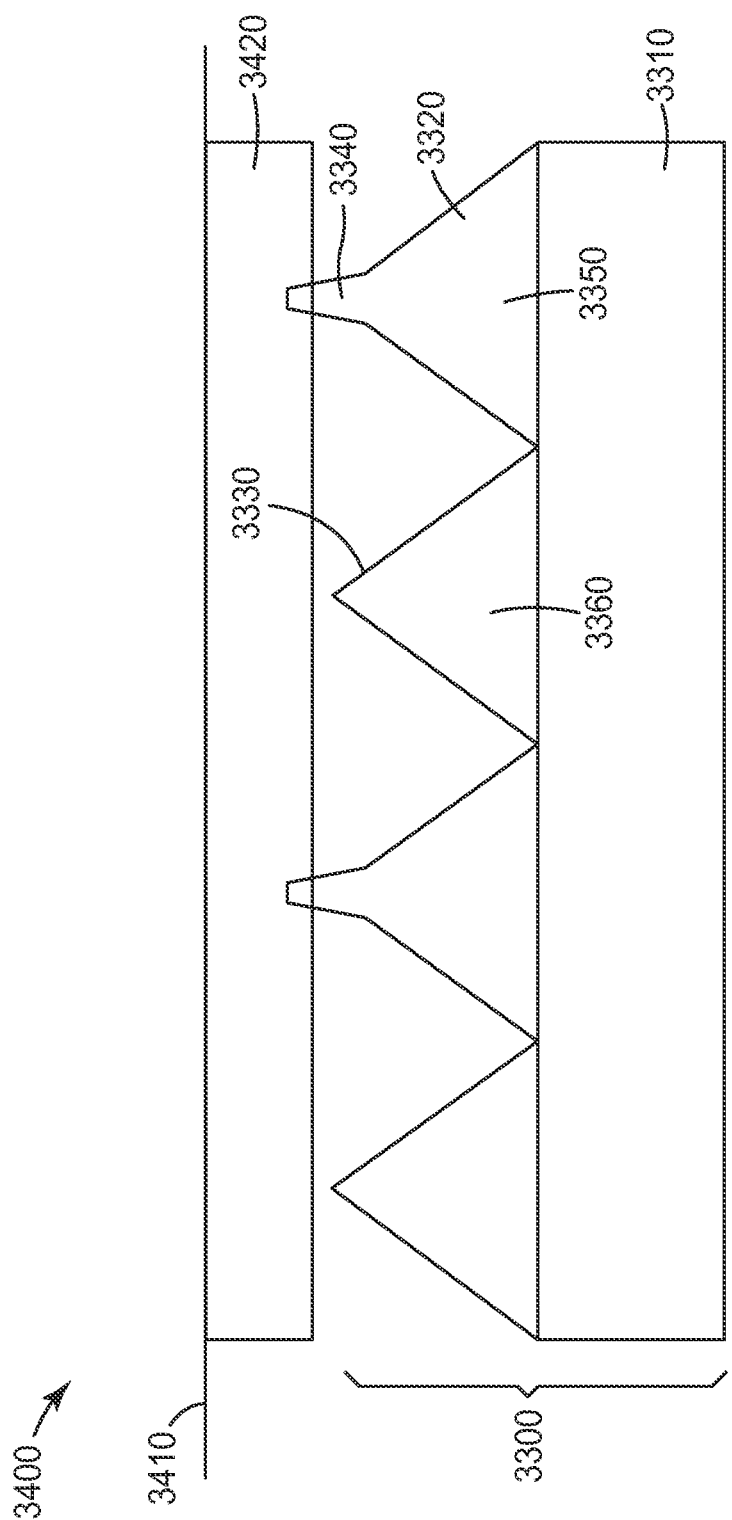
FIG. 34 is a schematic side-view of an optical stack.

FIG. 34 is a schematic side-view of an optical stack 3400 that includes light directing film 3300 laminated to a surface 3410 via an optical adhesive layer 3420. Bonding portions 3340 of unitary discrete structures 3320 at least partially penetrate into optical adhesive layer 3420 to provide secure attachment between light directing film 3300 and surface 3410. In the exemplary optical stack 3400, discrete structures 3330 do not penetrate into the optical adhesive layer, although, in some cases, portions of at least some discrete structures 3330 can penetrate into the optical adhesive layer. Light directing film 3300 includes sufficient number of bonding portions 3340 to provide sufficient adhesion between light directing film 3300 and surface 3410. At the same time, the number or density of bonding portions 3340 is sufficiently low so that there is no, or very little, loss in the optical gain or effective transmission of optical stack 3400.

Figure 48:
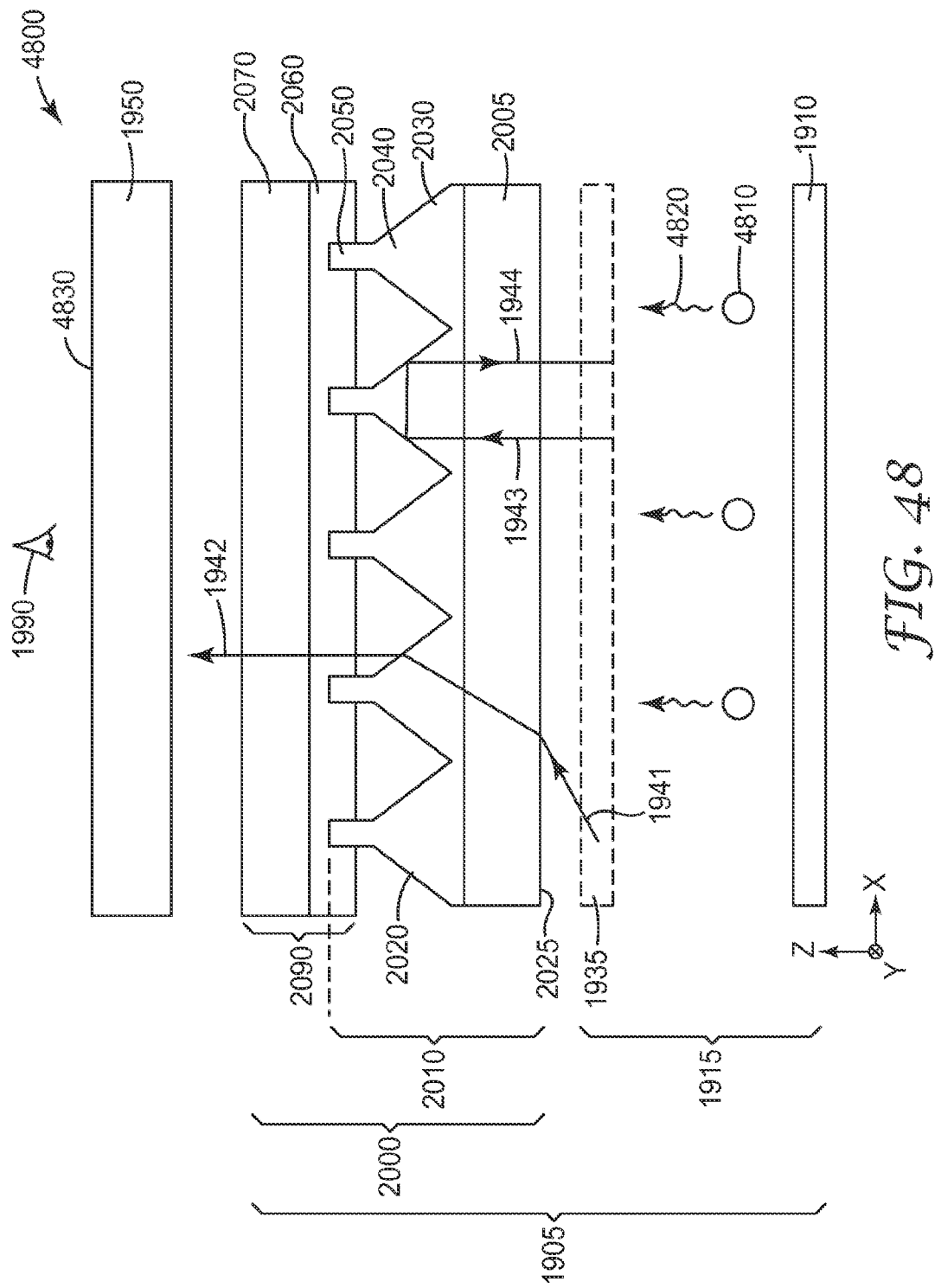
FIG. 48 is a schematic side-view of a display system.
Figure 51:
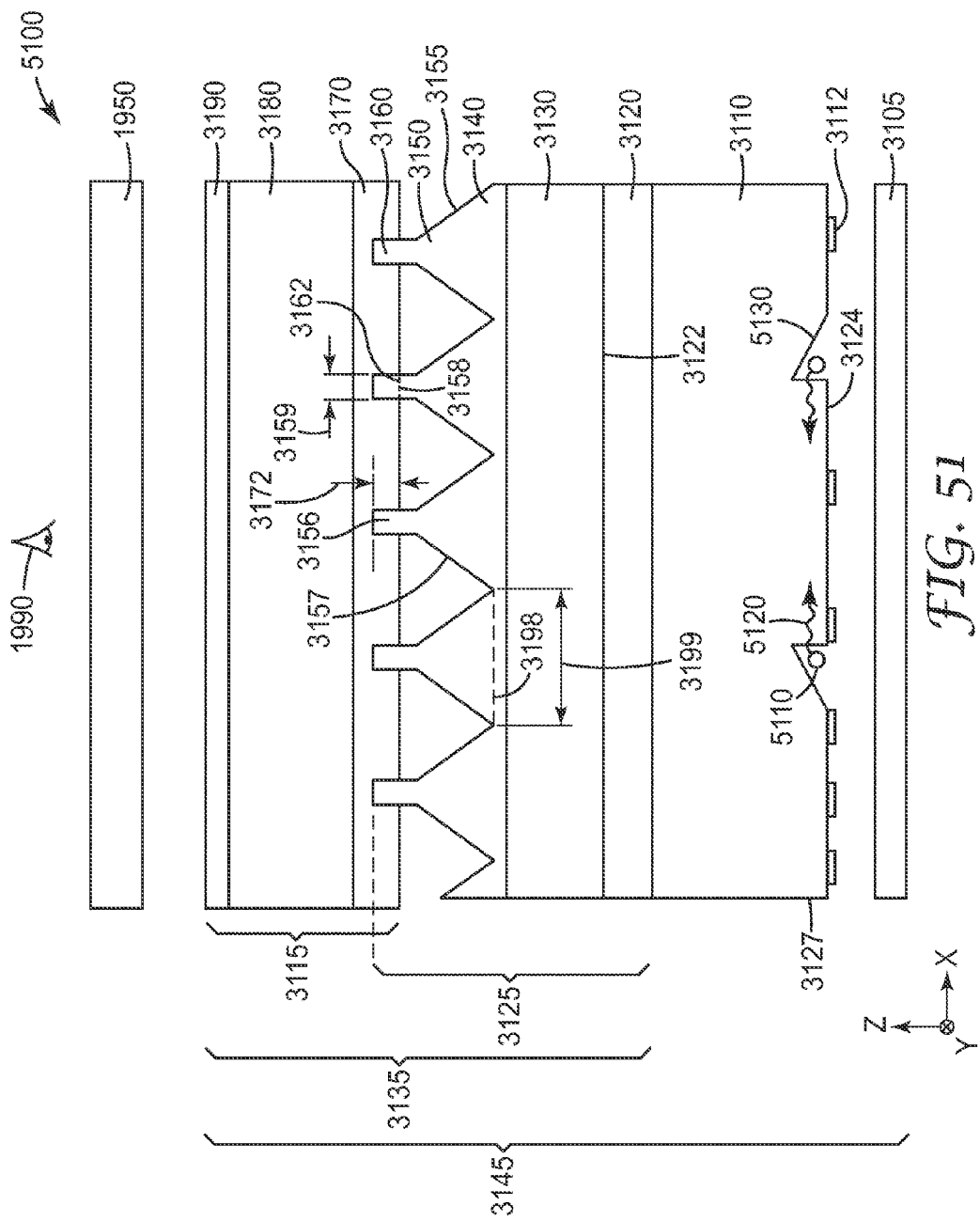
FIG. 51 is a schematic side-view of another display system.

Some of the exemplary display systems disclosed herein, such as display system 1900 in FIG. 19 or display system 3100 in FIG. 31, illustrate "edge-lit" displays. In an edge-lit display, one or more lamps, such as lamp 3115 in FIG. 31, are disposed along an edge or side, such as side 3127, of the display and outside an output or viewing face, such as viewing face 3182, of the display, where the viewing face of the display is the area across which information is displayed to viewer 1990. Light, such as light 3116, emitted by the lamps typically enters a lightguide, such as lightguide 3110, which spreads and redirects the light towards the viewing face of the display. In a direct-lit display, one or more, or an array of, lamps are disposed directly behind the major surfaces, such as output face 3182, of the various layers in the display system. For example, FIG. 48 is a schematic side-view of a display system 4800 that is similar to display 1900 except that display system 4800 is a direct-lit display and includes a plurality of lamps 4810 that are disposed behind the major surfaces of the various layers in the display system. In particular, lamps 4810 are disposed directly behind viewing face 4830 of display system 4800 or image forming panel 1950. Lamps 4810 emit light 4820 towards the image forming panel. In some cases, optional layer 1935 can include an optical diffuser layer for diffusing light 4820 and masking lamps 4810. As another example, FIG. 51 is a schematic side-view of a display system 5100 that is similar to display system 3100 except that lamps 3115 have been replaced with a plurality of lamps 5110 that emit light 5120 into lightguide 3110 and are housed in cavities 5130 formed within the lightguide.

In general, the light directing films in the disclosed optical stacks, such as optical stacks 3000, 3135 and 3210, may or may not have unitary structures. For example, referring to FIG. 31, in some cases, structures 3155 may be composite structures. For example, in such cases, bonding portions 3160 may form detectable interfaces with light directing portions 3150.

Figure 35:
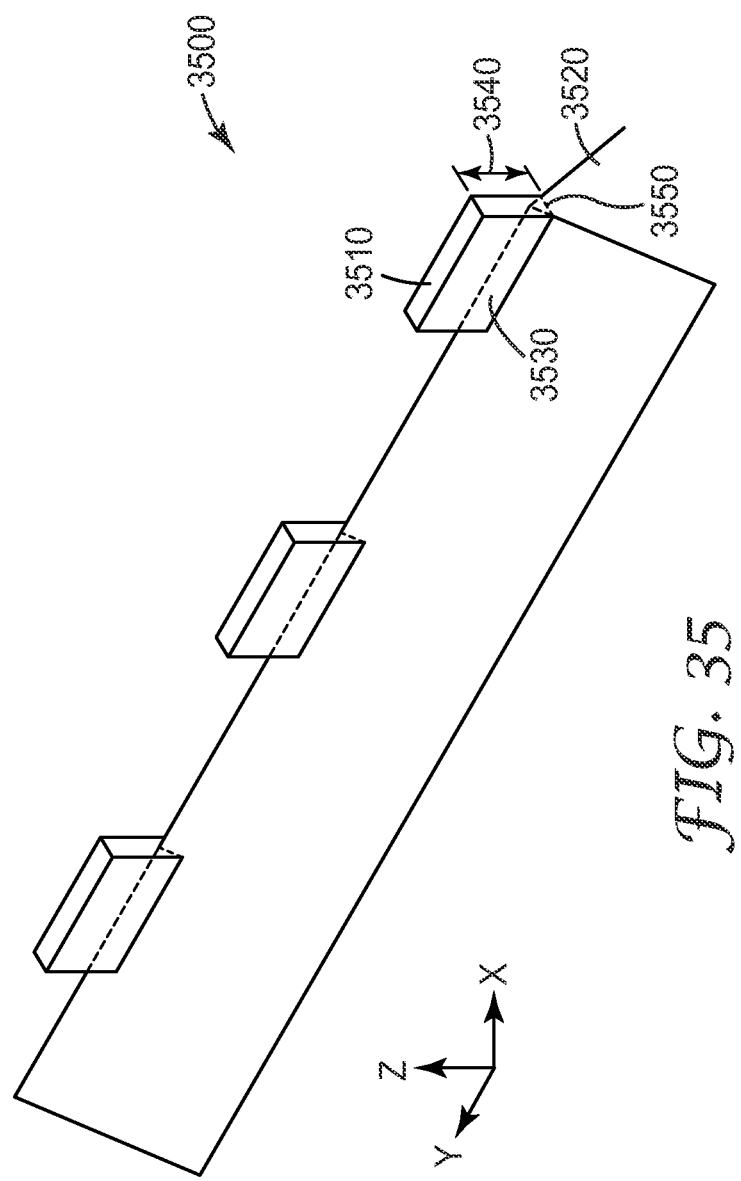
FIG. 35 is a schematic three-dimensional view of a unitary discrete structure.

In some cases, only portions of a unitary discrete structure includes bonding portions. For example, FIG. 35 is a schematic three-dimensional view of a linear unitary discrete structure 3500 that extends along the y-direction and includes a plurality of discrete bonding portions 3510 disposed on a light directing portion 3520. Bonding portions 3510 and light directing portion 3520 can be any bonding portion and light directing portion disclosed herein. Each bonding portion 3510 includes a base 3530 that has a minimum dimension 3550. Each bonding portion also has a maximum height 3540. The density of bonding portions 3510 is sufficiently high, the ratio of maximum height 3540 to minimum dimension 3550 is sufficiently large, and minimum dimension 3550 is sufficiently small so that the bonding portions can provide sufficient adhesion between unitary discrete structure and a surface with no, or very little, loss in the effective transmission of the unitary discrete structure or the light directing film that is associated with the unitary discrete structure. In general, bonding portions 3510 can forms any distribution or arrangement that may be desirable in an application. For example, in some cases, bonding portions 3510 can be irregularly, such as randomly, arranged in a light directing film.

Figure 36:
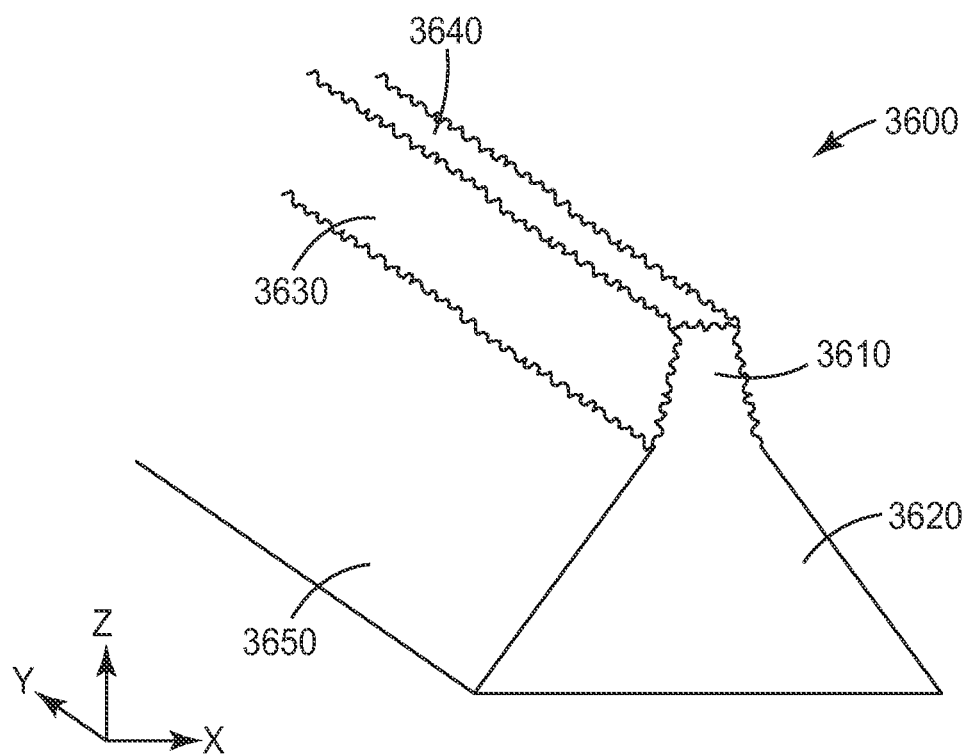
FIG. 36 is a schematic three-dimensional view of another unitary discrete structure.

In some cases, at least portions of the side facets and/or the top surface of the bonding portions of unitary discrete structures can be structured, such as roughened, to enhance adhesion of the bonding portions to a surface. For example, FIG. 36 is a schematic three-dimensional view of a linear unitary discrete structure 3600 that extends along the y-direction and includes a bonding portion 3610 disposed on a light directing portion 3620. Side facets 3630 and top surface 3640 of the bonding portion are roughened to improve adhesion of the bonding portion to a surface. Light directing portion 3620 includes smooth side facets 3650 to provide efficient light directing or recycling.

Figure 37:
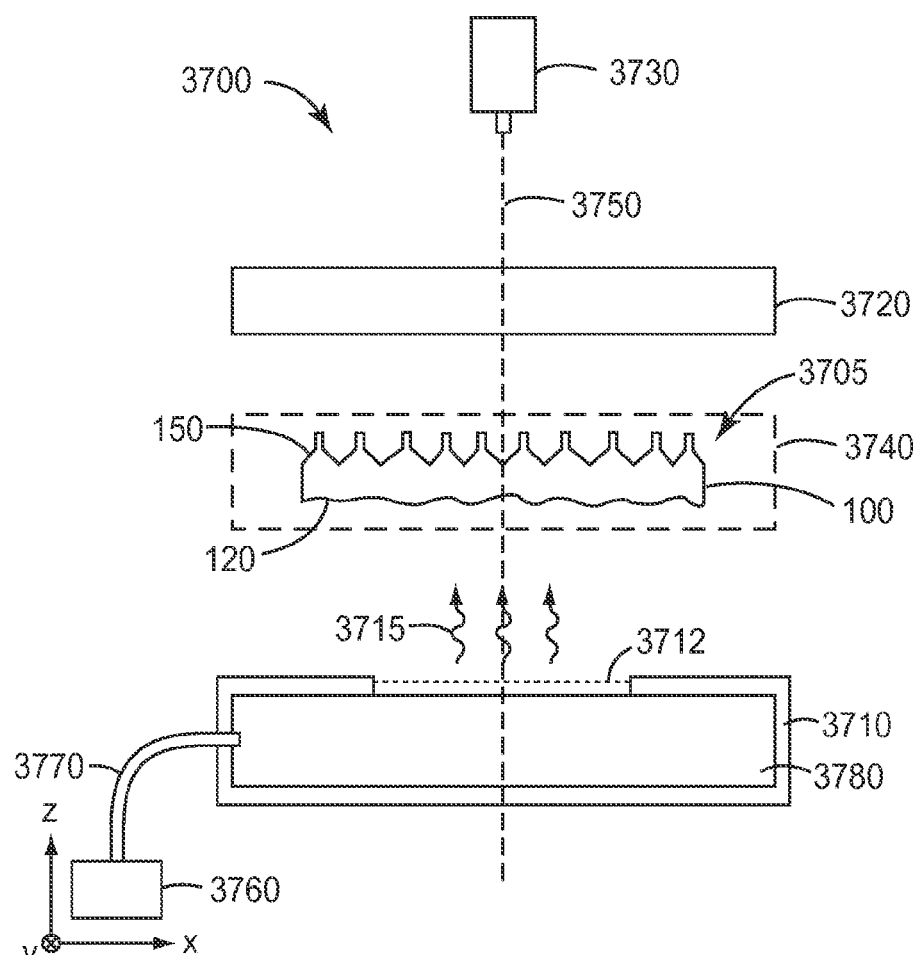
FIG. 37 is a schematic side-view of an optical system.

Effective transmission (ET) can be measured using optical system 3700, a schematic side-view of which is shown in FIG. 37. Optical system 3700 is centered on an optical axis 3750 and includes a hollow lambertian light box 3710 that emits a lambertian light 3715 through an emitting or exit surface 3712, a linear light absorbing polarizer 3720 for polarizing light 3715, and a photodetector 3730. Light box 3710 is illuminated by a stabilized broadband light source 3760 that is connected to an interior 3780 of the light box via an optical fiber 3770. A test sample 3705, the ET of which is to be measured by the optical system, is placed at location 3740 between the light box and the absorbing linear polarizer.

Test sample 3705 can be any light directing film or optical stack disclosed herein. For example, test sample 3705 can be light directing film 100 having a plurality of linear unitary discrete structures 150 extending along the y-direction. The ET of light directing film 100 can be measured by placing the light redirecting film in location 3740 with unitary discrete structures 150 facing the photodetector and second major surface 120 facing the light box. Next, the spectrally weighted axial luminance $I_1$ (luminance along optical axis 3750) is measured through the linear absorbing polarizer by the photo detector. Next, light directing film 100 is removed and the spectrally weighted luminance $I_2$ is measured without the light directing film placed at location 3740. ET is the ratio $I_1/I_2$. ET0 is the effective transmission when linear unitary discrete structures 150 extend along a direction that is parallel to the polarizing axis of linear absorbing polarizer 3720, and ET90 is the effective transmission when linear unitary discrete structures 150 extend along a direction that is perpendicular to the polarizing axis of the linear absorbing polarizer. The average effective transmission (ETA) is the average of ET0 and ET90.

Effective transmission values disclosed herein were measured using an EPP2000 spectrometer (available from Stel-larNet Inc, Tampa, Fla.) for detector 3730. The spectrometer was connected to a collimating lens via a Vis-NIR fiber optic cable (available as F1000-Vis-NIR from StellarNet Inc, Tampa, Fla.). The collimating lens included a lens tube (available as SM1L30 from Thorlabs, Newton, N.J.) and a plano-convex lens (available as LA1131 from Thorlabs, Newton, N.J.). The collimating lens produced a focused spot size of about 5 mm at the detector. Detector 3730 was oriented along optical axis 3750. Linear absorbing polarizer 3720 (Melles Griot 03 FPG 007 available from CVI Melles Griot, Albuquerque, N. Mex.) was mounted on a rotary stage. Location 3740 was adjacent to emitting surface 3712 of lambertian light box 3710. The light box was a six-sided hollow rectangular solid with approximate dimensions 12.5 cm by 12.5 cm by 11.5 cm made from diffuse PTFE plates about 0.6 mm thick. The light box had an average total diffuse reflectance of about 83%, measured at emitting surface 3712, over the visible range. Light source 3760 and optical fiber 3770 were a stabilized broadband incandescent light source attached to a fiber optic bundle (available as Fostec DCR-III with a one cm diameter fiber bundle extension from Schott North America, Southbridge Mass.).

Peel strength values reported herein were measured using an IMASS SP-2000 tester (available from IMASS Inc., Accord, Mass.). Test strips (optical stacks with a bottom prismatic light directing film) approximately 2.54 cm wide and 20.3 cm long were prepared with the linear prisms of the bottom light directing film extending along the length of the test strips. The test strips were adhered to the tester platform using 2.54 cm wide Scotch double-coated tape (available as Scotch 665 from 3M Company, St. Paul, Minn.). The tester was configured to measure the 180 degree peel force. Test strips were oriented so that the plano side (the side opposite the prismatic structures) of the bottom prism film was adhered to the tester platform and the top film was attached to the force balance. The load cell capacity was 10 lb-ft (13.6 nt-m). Peel force was measured at a rate of 12 in/min (30.5 cm/min). Data was collected after an initial delay of 2 seconds. Measurements were then averaged over a test period of 10 seconds. For each test strip, a minimum of two sequential 10 second measurements were collected and averaged.

Light directing films disclosed herein, such as light directing film 100, can be fabricated by first fabricating a cutting tool, such as a diamond cutting tool. The cutting tool can then be used to create the desired unitary discrete structures, such as linear unitary discrete structures, in a microreplication tool. The microreplication tool can then be used to microreplicate the structures into a material or resin, such as a UV or thermally curable resin, resulting in a light directing film. The microreplication can be achieved by any suitable manufacturing method, such as UV cast and cure, extrusion, injection molding, embossing, or other known methods.

Figure 38:
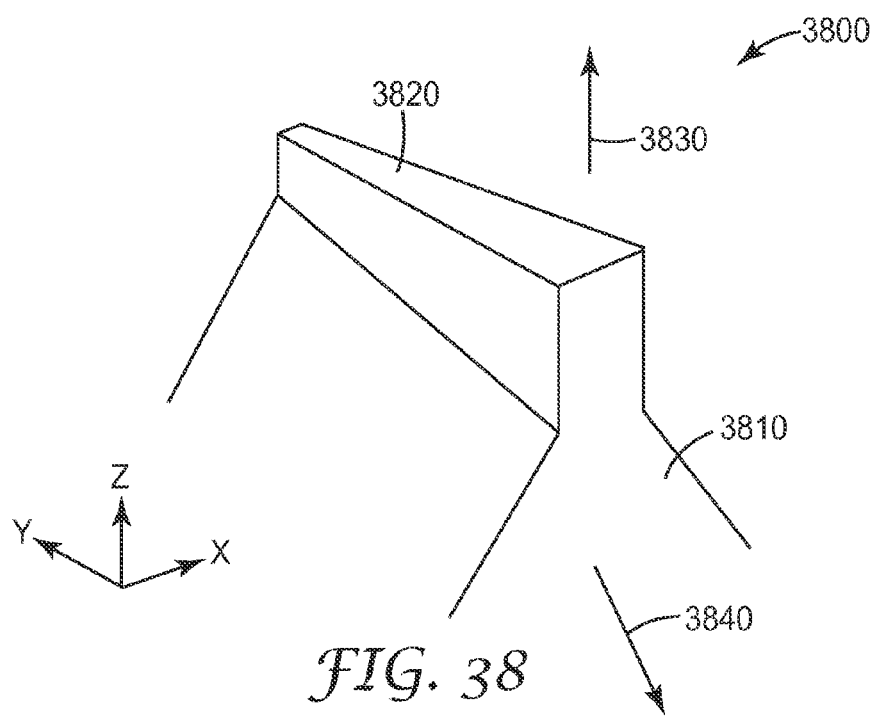
FIG. 38 is a schematic three-dimensional view of a cutting tool.

FIG. 38 is a schematic three-dimensional view of an exemplary cutting tool, such as a diamond cutting tool, 3800 that can be used to create a microreplication tool. Cutting tool 3810 is designed to plunge into a workpiece along a plunging direction 3830 to a desired and pre-determined depth. Next, the cutting tool can cut, for example, a linear unitary discrete structure, by moving the cutting tool along a desired and predetermined cutting direction 3840 where, in some cases, direction 3840 can be generally parallel to a major surface of the workpiece. Cutting tool 3800 includes a top surface 3820 for leading the plunging of the cutting tool into the workpiece and a cutting surface 3810 for cutting a desired profile as the cutting tool moves inside the workpiece along cutting direction 3840. In some cases, cutting surface 3810 can be planar and in the xz-plane. In such cases, top surface 3820 can be recessed relative to the xy-plane so that the top surface does not interferes with the cutting. Cutting tool 3800 and similar cutting tools can be fabricated using focused ion beam milling processes described in, for example, U.S. Pat. No. 7,140,812, the disclosure of which is incorporated in its entirety herein by reference thereto.

Figure 45:
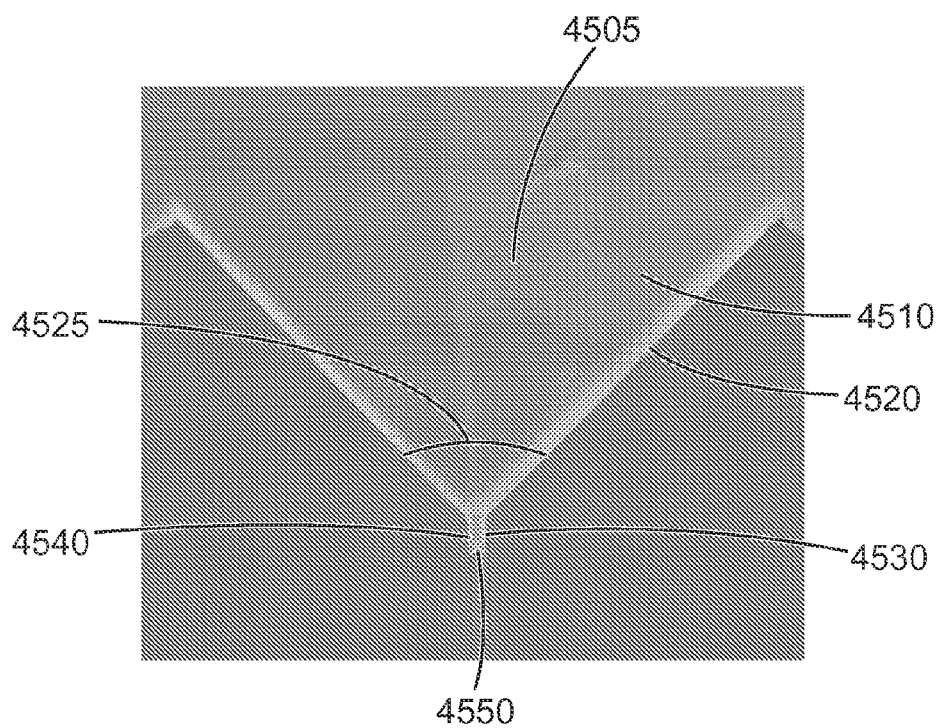
FIG. 45 is an exemplary SEM of a cutting tool.

FIG. 45 is an exemplary scanning electron micrograph (SEM) of a diamond cutting tool that was fabricated according to the processes disclosed herein. The diamond cutting tool had a cutting surface 4505 designed to cut linear structures in a microreplication tool that once replicated, would result in linear unitary discrete structures disclosed herein. Cutting surface 4505 included a bottom portion 4510 for fabricating the light directing portions of the unitary discrete structures and a top portion 4530 for fabricating the bonding portions of the unitary discrete structures. Bottom portion 4510 had two opposing side facets 4520 that defined an included angle 4525 that was about 88.4 degrees. Top portion 4530 had two opposing side facets that defined an included angle close to 90 degrees, and a top surface 4550 that had a recession similar to recession 2870 in FIG. 28. Top portion 4530 was about 6.4 microns long and 3.1 microns wide.

The light directing films and optical stacks disclosed herein can be employed in any application that may be desirable to increase brightness, reduce the number of separate components or layers, and reduce the overall thickness. Exemplary applications include televisions, computer monitors, projectors, potable displays such as portable video players, and hand-held devices such as cell-phones. Other exemplary application include large displays, such as large area televisions, and small displays, such as cell-phone displays. Other exemplary applications include displays for displaying an image or information or general lighting optical systems.

Some of the advantages of the disclosed light directing films, optical stacks, and optical systems are further illustrated by the following examples. The particular materials, amounts and dimensions recited in this example, as well as other conditions and details, should not be construed to unduly limit the present invention.

In the examples, the index of refraction was measured using a Metricon Model 2010 Prism Coupler (available from Metricon Corp., Pennington, N.J.).

EXAMPLE A

Figure 39:
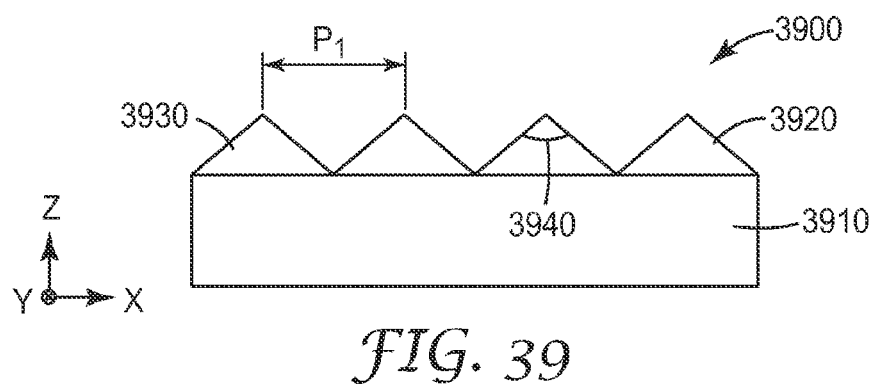
FIG. 39 is a schematic side-view of a light directing film.

A light directing film 3900, a schematic side-view of which is illustrated in FIG. 39, was made. A microreplication tool was made using the processes outlined and described in, for example, U.S. Patent Publication No. 2009/0041553, the disclosure of which is incorporated in its entirety herein by reference thereto. The microreplication tool was then used to make light directing film using the processes outlined and described in, for example, U.S. Pat. No. 5,175,030, the disclosure of which is incorporated in its entirety herein by reference thereto. Light directing film 3900 included a structured layer 3920 disposed on a substrate 3910. Substrate 3910 was made of PET, had a thickness of about 29 microns and an index of refraction of about 1.65. Structured layer 3920 included a plurality of linear prisms 3930 that extended along the y-direction (cross-web direction). Apex angle 3940 of each prism 3930 was about 90 degrees. The prism had a pitch $P_1$ of about 24 microns along the x-direction. The index of refraction of the linear prisms was about 1.56. Light directing film 3900 had an average effective transmission ETA of about 1.67.

EXAMPLE B

Figure 40:
FIG. 40 is a schematic side-view of a substrate.

A substrate 4000, a schematic side-view of which is illustrated in FIG. 40, was provided. Substrate 4000 was made of PET, had a thickness of about 50 microns and an index of refraction of about 1.65. Substrate 4000 had an average effective transmission ETA of about 1.02.

EXAMPLE C

Figure 41:
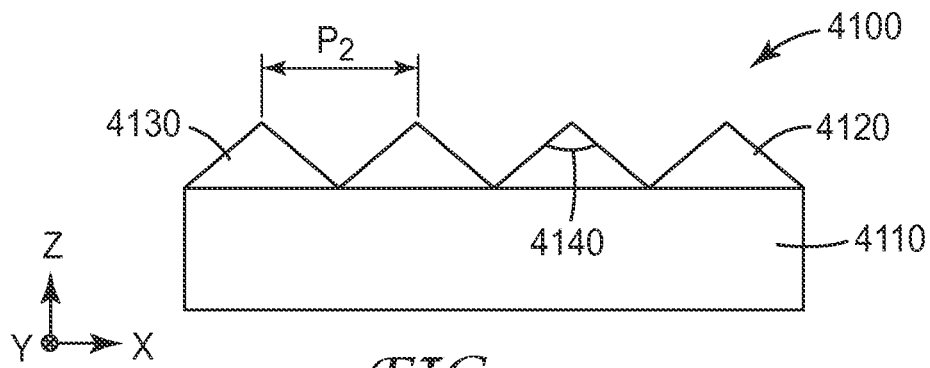
FIG. 41 is a schematic side-view of a light directing film.

A light directing film 4100, a schematic side-view of which is illustrated in FIG. 41, was made. Light directing film 4100 was a Vikuiti™ BEF-RP-II 90/24r, which is a brightness-enhanced, reflective polarizer having a prismatic surface, available from 3M Company, St. Paul, Minn. Light directing film 4100 included a structured layer 4120 disposed on a reflective polarizer 4110. Reflective polarizer 4110 had a thickness of about 96 microns. Structured layer 4120 included a plurality of linear prisms 4130 that extended along the y-direction. Apex angle 4140 of each prism 4130 was about 90 degrees. The prism had a pitch $P_2$ of about 24 microns along the x-direction. The index of refraction of the linear prisms was about 1.58. Light directing film 4100 had an average effective transmission ETA of about 2.42.

EXAMPLE D

Figure 42:
FIG. 42 is a schematic side-view of a reflective polarizer.

A reflective polarizer 4200, a schematic side-view of which is illustrated in FIG. 42, was made. Reflective polarizer 4200 was a Vikuiti™ reflective polarizer available from 3M Company, St. Paul, Minn. Reflective polarizer 4200 had a thickness of about 96 microns and an average effective transmission ETA of about 1.73.

EXAMPLE E

Figure 43:
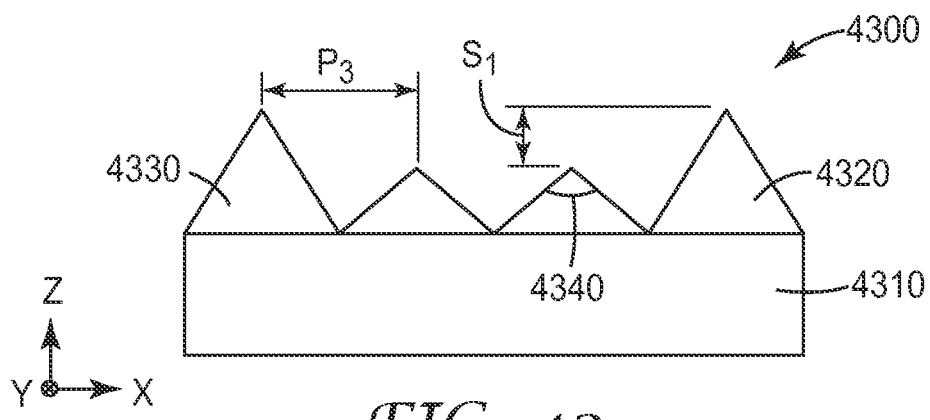
FIG. 43 is a schematic side-view of a light directing film.

A light directing film 4300, a schematic side-view of which is illustrated in FIG. 43, was made. Light directing film 4300 was a Vikuiti™ TBEF3, which is a brightness-enhanced film having a prismatic surface, available from 3M Company, St. Paul, Minn.

Light directing film 4300 included a structured layer 4320 disposed on a substrate 4310. Substrate 4310 was made of PET, had a thickness of about 29 microns and an index of refraction of about 1.65. Structured layer 4320 included a plurality of linear prisms 4330 that extended along the y-direction. Apex angle 4340 of each prism 4330 was about 90 degrees. The prism had a pitch $P_3$ of about 24 microns along the x-direction. Every fourteenth prism was slightly raised relative to the other prisms. The maximum height difference $S_1$ between the tallest prisms and the shortest prisms was about 2 microns. The index of refraction of the linear prisms was about 1.56. Light directing film 4300 had an average effective transmission ETA of about 1.65.

EXAMPLE F

Figure 44:
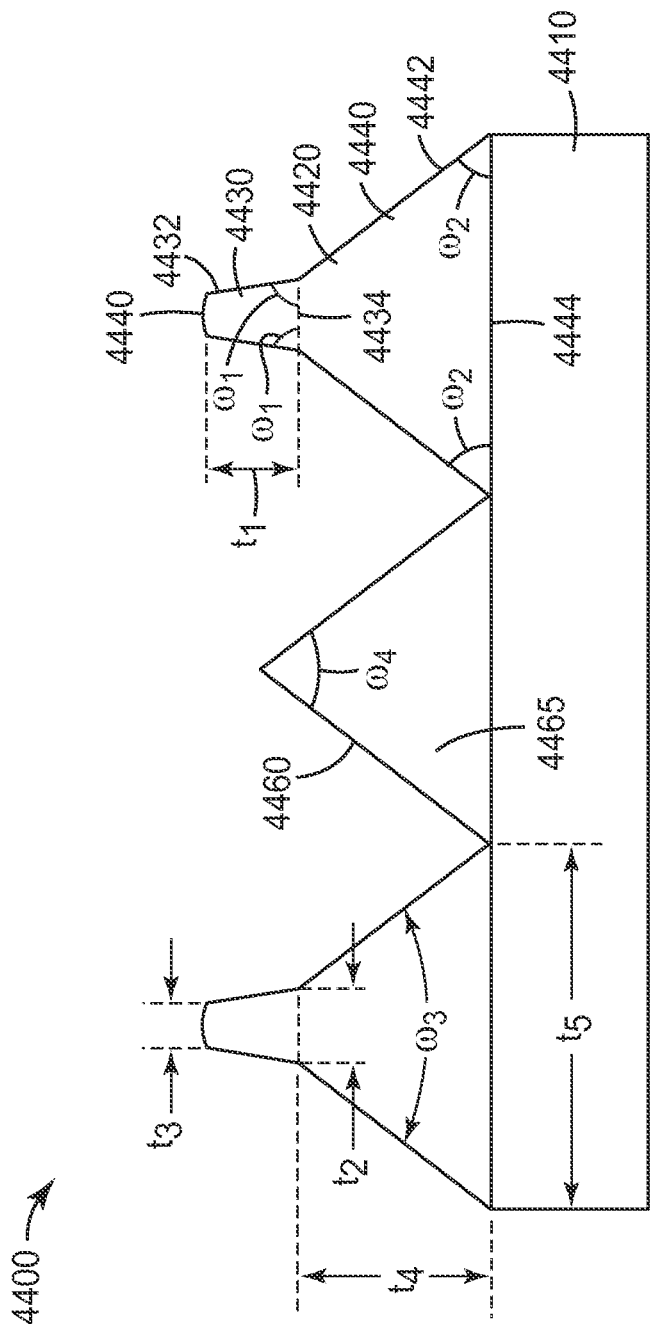
FIG. 44 is a schematic side-view of another light directing film.

A light directing film 4400, a schematic side-view of which is illustrated in FIG. 44, was made. Light directing film 4400 was similar to light directing film 3300 and included a first plurality of linear symmetric unitary discrete structures 4420 and a second plurality of linear symmetric discrete structures 4460. Structures 4420 and 4460 extended along the y-direction and were disposed on a substrate 4410. Substrate 4410 was made of PET, had a thickness of about 29 microns and an index of refraction of about 1.65. The index of refraction of structures 4420 and 4460 was about 1.56. Each unitary discrete structure included a bonding portion 4430 designed primarily for bonding the light directing film to a surface and disposed on a light directing portion 4440 designed primarily for directing and recycling light. Discrete structures 4460 did not include any bonding portions and were primarily designed to direct and recycle light. Unitary discrete structures 4420 alternated with discrete structures 4460.

Each bonding portion 4430 included two opposing side facets 4432 that made angles $\omega_1$ with the xy-plane (the plane of the light directing film) that was about 85-90 degrees. Each bonding portion had a base 4434, a minimum base dimension $t_2$ that was about 0.9 (±0.2) microns, and a maximum height $t_1$ that was about 3.4 (±0.2) microns. Each bonding portion also included a curved or rounded top surface that had a minimum top surface dimension $t_3$ of about 0.9 (±0.2) microns.

Each light directing portion 4420 included two opposing side facets 4422 that made angles $\omega_2$ with the xy-plane (the plane of the light directing film) that was about 45 degrees. Each light directing portion had a base 4444, a minimum base dimension $t_5$ of about 24 microns, and a maximum height $t_4$ that was about 11.9 microns. Light directing film 4400 had an average effective transmission ETA of about 1.65.

EXAMPLE G

An adhesion solution was prepared. The adhesion solution included the following components: (a) a pressure sensitive adhesive (29.39 gr, 26% solids, available as RD2739 from 3M Company, St. Paul, Minn.; (b) aliphatic urethane diacrylate (1.84 gr, 100% solids, available as CN964 from Sartomer Company, Exton, Pa.); (c) tripropylene glycol diacrylate (3.69 gr, 100% solids, available as SR306 from Sartomer Company); (d) toluene (15.15 gr, 0% solids, available from Aldrich Company, Milwaukee, Wis.); (e) methanol (10.81 gr, 0% solids, available from Aldrich Company); (f) ethyl acetate (37.76 gr, 0% solids, available from Aldrich Company); (g) photoinitiator (0.14 gr, 100% solids, available as Lucirin TPO from BASF, Charlotte, N.C.): (h) photoinitiator (0.16 gr, 100% solids, available as Irgacure 907 from Ciba, Tarrytown, N.Y.); and polyvinylcaprolactam (0.477 gr, 40% solids, available as Luviskol Plus from BASF).

EXAMPLE H

A coating process for coating the adhesive solution of Example G was developed. The adhesive solution was coated on the plano side of the substrate of the upper film using a No. 8 or No. 20 Mayer rod (available from RD Specialties, Webster, N.Y.). The wet adhesive layer thickness for the No. 8 Meyer rod was about 9 microns. The wet adhesive layer thickness for a No. 20 Mayer rod was about 26 microns. The coating was then dried at 60° C. for about 2.5 minutes resulting in a dry optical adhesive layer. For a No. 8 Mayer rod, the thickness of the optical adhesive layer was about 1.0 micron (±0.2 microns). For a No. 20 Mayer rod, the thickness of the optical adhesive layer was about 3.0 microns (±0.2 microns). The dry thickness values were measured using a TranSpec Spectrometer and light source (available from Applied Spectroscopy, Aalen Germany). The upper film was then laminated to the lower film using a rubber hand roller with 30 Shore A hardness at 0.5 lbf/in (0.88 N/cm). The resulting laminated optical stack was then cured through the lower film at 60 ft/min (18.3 m/min) using a Fusion belt processor (available from Fusion UV Systems, Gaithersburg Md.). The UV dosages were 920 mJ/cm² (UV-A), 375 mJ/cm² (UV-B), and 43 mJ/cm² (UV-C). The dosage was measured using a UV PowerPuck II (available from EIT Inc., Sterling N.Y.).

EXAMPLE I

An adhesion solution was prepared. The adhesion solution included the following components: (a) a pressure sensitive adhesive (29.11 kg, 26% solids, available as RD2739 from 3M Company, St. Paul, Minn.; (b) aliphatic urethane diacrylate (1.75 kg, 100% solids, available as CN964 from Sartomer Company, Exton, Pa.); (c) tripropylene glycol diacrylate (3.55 kg, 100% solids, available as SR306 from Sartomer Company); (d) toluene (24.06 kg, 0% solids, available from Aldrich Company, Milwaukee, Wis.); (e) methanol (17.21, 0% solids, available from Aldrich Company); (f) ethyl acetate (59.38 kg, 0% solids, available from Aldrich Company); (g) photoinitiator (0.27 kg, 100% solids, available as Lucirin TPO from BASF, Charlotte, N.C.): (h) photoinitiator (0.27 kg, 100% solids, available as Irgacure 907 from Ciba, Tarrytown, N.Y.); and polyvinylcaprolactam (0.48 kg, 40% solids, available as Luviskol Plus from BASF).

EXAMPLE J

A coating process for coating the adhesive solution of Example I was developed. The adhesive solution was coated on the plano side of the substrate of the upper film using a slot-type coating die. The coating width was 50.8 cm, and the web speed of the coating process was 18.3 m/min. Solution was pre-metered using a Zenith gear pump and delivered at a flow rate of 400 cubic centimeters per minute. The wet adhesive layer thickness was approximately 43 microns. The coating was then dried at 65.6° C. for approximately 2.5 minutes resulting in a dry optical adhesive layer with a thickness of approximately 3.5 microns. The dry thickness value was measured using a TranSpec Spectrometer and light source (available from Applied Spectroscopy, Aalen Germany). The upper film was then laminated to the lower film between a rubber nip roll (60 Shore A hardness) and a steel roll at a nip force of 1.8 lbf/in (3.2 N/cm). The laminate was then nipped again between a second rubber nip roll (60 Shore A hardness) and a temperature controlled UV backup roll; the nip force of the UV laminator was 4.8 lbf/in (8.4 N/cm). The resulting laminated optical stack was then cured using Fusion F600 light sources equipped with "D" bulbs (available from Fusion UV Systems, Gaithersburg Md.). The laminated optical stack was cured through the lower film at 18.3 m/min on the temperature controlled UV backup roll. The temperature set point of the UV backup roll was 43.4° C. The delivered UV dosages were 993 mJ/cm² (UV-A), 312 mJ/cm² (UV-B), and 29 mJ/cm² (UV-C). The dosage was measured using a UV PowerPuck (available from EIT Inc., Sterling N.Y.).

EXAMPLE 1A

An optical stack was made by placing a light directing film 3900 of Example A on another light directing film 4300 of Example E. The plano side of the top light directing film faced the structured side of the bottom light directing film. Each light directing film 4300 was about 22.9 cm wide and 30.5 cm long. The linear prisms in the two films extended along orthogonal directions. There was no optical adhesive layer bonding the two light directing films. The ETA of the optical stack was about 2.51.

EXAMPLE 1B

An optical stack similar to the optical stack of Example 1A was made except that the two light directing films were bonded to each other via a 1 micron thick optical adhesive layer and the bonding process described in Example H. The resulting optical stack had a peel strength of about 34 gr/in and an ETA of about 2.39.

EXAMPLE 1C

An optical stack similar to the optical stack of Example 1A was made except that the two light directing films 4300 were bonded to each other via a 3 micron thick optical adhesive layer and the bonding process described in Example H. The resulting optical stack had a peel strength of about 39 gr/in and an ETA of about 2.01.

EXAMPLE 2A

An optical stack was made by placing a light directing film 3900 of Example A on a light directing film 4400 of Example F. The plano side of the top light directing film faced the structured side of the bottom light directing film. The linear prisms in the two films extended along orthogonal directions. There was no optical adhesive layer bonding the two light directing films. The ETA of the optical stack was about 2.45.

EXAMPLE 2B

An optical stack similar to the optical stack of Example 2A was made except that the top light directing film 3900 was laminated to the bottom light directing film 4400 via a 1 micron thick optical adhesive layer and the bonding process described in Example H. The resulting optical stack had a peel strength of about 28 gr/in and an ETA of about 2.37.

EXAMPLE 2C

An optical stack similar to the optical stack of Example 2A was made except that the top light directing film 3900 was laminated to the bottom light directing film 4400 via a 3 micron thick optical adhesive layer and the bonding process described in Example H. The resulting optical stack had a peel strength of about 49 gr/in and an ETA of about 2.38.

EXAMPLE 2D

An optical stack similar to the optical stack of Example 2A was made except that the top light directing film 3900 was laminated to the bottom light directing film 4400 via a 3.5 micron thick optical adhesive layer and the bonding process described in Example J. The resulting optical stack had a peel strength of about 79.9 gr/in and an ETA of about 2.32.

EXAMPLE 2E

An optical stack similar to the optical stack of Example 2A was made except that the top light directing film 4300 was laminated to the bottom light directing film 4400 via a 3.5 micron thick optical adhesive layer and the bonding process described in Example J except that the plano side of the substrate of the upper film was first nitrogen corona treated at a dosage of 1.5 J/cm2. The resulting optical stack had a peel strength of about 100.6 gr/in and an ETA of about 2.31.

Figure 47:
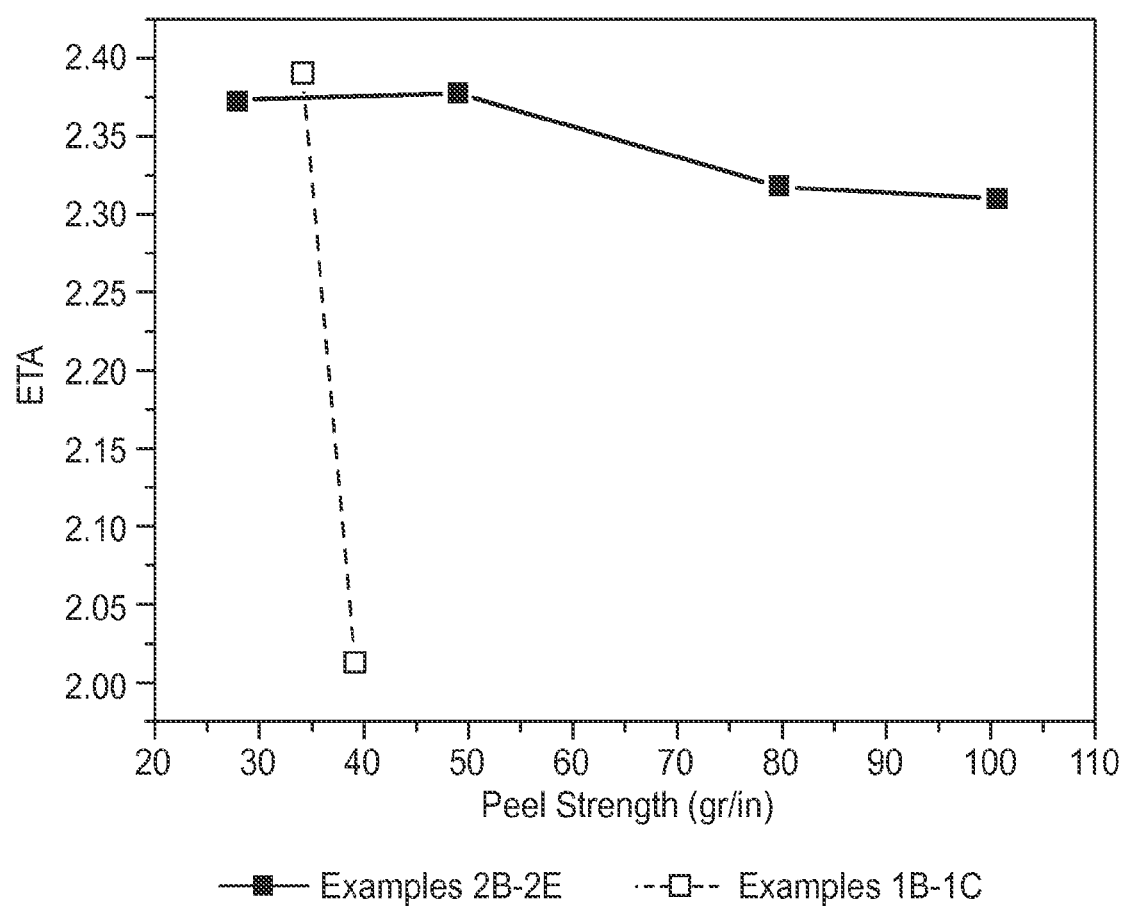
FIG. 47 is a plot of average effective transmission as a function of peel strength.

FIG. 47 is ETA as a function of peel strength for Examples 1B-1C where the prisms did not have any portions designed primarily for bonding the prisms to a neighboring surface and Examples 2B-2E where every other prism was a unitary discrete structure that included a bonding portion designed primary to bond the unitary discrete structure to a neighboring surface. In Examples 2B-2E, the peel strength was significantly increased with no, or very little, drop in the ETA. In sharp contrast, in Examples 1B-1C, even a slight increase in the peel strength resulted in a significant drop in the ETA.

EXAMPLE 3A

An optical stack was made by placing a substrate 4000 of Example B on a light directing film 4300 of Example E. Each film was about 22.9 cm wide and 30.5 cm long. There was no optical adhesive layer bonding the two light films. The ETA of the optical stack was about 1.61.

EXAMPLE 3B

An optical stack similar to the optical stack of Example 3A was made except that the top substrate 4000 was laminated to the bottom light directing film 4300 via a 1 micron thick optical adhesive layer and the bonding process described in Example H. The resulting optical stack had a peel strength of about 26 gr/in and an ETA of about 1.55.

EXAMPLE 3C

An optical stack similar to the optical stack of Example 3A was made except that the top substrate 4000 was laminated to the bottom light directing film 4300 via a 3 micron thick optical adhesive layer and the bonding process described in Example H. The resulting optical stack had a peel strength of about 32 gr/in and an ETA of about 1.37.

EXAMPLE 4A

An optical stack was made by placing a substrate 4000 of Example B on a light directing film 4400 of Example F. Each film was about 22.9 cm wide and 30.5 cm long. There was no optical adhesive layer bonding the two light films. The ETA of the optical stack was about 1.61.

EXAMPLE 4B

An optical stack similar to the optical stack of Example 4A was made except that the top substrate 4000 was laminated to the bottom light directing film 4400 via a 1 micron thick optical adhesive layer and the bonding process described in Example H. The resulting optical stack had a peel strength of about 21 gr/in and an ETA of about 1.58.

EXAMPLE 4C

An optical stack similar to the optical stack of Example 4A was made except that the top substrate 4000 was laminated to the bottom light directing film 4400 via a 3 micron thick optical adhesive layer and the bonding process described in Example H. The resulting optical stack had a peel strength of about 30 gr/in and an ETA of about 1.58.

EXAMPLE 5A

An optical stack was made by placing a light directing film 4100 of Example C on a light directing film 4300 of Example E. The plano side of the top light directing film faced the structured side of the bottom light directing film. Each light directing film was about 22.9 cm wide and 30.5 cm long. The linear prisms in the two films extended along orthogonal directions. There was no optical adhesive layer bonding the two light directing films. The ETA of the optical stack was about 3.06.

EXAMPLE 5B

An optical stack similar to the optical stack of Example 5A was made except that the top light directing film 4100 was laminated to the bottom light directing film 4300 via a 1 micron thick optical adhesive layer and the bonding process described in Example H. The resulting optical stack had a peel strength of about 37 gr/in and an ETA of about 2.84.

EXAMPLE 5C

An optical stack similar to the optical stack of Example 5A was made except that the top light directing film 4100 was laminated to the bottom light directing film 4300 via a 3 micron thick optical adhesive layer and the bonding process described in Example H. The resulting optical stack had a peel strength of about 106 gr/in and an ETA of about 2.51.

EXAMPLE 6A

An optical stack was made by placing a light directing film 4100 of Example C on a light directing film 4400 of Example F. The plano side of the top light directing film faced the structured side of the bottom light directing film. Each light directing film was about 22.9 cm wide and 30.5 cm long. The linear prisms in the two films extended along orthogonal directions. There was no optical adhesive layer bonding the two light directing films. The ETA of the optical stack was about 3.07.

EXAMPLE 6B

An optical stack similar to the optical stack of Example 6A was made except that the top light directing film 4100 was laminated to the bottom light directing film 4400 via a 1 micron thick optical adhesive layer and the bonding process described in Example H. The resulting optical stack had a peel strength of about 37 gr/in and an ETA of about 2.93.

EXAMPLE 6C

Figure 46:
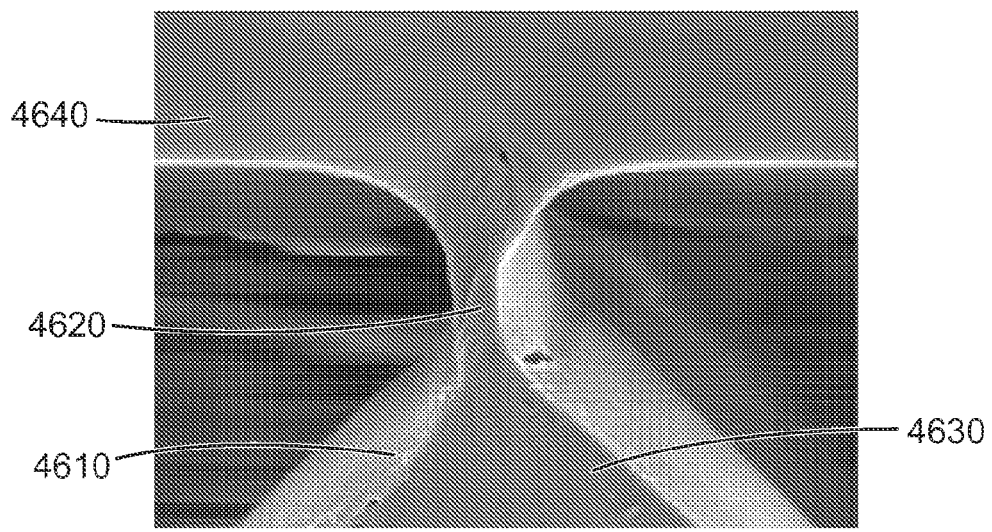
FIG. 46 is an exemplary SEM of a unitary discrete structure partially penetrating an optical layer.

An optical stack similar to the optical stack of Example 6A was made except that the top light directing film 4100 was laminated to the bottom light directing film 4400 via a 3 micron thick optical adhesive layer and the bonding process described in Example H. The resulting optical stack had a peel strength of about 88 gr/in and an ETA of about 2.82. FIG. 46 is an exemplary SEM of a unitary discrete structure 4610 that included a bonding portion 4620 and a light directing portion 4630. Bonding portion 4620 had partially penetrated into an optical adhesive layer 4640. Bonding portion 4620 was about 3 microns tall and about 1 micron wide.

EXAMPLE 7A

An optical stack was made by placing a light directing film 3900 of Example A on a light directing film 4300 of Example E. The plano side of the top light directing film faced the structured side of the bottom light directing film. Each light directing film was about 22.9 cm wide and 30.5 cm long. The linear prisms in the two films extended along orthogonal directions. There was no optical adhesive layer bonding the two light directing films. The ETA of the optical stack was about 2.35.

EXAMPLE 7B

An optical stack similar to the optical stack of Example 7A was made except that the top light directing film 3900 was laminated to the bottom light directing film 4300 via a 1 micron thick optical adhesive layer and the bonding process described in Example H. The resulting optical stack had a peel strength of about 37 gr/in and an ETA of about 2.24.

EXAMPLE 7C

An optical stack similar to the optical stack of Example 7A was made except that the top light directing film 3900 was laminated to the bottom light directing film 4300 via a 3 micron thick optical adhesive layer and the bonding process described in Example H. The resulting optical stack had a peel strength of about 90 gr/in and an ETA of about 1.97.

EXAMPLE 8A

An optical stack was made by placing a light directing film 3900 of Example A on a light directing film 4400 of Example F. The plano side of the top light directing film faced the structured side of the bottom light directing film. Each light directing film was about 22.9 cm wide and 30.5 cm long. The linear prisms in the two films extended along orthogonal directions. There was no optical adhesive layer bonding the two light directing films. The ETA of the optical stack was about 2.36.

EXAMPLE 8B

An optical stack similar to the optical stack of Example 8A was made except that the top light directing film 3900 was laminated to the bottom light directing film 4400 via a 1 micron thick optical adhesive layer and the bonding process described in Example H. The resulting optical stack had a peel strength of about 33 gr/in and an ETA of about 2.33.

EXAMPLE 8C

An optical stack similar to the optical stack of Example 8A was made except that the top light directing film 3900 was laminated to the bottom light directing film 4400 via a 3 micron thick optical adhesive layer and the bonding process described in Example H. The resulting optical stack had a peel strength of about 64 gr/in and an ETA of about 2.29.

Item 1. An optical stack comprising:
  a first optical stack comprising:
  a first optical adhesive layer;
  a reflective polarizer layer disposed on the first optical adhesive layer, the reflective polarizer layer substantially reflecting light of a first polarization state and substantially transmitting light of a second polarization state orthogonal to the first polarization state; and
  a second optical stack comprising:
  a second optical adhesive layer;
  a low index layer disposed on the second optical adhesive layer and comprising a plurality of voids dispersed in a binder; and
  a light directing film disposed on the low index layer and comprising a plurality of unitary discrete structures, portions of each unitary discrete structure penetrating into the first optical adhesive layer, portions of each unitary discrete structure not penetrating into the first optical adhesive layer, each unitary discrete structure defining a penetration depth and a penetration base at an interface between the penetrating and non-penetrating portions of the unitary discrete structure, the penetration base having a minimum penetration base dimension, the plurality of unitary discrete structures having an average penetration depth and an average minimum penetration base dimension, a ratio of the average penetration depth to the average minimum penetration base dimension being at least 1.5, a peel strength between the first and second optical stacks being greater than about 30 grams/inch.

Item 2. The optical stack of item 1, wherein substantial portions of each two neighboring major surfaces in each of the first and second optical stacks are in physical contact with each other.

Item 3. The optical stack of item 2, wherein at least 50% of each two neighboring major surfaces in each of the first and second optical stacks are in physical contact with each other.

Item 4. The optical stack of item 2, wherein at least 70% of each two neighboring major surfaces in each of the first and second optical stacks are in physical contact with each other.

Item 5. The optical stack of item 2, wherein at least 90% of each two neighboring major surfaces in each of the first and second optical stacks are in physical contact with each other.

Item 6. The optical stack of item 1, wherein an effective index of refraction of the low index layer is not greater than about 1.3.

Item 7. The optical stack of item 1, wherein an effective index of refraction of the low index layer is not greater than about 1.25.

Item 8. The optical stack of item 1, wherein an effective index of refraction of the low index layer is not greater than about 1.2.

Item 9. The optical stack of item 1, wherein an effective index of refraction of the low index layer is not greater than about 1.15.

Item 10. The optical stack of item 1, wherein an effective index of refraction of the low index layer is not greater than about 1.05.

Item 11. The optical stack of item 1, wherein an optical haze of the low index layer is not greater than about 5%.

Item 12. The optical stack of item 1, wherein an optical haze of the low index layer is not greater than about 4%.

Item 13. The optical stack of item 1, wherein an optical haze of the low index layer is not greater than about 3%.

Item 14. The optical stack of item 1, wherein an optical haze of the low index layer is not greater than about 2%.

Item 15. The optical stack of item 1, wherein an optical haze of the low index layer is not greater than about 1%.

Item 16. The optical stack of item 1, wherein an optical haze of the low index layer is not less than about 10%.

Item 17. The optical stack of item 1, wherein an optical haze of the low index layer is not less than about 20%.

Item 18. The optical stack of item 1, wherein an optical haze of the low index layer is not less than about 30%.

Item 19. The optical stack of item 1, wherein an optical haze of the low index layer is not less than about 40%.

Item 20. The optical stack of item 1, wherein an optical haze of the low index layer is not less than about 50%.

Item 21. The optical stack of item 1, wherein the low index layer has a thickness that is not less than about 1 micron.

Item 22. The optical stack of item 1, wherein the low index layer has a thickness that is not less than about 2 microns.

Item 23. The optical stack of item 1, wherein the low index layer comprises a plurality of particles.

Item 24. The optical stack of item 1, wherein the low index layer comprises a plurality of interconnected voids dispersed in a binder.

Item 25. An illumination system comprising:
a lightguide; and
the optical stack of item 1 disposed on and adhering to the lightguide, the low index layer facilitating propagation of light within the lightguide by at least one of total internal reflection and enhanced internal reflection.

Item 26. The illumination system of item 25, wherein the lightguide comprises a plurality of light extractors for extracting light that propagates within the lightguide by total internal reflection from the lightguide.

Item 27. The optical stack of item 1, wherein the first optical stack further comprises a light diffusing layer disposed on the reflective polarizer layer.

Item 28. A display system comprising:
an image forming panel;
a back reflector; and
the optical stack of item 1 disposed between the image forming panel and the back reflector.

Item 29. The optical stack of item 1 having an average effective transmission that is not less or is less than by no more than about 10% as compared to an optical stack that has the same construction except that no unitary discrete structure penetrates into the first optical adhesive layer.

Item 30. The optical stack of item 1 having an average effective transmission that is not less or is less than by no more than about 5% as compared to an optical stack that has the same construction except that no unitary discrete structure penetrates into the first optical adhesive layer.

Item 31. The optical stack of item 1, wherein the ratio of the average penetration depth to the average minimum penetration base dimension is at least 2.

Item 32. The optical stack of item 1, wherein the ratio of the average penetration depth to the average minimum penetration base dimension is at least 3.

Item 33. The optical stack of item 1, wherein the ratio of the average penetration depth to the average minimum penetration base dimension is at least 4.

Item 34. The optical stack of item 1, wherein the ratio of the average penetration depth to the average minimum penetration base dimension is at least 5.

Item 35. The optical stack of item 1, wherein the ratio of the average penetration depth to the average minimum penetration base dimension is at least 7.

Item 36. The optical stack of item 1, wherein the ratio of the average penetration depth to the average minimum penetration base dimension is at least 10.

Item 37. The optical stack of item 1, wherein each unitary discrete structure has a base and a minimum base dimension, the plurality of unitary discrete structures having an average minimum base dimension, the average minimum penetration base dimension being less than about 10% of the average minimum base dimension.

Item 38. The optical stack of item 37, wherein the average minimum penetration base dimension is less than about 8% of the average minimum base dimension.

Item 39. The optical stack of item 37, wherein the average minimum penetration base dimension is less than about 6% of the average minimum base dimension.

Item 40. The optical stack of item 37, wherein the average minimum penetration base dimension is less than about 5% of the average minimum base dimension.

Item 41. The optical stack of item 37, wherein the average minimum penetration base dimension is less than about 4% of the average minimum base dimension.

Item 42. The optical stack of item 37, wherein the average minimum penetration base dimension is less than about 3% of the average minimum base dimension.

Item 43. An optical stack comprising:
a first optical adhesive layer;
a low index layer disposed on the first optical adhesive layer and comprising a plurality of voids dispersed in a binder;
a light directing film disposed on the low index layer and comprising a plurality of unitary discrete structures; and
a second optical adhesive layer disposed on the light directing film, portions of each unitary discrete structure penetrating into the second optical adhesive layer, portions of each unitary discrete structure not penetrating into the second optical adhesive layer, each unitary discrete structure defining a penetration depth and a penetration base at an interface between the penetrating and non-penetrating portions of the unitary discrete structure, the penetration base having a minimum penetration base dimension, the plurality of unitary discrete structures having an average penetration depth and an average minimum penetration base dimension, a ratio of the average penetration depth to the average minimum penetration base dimension being at least 1.5, a peel strength between the light directing film and the second optical adhesive layer being greater than about 30 grams/inch.

Item 44. The optical stack of item 43 having an average effective transmission that is not less or is less than by no more than about 10% as compared to an optical stack that has the same construction except that no unitary discrete structure penetrates into the second optical adhesive layer.

Item 45. The optical stack of item 43, wherein each unitary discrete structure has a base and a minimum base dimension, the plurality of unitary discrete structures having an average minimum base dimension, the average minimum penetration base dimension being less than about 10% of the average minimum base dimension.

Item 46. A lightguide comprising:
a lightguide layer for propagating light across the lightguide layer by total internal reflection; and
a plurality of discrete light extractors disposed on the lightguide layer, each discrete light extractor being partially embedded in the lightguide layer for extracting light that propagates within the lightguide layer by total internal reflection from the lightguide layer.

Item 47. The lightguide of item 46, wherein each discrete light extractor in the plurality of discrete light extractors has a portion that is not embedded in the lightguide layer.

Item 48. The lightguide of item 46, wherein an index of refraction of each discrete light extractor in the plurality of discrete light extractors is different than an index of refraction of the lightguide layer.

Item 49. The lightguide of item 46, wherein an index of refraction of each discrete light extractor in the plurality of discrete light extractors is equal to an index of refraction of the lightguide layer.

Item 50. The lightguide of item 46 comprising an optical film disposed on the lightguide layer and comprising the plurality of discrete light extractors.

As used herein, terms such as "vertical", "horizontal", "above", "below", "top", "bottom' "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 38 is flipped as compared to the orientation in the figure, surface 3820 is still considered to be the top surface.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical stack comprising:
a first optical stack comprising:
a first optical adhesive layer;
a reflective polarizer layer disposed on the first optical adhesive layer, the reflective polarizer layer substantially reflecting light of a first polarization state and substantially transmitting light of a second polarization state orthogonal to the first polarization state; and
a second optical stack comprising:
a second optical adhesive layer;
a low index layer disposed on the second optical adhesive layer and comprising a plurality of voids dispersed in a binder; and
a light directing film disposed on the low index layer and comprising a plurality of unitary discrete structures, portions of each unitary discrete structure penetrating into the first optical adhesive layer, portions of each unitary discrete structure not penetrating into the first optical adhesive layer, each unitary discrete structure defining a penetration depth and a penetration base at an interface between the penetrating and non-penetrating portions of the unitary discrete structure, the penetration base having a minimum penetration base dimension, the plurality of unitary discrete structures having an average penetration depth and an average minimum penetration base dimension, a ratio of the average penetration depth to the average minimum penetration base dimension being at least 1.5, a peel strength between the first and second optical stacks being greater than about 30 grams/inch.

2. The optical stack of claim 1, wherein substantial portions of each two neighboring major surfaces in each of the first and second optical stacks are in physical contact with each other.

3. The optical stack of claim 2, wherein at least 50% of each two neighboring major surfaces in each of the first and second optical stacks are in physical contact with each other.

4. The optical stack of claim 1, wherein an effective index of refraction of the low index layer is not greater than about 1.3.

5. The optical stack of claim 1, wherein an optical haze of the low index layer is not greater than about 5%.

6. The optical stack of claim 1, wherein an optical haze of the low index layer is not less than about 10%.

7. The optical stack of claim 1, wherein the low index layer has a thickness that is not less than about 1 micron.

8. The optical stack of claim 1, wherein the low index layer comprises a plurality of particles.

9. The optical stack of claim 1, wherein the low index layer comprises a plurality of interconnected voids dispersed in a binder.

10. An illumination system comprising:
a lightguide; and
the optical stack of claim 1 disposed on and adhering to the lightguide, the low index layer facilitating propagation of light within the lightguide by at least one of total internal reflection and enhanced internal reflection.

11. The illumination system of claim 10, wherein the lightguide comprises a plurality of light extractors for extracting light that propagates within the lightguide by total internal reflection from the lightguide.

12. The optical stack of claim 1 having an average effective transmission that is not less or is less than by no more than about 10% as compared to an optical stack that has the same construction except that no unitary discrete structure penetrates into the first optical adhesive layer.

13. The optical stack of claim 1, wherein the ratio of the average penetration depth to the average minimum penetration base dimension is at least 2.

14. The optical stack of claim 1, wherein each unitary discrete structure has a base and a minimum base dimension, the plurality of unitary discrete structures having an average minimum base dimension, the average minimum penetration base dimension being less than about 10% of the average minimum base dimension.

15. An optical stack comprising:
a first optical adhesive layer;
a low index layer disposed on the first optical adhesive layer and comprising a plurality of voids dispersed in a binder;
a light directing film disposed on the low index layer and comprising a plurality of unitary discrete structures; and
a second optical adhesive layer disposed on the light directing film, portions of each unitary discrete structure penetrating into the second optical adhesive layer, portions of each unitary discrete structure not penetrating into the second optical adhesive layer, each unitary discrete structure defining a penetration depth and a penetration base at an interface between the penetrating and non-penetrating portions of the unitary discrete structure, the penetration base having a minimum penetration base dimension, the plurality of unitary discrete structures having an average penetration depth and an average minimum penetration base dimension, a ratio of the average penetration depth to the average minimum penetration base dimension being at least 1.5, a peel strength between the light directing film and the second optical adhesive layer being greater than about 30 grams/inch.

16. The optical stack of claim 15 having an average effective transmission that is not less or is less than by no more than about 10% as compared to an optical stack that has the same construction except that no unitary discrete structure penetrates into the second optical adhesive layer.

17. The optical stack of claim 15, wherein each unitary discrete structure has a base and a minimum base dimension, the plurality of unitary discrete structures having an average minimum base dimension, the average minimum penetration base dimension being less than about 10% of the average minimum base dimension.

* * * * *

UNITED STATES PATENT AND TRADEMARK OFFICE
CERTIFICATE OF CORRECTION

PATENT NO.        : 8,942,522 B2
APPLICATION NO.   : 13/634583
DATED             : January 27, 2015
INVENTOR(S)       : Edmonds et al.

It is certified that error appears in the above-identified patent and that said Letters Patent is hereby corrected as shown below:

On the title page

Item [75], Line 3, Delete "Deriofske," and insert -- Derlofske, --, therefor.

In the specification

Column 1
Line 17, Delete "Film"," insert -- Film" (Attorney Docket No. 65903US002), --, therefor.
Line 20, Delete "Stack"." and insert -- Stack" (Attorney Docket No. 66400US002). --, therefor.

Column 16
Line 10, Delete "Reflectivity"," and insert -- Reflectivity", Attorney Docket Number 65809US002, --, therefor.
Line 13, Delete "incidence",filed" and insert -- Incidence", Attorney Docket No. 65900US002, filed --, therefor.

Column 30
Line 23, Delete "Method", filed" and insert -- Method", Attorney Docket Number 65716US002, filed --, therefor.
Line 25, Delete "Article"," and insert -- Article", Attorney Docket No. 65766US002, --, therefor.

Column 34
Line 46, Delete "Film"," and insert -- Film", Attorney Docket Number 65062US002, --, therefor.
Line 49, Delete "Same"," and insert -- Same", Attorney Docket No. 65354US002, --, therefor.
Line 51-52, Delete "Diffuser",filed" and insert -- Diffuser", Attorney Docket Number 65822US002, filed --, therefor.
Line 54, Delete "Same"," and insert -- Same", Attorney Docket No. 65619US002, --, therefor.

Signed and Sealed this
Sixteenth Day of August, 2016

Michelle K. Lee
*Director of the United States Patent and Trademark Office*